(12) United States Patent
Shichino

(10) Patent No.: US 10,559,984 B2
(45) Date of Patent: Feb. 11, 2020

(54) POWER TRANSFER SYSTEM, AND POWER RECEIVING APPARATUS, POWER TRANSMITTING APPARATUS, AND CONTROL METHOD THEREOF

(71) Applicant: CANON KABUSHIKI KAISHA, Tokyo (JP)

(72) Inventor: Takahiro Shichino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 709 days.

(21) Appl. No.: 14/890,118

(22) PCT Filed: Jul. 25, 2014

(86) PCT No.: PCT/JP2014/070292
§ 371 (c)(1),
(2) Date: Nov. 9, 2015

(87) PCT Pub. No.: WO2015/016334
PCT Pub. Date: Feb. 5, 2015

(65) Prior Publication Data
US 2016/0126749 A1 May 5, 2016

(30) Foreign Application Priority Data

Jul. 29, 2013 (JP) .................................. 2013-157119

(51) Int. Cl.
*H02J 50/40* (2016.01)
*H02J 50/80* (2016.01)
(Continued)

(52) U.S. Cl.
CPC ............. *H02J 50/80* (2016.02); *H02J 7/025* (2013.01); *H02J 50/12* (2016.02); *H02J 50/40* (2016.02);
(Continued)

(58) Field of Classification Search
CPC .. H02J 50/80; H02J 7/025; H02J 50/60; H02J 50/90; H02J 50/12; H02J 50/40;
(Continued)

(56) References Cited

U.S. PATENT DOCUMENTS

| 8,391,258 B2 | 3/2013 | Shichino |
| 8,872,386 B2 * | 10/2014 | Mach .................. H04B 5/0037 307/104 |

(Continued)

FOREIGN PATENT DOCUMENTS

| CN | 103199632 A | 7/2013 |
| EP | 2520758 A2 | 11/2012 |

(Continued)

OTHER PUBLICATIONS

U.S. Appl. No. 15/073,425, filed Mar. 17, 2016. Applicant: Takahiro Shichino.

(Continued)

*Primary Examiner* — Jared Fureman
*Assistant Examiner* — Emmanuel Dominique
(74) *Attorney, Agent, or Firm* — Venable LLP

(57) ABSTRACT

In a power transfer system, a power transmitting apparatus includes: power transmission means for wirelessly transmitting power to a power receiving apparatus disposed within a predetermined power transmission range; transmission means for transmitting a power transmitting apparatus identifier unique to the power transmitting apparatus using a power transmission pulse performed by the power transmission means; and power transmitting apparatus communication means for communicating wirelessly with the power receiving apparatus, and a power receiving apparatus includes: power receiving means for receiving power wirelessly from the power transmitting apparatus; extracting means for extracting the power transmitting apparatus identifier from the power transmission pulse received by the power receiving means; and power receiving apparatus communication means for communicating wirelessly with a power transmitting apparatus that transmits a communication packet containing the power transmitting apparatus identifier extracted by the extracting means.

22 Claims, 36 Drawing Sheets

(51) Int. Cl.
*H02J 50/12* (2016.01)
*H02J 50/60* (2016.01)
*H02J 50/90* (2016.01)
*H02J 7/02* (2016.01)
*H04B 5/00* (2006.01)

(52) U.S. Cl.
CPC .............. *H02J 50/60* (2016.02); *H02J 50/90* (2016.02); *H04B 5/0037* (2013.01)

(58) Field of Classification Search
CPC ..... H02J 17/00; H04B 5/0081; H04B 5/0031; H04B 5/0037
See application file for complete search history.

(56) References Cited

U.S. PATENT DOCUMENTS

| | | | |
|---|---|---|---|
| 8,928,182 B2 | 1/2015 | Kurata et al. | |
| 9,071,057 B2 | 6/2015 | Jung | |
| 9,124,114 B2 | 9/2015 | Haruyama | |
| 9,583,964 B2 | 2/2017 | Murayama et al. | |
| 2008/0200119 A1 | 8/2008 | Onishi et al. | |
| 2009/0212736 A1* | 8/2009 | Baarman | H02J 7/0004 320/106 |
| 2010/0207771 A1* | 8/2010 | Trigiani | B60L 11/1816 340/636.1 |
| 2011/0127848 A1* | 6/2011 | Ryu | H02J 5/005 307/104 |
| 2012/0056485 A1* | 3/2012 | Haruyama | H02J 5/005 307/104 |
| 2012/0091989 A1* | 4/2012 | Uramoto | H02J 5/005 324/76.11 |
| 2012/0161538 A1* | 6/2012 | Kinoshita | H02J 17/00 307/104 |
| 2012/0193993 A1* | 8/2012 | Azancot | H02J 5/005 307/104 |
| 2012/0217819 A1 | 8/2012 | Yamakawa et al. | |
| 2012/0256495 A1 | 10/2012 | Yudai | |
| 2012/0288019 A1* | 11/2012 | Okamura | H02J 5/005 375/259 |
| 2013/0058380 A1 | 3/2013 | Yun | |
| 2013/0062959 A1 | 3/2013 | Douglas | |
| 2013/0154558 A1* | 6/2013 | Lee | H04B 5/0037 320/108 |
| 2013/0170483 A1 | 7/2013 | Shichino | |
| 2013/0257364 A1* | 10/2013 | Redding | H02J 5/005 320/108 |
| 2013/0293028 A1 | 11/2013 | Byun et al. | |
| 2014/0239735 A1 | 8/2014 | Abe et al. | |
| 2014/0375138 A1* | 12/2014 | Sako | H02J 7/0027 307/104 |
| 2015/0097433 A1 | 4/2015 | Shichino | |
| 2016/0006263 A1 | 1/2016 | Shichino | |
| 2016/0072339 A1 | 3/2016 | Shichino | |
| 2016/0094050 A1 | 3/2016 | Shichino et al. | |
| 2016/0119884 A1 | 4/2016 | Shichino | |
| 2018/0006505 A1* | 1/2018 | Nakano | H02J 50/12 |

FOREIGN PATENT DOCUMENTS

| | | |
|---|---|---|
| EP | 2520759 A1 | 11/2012 |
| EP | 2 546 956 | 1/2013 |
| EP | 2573902 A2 | 3/2013 |
| JP | 2011-045190 A | 3/2011 |
| JP | 2011-152008 A | 8/2011 |
| JP | 2012-060721 A | 3/2012 |
| JP | 2012-110199 A | 6/2012 |
| JP | 2013-027076 A | 2/2013 |
| JP | 2013-059239 A | 3/2013 |
| JP | 2013-099250 A | 5/2013 |
| JP | 2013-128400 A | 6/2013 |
| KR | 2012-0128554 A | 11/2012 |
| WO | 2012/086048 A1 | 6/2012 |
| WO | 2014/089229 A1 | 6/2014 |

OTHER PUBLICATIONS

Chinese Office Action dated Jul. 28, 2017 in Chinese Application No. 201480043200.3.
Japanese Office Action dated Oct. 6, 2017 in Japanese Application No. 2013157119.
Japanese Office Action dated May 19, 2017 in Japanese Application No. 2013-157119.
European Search Report dated Nov. 7, 2019 during prosecution of related European application No. 19189291.8.

* cited by examiner

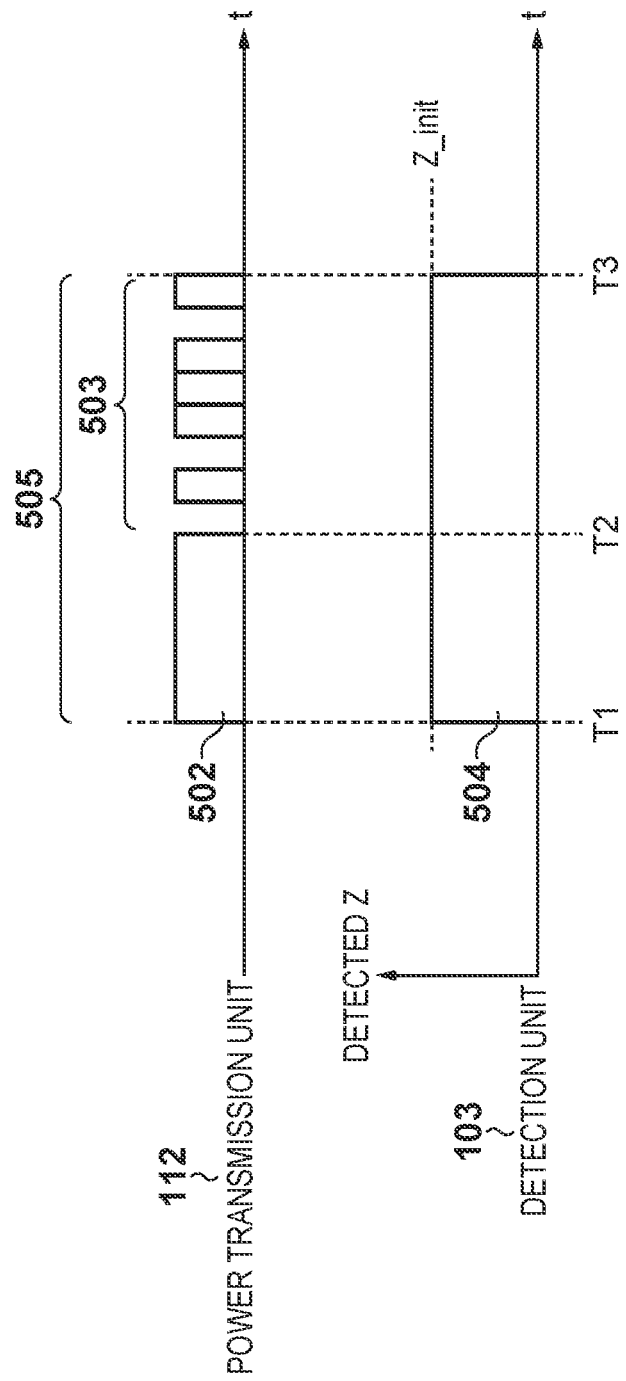

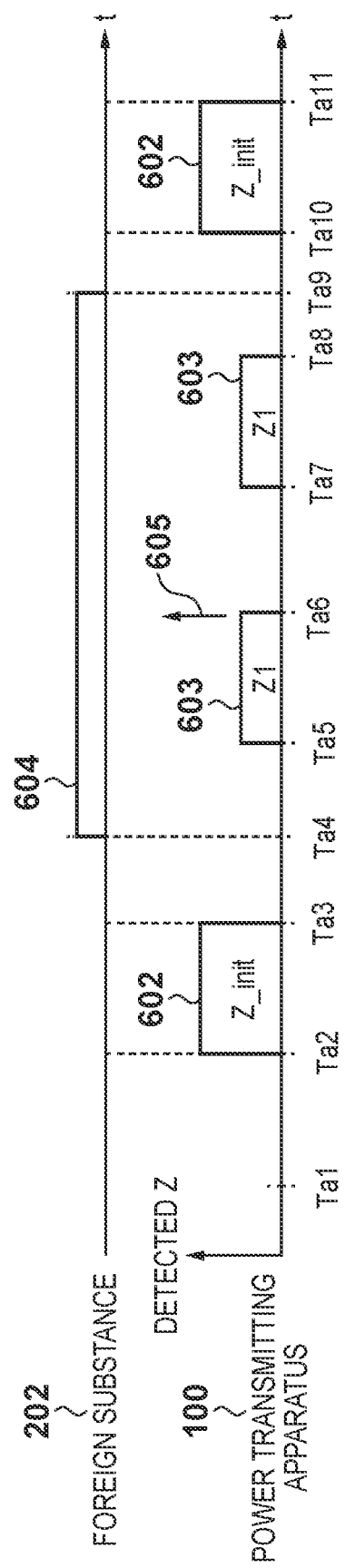

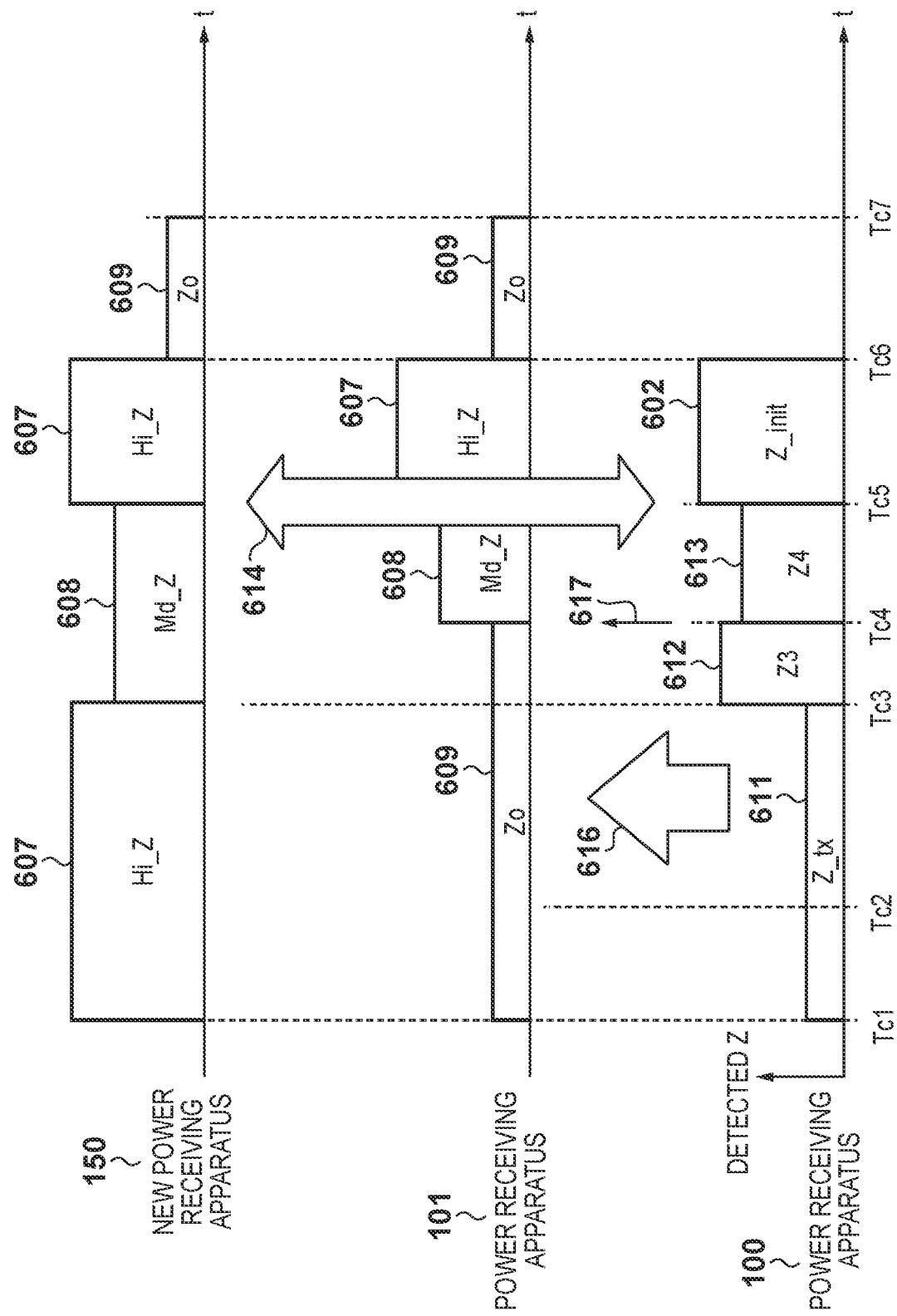

FIG. 7

| | PROHIBIT FLAG (700) | CONFIRM FLAG (701) | POWER TRANSMISSION FLAG (702) | CHANGE FLAG (703) |
|---|---|---|---|---|
| 704 | 0 | 0 | 0 | 0 |
| 705 | 0 | 0 | 0 | 1 |
| 706 | 1 | 0 | 0 | 0 |
| 707 | 1 | 0 | 0 | 1 |
| 708 | 0 | 1 | 0 | 0 |
| 709 | 0 | 0 | 1 | 0 |

FIG. 8

| BT ADDRESS (800) |
|---|
| bb bb bb bb bb bb |
| cc cc cc cc cc cc |

FIG. 9

| | BT ADDRESS (900) | BT ADDRESS (901) | CONNECTION FLAG (902) |
|---|---|---|---|
| 903 | aa aa aa aa aa aa | | 0 |
| 904 | aa aa aa aa aa aa | aa aa aa aa aa aa | 0 |
| 905 | aa aa aa aa aa aa | aa aa aa aa aa aa | 1 |
| 906 | | aa aa aa aa aa aa | 1 |

FIG. 10

| | 1000 | 1001 |
|---|---|---|
| | Z_before | Z_now |
| 1002 | Z_init | Z_init |
| 1003 | Z_init | Z1 |
| 1004 | Z1 | Z1 |
| 1005 | Z1 | Z_init |
| 1006 | Z_init | Z2 |
| 1007 | Z_tx | Z_tx |
| 1008 | Z_tx | Z3 |
| 1009 | Z_init | Z4 |

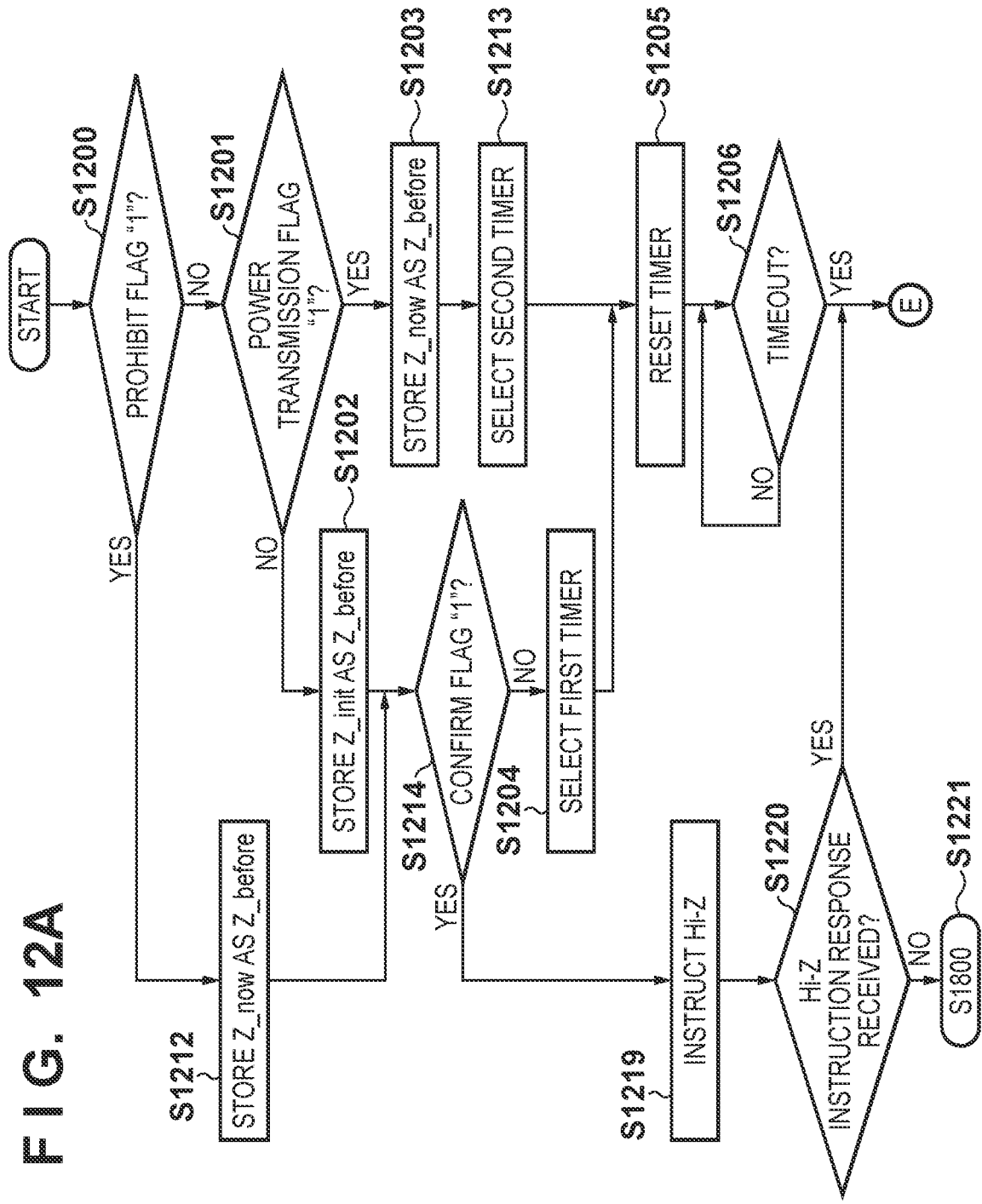

F I G. 16B
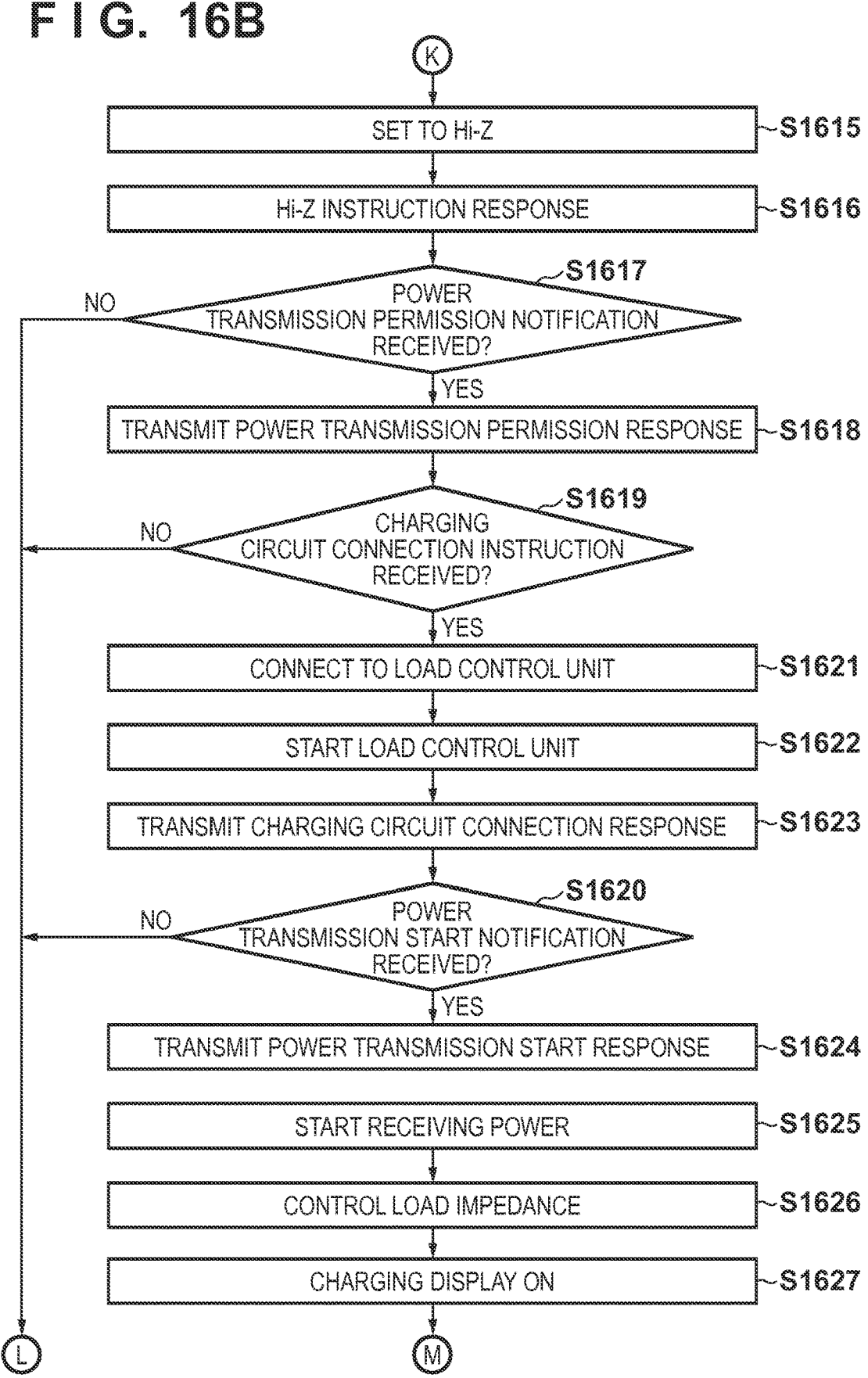

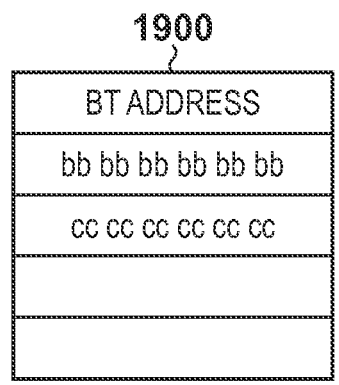
F I G. 19

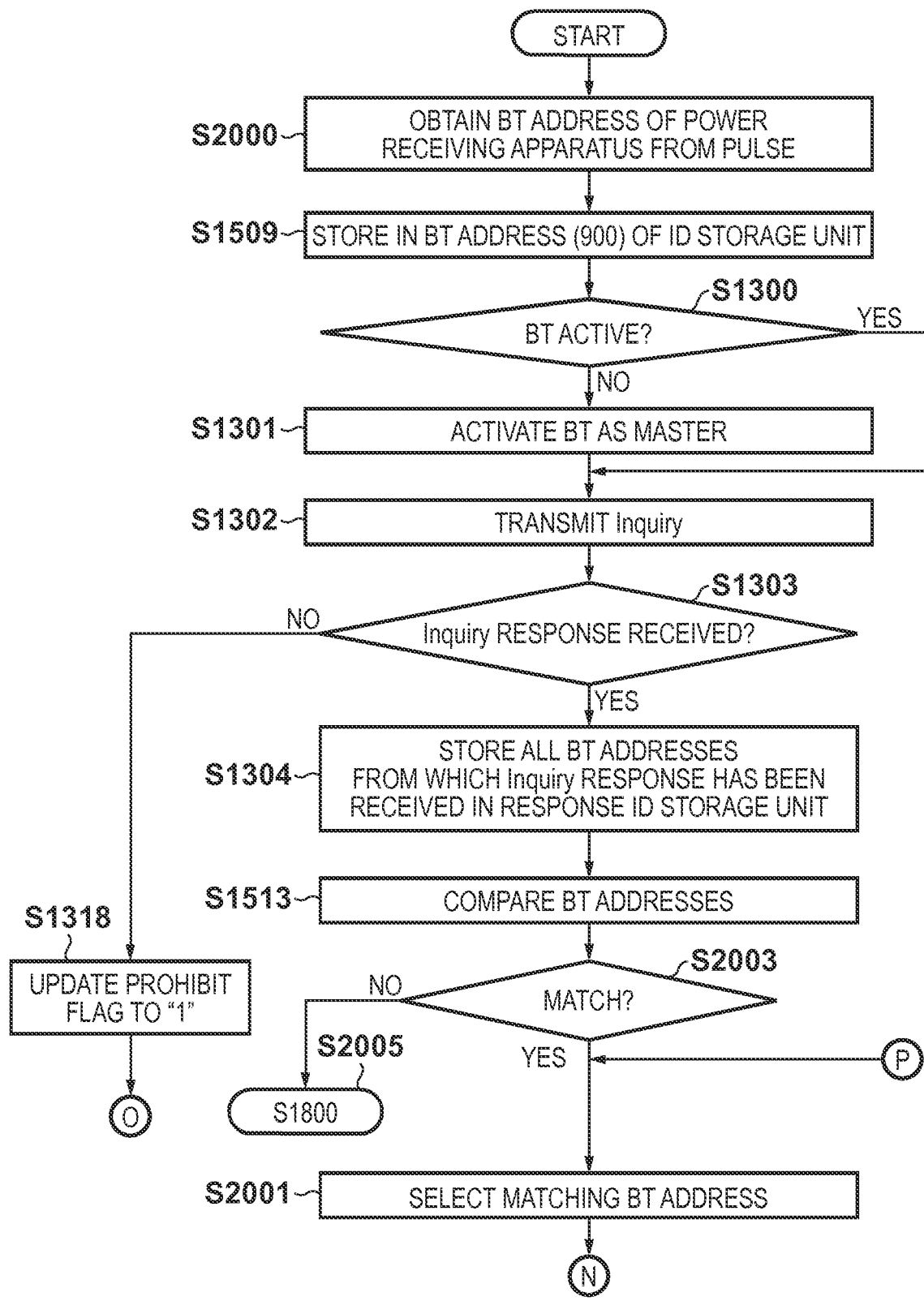
F I G. 20A

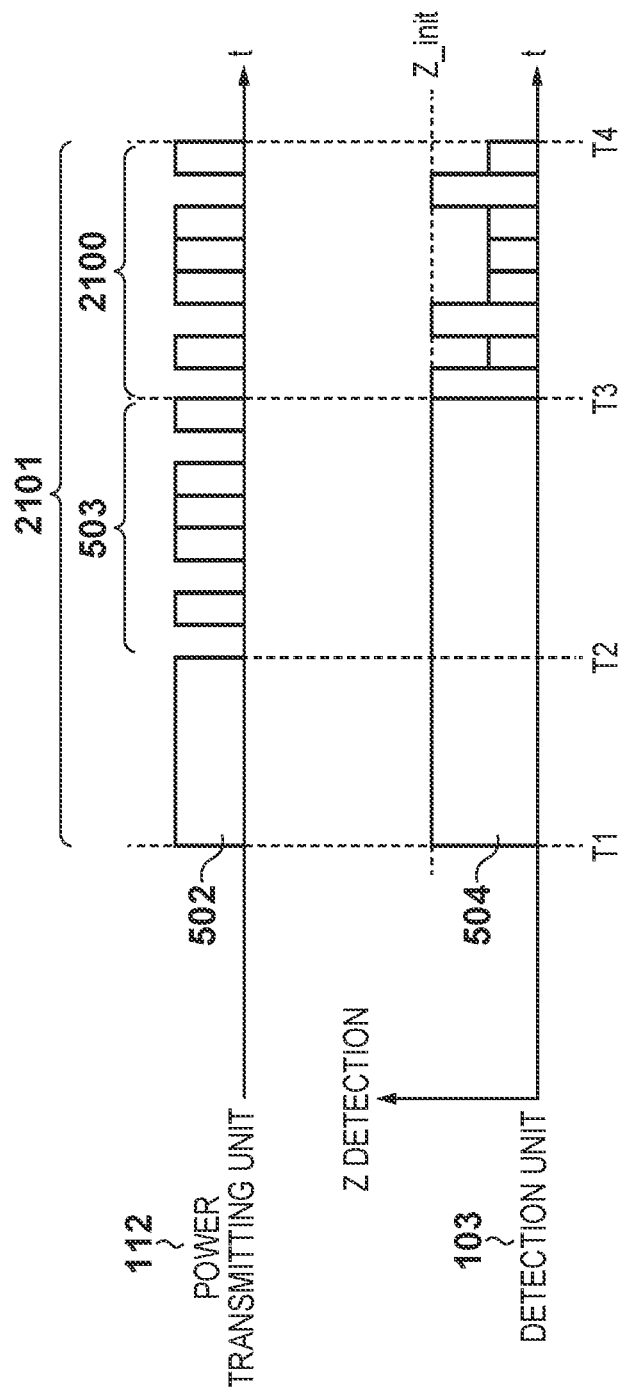

FIG. 24
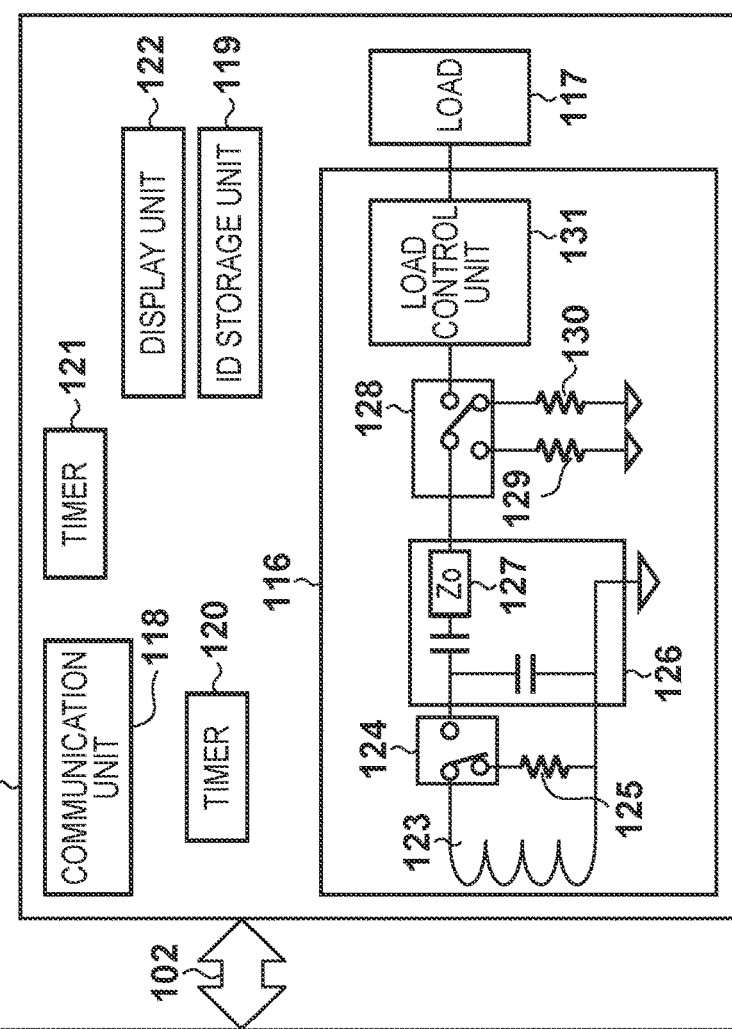
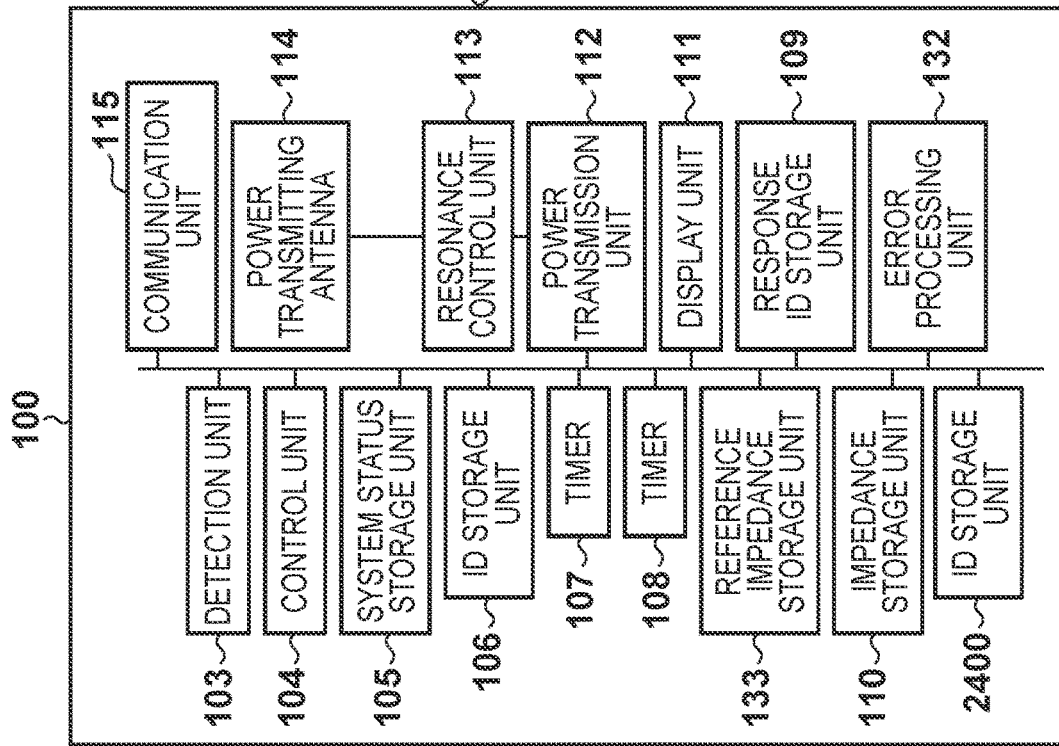

POWER TRANSFER SYSTEM, AND POWER RECEIVING APPARATUS, POWER TRANSMITTING APPARATUS, AND CONTROL METHOD THEREOF

TECHNICAL FIELD

The present invention relates to techniques for transmitting power wirelessly.

BACKGROUND ART

The development of technology for wireless power transfer systems has become widespread in recent years. It is necessary, in a wireless power transfer system, to carry out control for transmitting power correctly to a power receiving apparatus. Accordingly, Japanese Patent Laid-Open No. 2012-110199, for example, proposes a technique for carrying out communication to control power transmission/power reception via dedicated communication units provided separate from a power transmission unit/power receiving unit.

However, according to the technique disclosed in Japanese Patent Laid-Open No. 2012-110199, in the case where the communication unit of the power transmitting apparatus is connected wirelessly to the communication unit of a power receiving apparatus located outside a range in which the power transmitting apparatus can transmit power, there are situations where correct power transmission control cannot be carried out. In other words, there are cases where the power transmitting apparatus starts power transmission despite the power receiving apparatus being unable to receive power due to the power receiving apparatus being located outside the range in which the power transmitting apparatus can transmit power.

SUMMARY OF INVENTION

According to an aspect of the present invention, a power transfer system comprising a power receiving apparatus and a power transmitting apparatus that transmits power wirelessly to the power receiving apparatus, wherein the power transmitting apparatus includes: power transmission means for wirelessly transmitting power to a power receiving apparatus disposed within a predetermined power transmission range; transmission means for transmitting a power transmitting apparatus identifier unique to the power transmitting apparatus using a power transmission pulse performed by the power transmission means; and power transmitting apparatus communication means for communicating wirelessly with the power receiving apparatus, and the power receiving apparatus includes: power receiving means for receiving power wirelessly from the power transmitting apparatus; extracting means for extracting the power transmitting apparatus identifier from the power transmission pulse received by the power receiving means; and power receiving apparatus communication means for communicating wirelessly with a power transmitting apparatus that transmits a communication packet containing the power transmitting apparatus identifier extracted by the extracting means.

According to another aspect of the present invention, a power transfer system comprising a power receiving apparatus and a power transmitting apparatus that transmits power wirelessly to the power receiving apparatus, wherein the power receiving apparatus includes: power receiving means for receiving power wirelessly from the power transmitting apparatus; load modulation means for transmitting a power receiving apparatus identifier unique to the power receiving apparatus to the power transmitting apparatus using load modulation on a power transmission pulse from the power transmitting apparatus; and power receiving apparatus communication means for communicating wirelessly with the power transmitting apparatus, and the power transmitting apparatus includes: power transmission means for wirelessly transmitting power to a power receiving apparatus disposed within a predetermined power transmission range; detection means for detecting the power receiving apparatus identifier from the load-modulated power transmission pulse; and power transmitting apparatus communication means for communicating wirelessly with a power receiving apparatus that transmits a communication packet containing the power receiving apparatus identifier detected by the detection means.

According to still another aspect of the present invention, a power receiving apparatus comprises: power receiving means for receiving power wirelessly from the power transmitting apparatus; extracting means for extracting, from a power transmission pulse received by the power receiving means from the power transmitting apparatus, a power transmitting apparatus identifier, unique to the power transmitting apparatus, that has been embedded in the power transmission pulse by the power transmitting apparatus; and communication means for communicating wirelessly with a power transmitting apparatus that transmits a communication packet containing the power transmitting apparatus identifier extracted by the extracting means.

According to yet another aspect of the present invention, a power transmitting apparatus comprises: power transmission means for communicating wirelessly with a power receiving apparatus; extracting means for extracting a power receiving apparatus identifier, unique to the power receiving apparatus, that has been embedded in the power transmission pulse from the power transmission means through load-modulation by the power receiving apparatus, from the load-modulated power transmission pulse; and communication means for communicating wirelessly with a power receiving apparatus that transmits a communication packet containing the power receiving apparatus identifier extracted by the extracting means.

According to still yet another aspect of the present invention, a control method for a power receiving apparatus including power receiving means that receives power wirelessly from a power transmitting apparatus and communication means that communicates wirelessly with the power transmitting apparatus, the method comprises: extracting step of extracting, from a power transmission pulse received by the power receiving means from the power transmitting apparatus, a power transmitting apparatus identifier, unique to the power transmitting apparatus, that has been embedded in the power transmission pulse by the power transmitting apparatus; and communication step of communicating wirelessly, via the communication means, with a power transmitting apparatus that transmits a communication packet containing the power transmitting apparatus identifier extracted in the extracting step.

According to yet still another aspect of the present invention, a control method for a power transmitting apparatus including power transmission means that transmits power wirelessly to a power receiving apparatus and communication means that communicates wirelessly with the power receiving apparatus, the method comprises: extracting step of extracting a power receiving apparatus identifier, unique to the power receiving apparatus, that has been embedded in the power transmission pulse from the power transmission means through load-modulation by the power receiving apparatus, from the load-modulated power transmission pulse; and communication step of communicating wirelessly, via the communication means, with a power receiving apparatus that transmits a communication packet containing the power receiving apparatus identifier extracted in the extracting step.

The present invention provides a technique that enables more favorable power transmission control in a power transfer system.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a timing chart illustrating operations of a power transmission unit and a detection unit.

FIGS. 6A to 6C are timing charts illustrating operations of a power transmitting apparatus.

FIG. 7 is a diagram illustrating an example of flags stored in a system status storage unit.

FIG. 8 is a diagram illustrating an example of information stored in an ID storage unit of the power transmitting apparatus.

FIG. 9 is a diagram illustrating an example of information stored in an ID storage unit of a power receiving apparatus.

FIG. 10 is a diagram illustrating an example of information stored in an impedance storage unit.

FIGS. 12A and 12B are a flowchart illustrating operations performed by the detection unit.

FIGS. 16A to 16C are a flowchart illustrating operations performed by a communication unit of the power receiving apparatus.

FIG. 19 is a diagram illustrating an example of information stored in a response ID storage unit.

FIGS. 20A and 20B are a flowchart illustrating operations performed by the communication unit of the power transmitting apparatus according to a first variation.

FIG. 21 is a timing chart for the power transmission unit and the detection unit of the power transmitting apparatus according to the first variation.

FIG. 24 is a diagram illustrating the overall configuration of a power transfer system according to the first variation.

DESCRIPTION OF EMBODIMENTS

Hereinafter, exemplary preferred embodiments of the present invention shall be described in detail with reference to the diagrams. However, it should be noted that the following embodiments are to be taken as examples only; the scope of the present invention is not intended to be limited by the individual embodiments described hereinafter.

First Embodiment

A wireless power transfer system including a power transmitting apparatus 100 that transmits power wirelessly and a power receiving apparatus 101 will be described below as an example of a first embodiment of a power transfer system according to the present invention.

Apparatus Configuration

Figure 1:
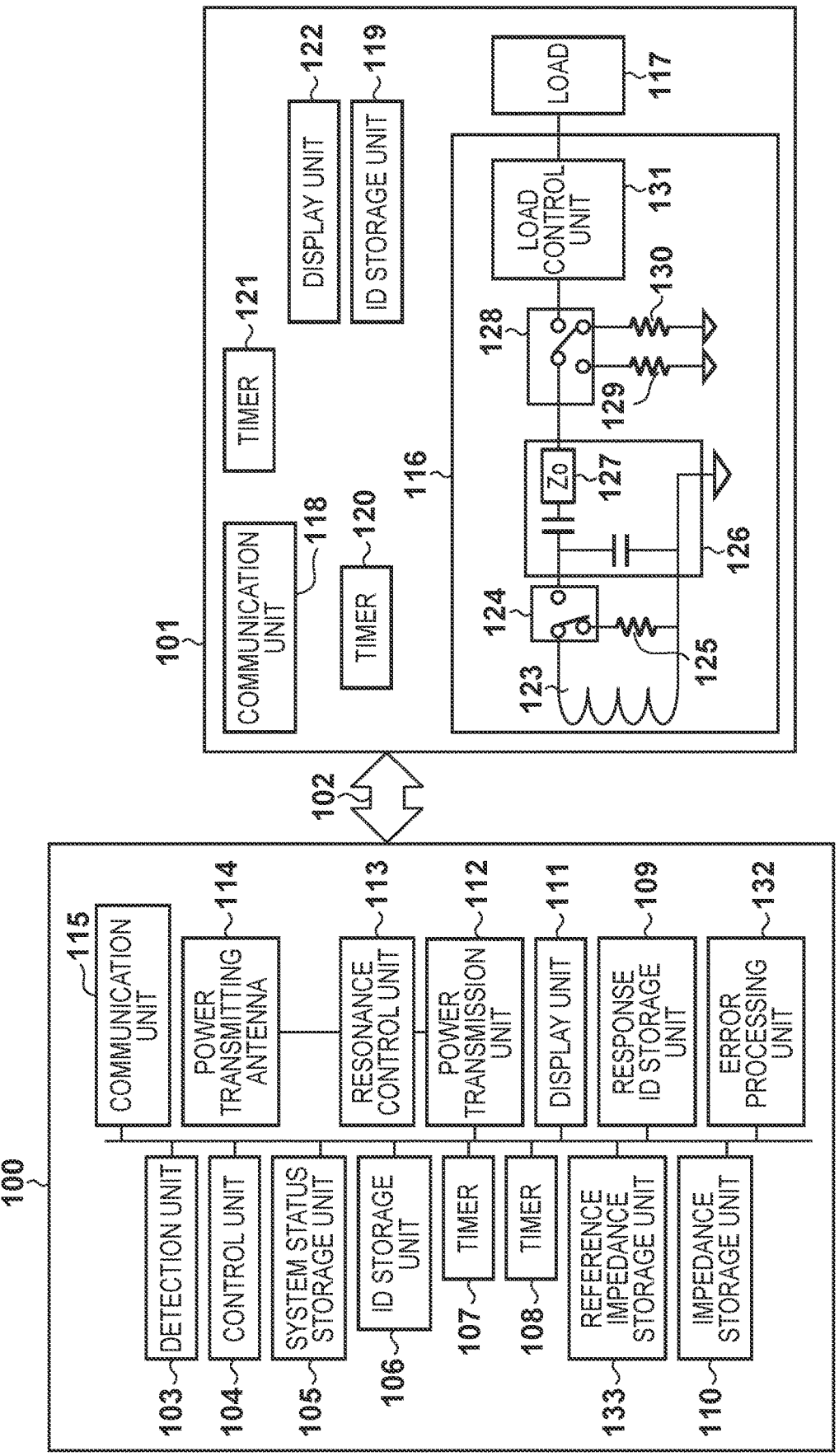
FIG. 1 is a diagram illustrating the overall configuration of a power transfer system according to a first embodiment.

FIG. 1 is a diagram illustrating the overall configuration of the power transfer system according to the first embodiment. The power transmitting apparatus 100 and the power receiving apparatus 101 transfer power over a medium 102. Although details will be given later, the power transmitting apparatus 100 and the power receiving apparatus 101 exchange, via communication units provided in the respective apparatuses, control information that is used to control the transmission of power between a power transmitting antenna 114 and a power receiving antenna 123. The following descriptions assume that the power transfer uses electromagnetic waves at a frequency of 6.78 MHz, and that the communication units communicate through the Bluetooth (registered trademark) standard (called simply "BT" hereinafter), which employs electromagnetic waves in the 2.4 GHz band.

First, the configuration of the power transmitting apparatus 100 will be described. A detection unit 103 is a functional unit that detects the output impedance of a DC voltage source 401 in a class E amplifier that configures a power transmission unit 112 (this will be referred to as "Z detection" hereinafter), and will be described in detail later. A control unit 104 is a functional unit that controls the power transmitting apparatus 100 as a whole, and will be described in detail later. A system status storage unit 105 is a functional unit that stores a status of the power transfer system, and will be described in detail later with reference to FIG. 7. An ID storage unit 106 is a functional unit that stores an identifier (ID) of the power receiving apparatus 101, and will be described in detail later with reference to FIG. 8.

A first timer 107 and a second timer 108 are timers that are used selectively in accordance with the system status, and will be described in detail later. An impedance storage unit 110 stores a result of the detection performed by the detection unit 103. A display unit 111 displays a system error status. The power transmission unit 112 supplies power, which is to be transferred over the medium 102, to the power transmitting antenna 114. The power transmitting antenna 114 is an antenna that primarily emits a magnetic field, and will be described here as a spiral-shaped antenna as one example. The power transmission unit 112 will be described as being configured of a class E amplifier. A resonance control unit 113 is a functional unit that controls the characteristic impedance of a transfer path configured of the power transmitting antenna 114, the power receiving antenna 123, and the medium 102.

A communication unit 115 (a power transmitting apparatus communication means) is a functional unit for sending and receiving control signals regarding the power between the power transmitting antenna 114 and the power receiving antenna 123, via a communication antenna (not shown). A reference impedance storage unit 133 is a functional unit that stores impedance serving as a reference when detecting a foreign substance or the power receiving apparatus. Meanwhile, as described above, the communication unit 115 is a communication unit compliant with the BT standard, and it is assumed that a BT address of the communication unit 115 is "aa aa aa aa aa aa". Furthermore, the communication unit 115 is assumed here to function as the master in the BT relationship.

Although details will be given later, the power transmitting apparatus 100 is configured to use Service Discovery Protocol (SDP) to announce services it provides to devices in the vicinity. It is assumed here that the power transmitting apparatus announces the provision of a service named "wireless charger" as a service it provides. Note that an authentication code called a "PIN code" is employed in authentication processes in the BT standard. It is furthermore assumed that the PIN code is shared between the power transmitting apparatus 100, which can provide the wireless charger service, and a power receiving apparatus that can utilize the wireless charger service (details of this will be given later).

A response ID storage unit 109 is a functional unit that stores a BT address of a device that has made an Inquiry response message in response to an Inquiry message, which is one type of query message (packet) in the BT standard and that has been sent by the communication unit 115. An error processing unit 132 is a functional unit that carries out processing when the power transmitting apparatus 100 prohibits power transmission, and will be described in detail later with reference to FIG. 14.

Next, the configuration of the power receiving apparatus 101 will be described. A power receiving unit 116 is a functional unit that receives power transmitted by the power transmitting apparatus 100. A load 117 refers to the concept of a circuit that consumes the power received by the power receiving unit 116, and is assumed here to be configured of a charging circuit and a battery. A communication unit 118 (a power receiving apparatus communication means) is compliant with the BT standard in the same manner as the communication unit 115 of the power transmitting apparatus 100, and the BT address of the communication unit 118 is assumed to be "bb bb bb bb bb bb". The power receiving apparatus 101 is assumed here to function as the slave in the BT relationship. An ID storage unit 119 is a functional unit that stores a BT address received by the power receiving antenna 123 and a BT address received by the communication unit 115, and will be described in detail later. Operations performed by a third timer 120 and a fourth timer 121 will be described later.

A display unit 122 is a functional unit that displays a charging status and error information of the wireless power transfer system. A power receiving antenna is a functional unit for electromagnetically coupling with the power transmitting antenna 114 and receiving power. A switching unit 124 is a functional unit for connecting the power receiving antenna to a resonating circuit 126 or a high resistance 125.

The high resistance 125 is a constant resistance of approximately several megaohms, for example, and is a unit for setting an impedance of the power receiving antenna 123 as viewed from the power transmitting antenna 114 to a high impedance (called "Hi-Z" hereinafter) by connecting the power receiving antenna 123 and the high resistance 125. Note that setting to Hi-Z results in almost no current flowing through the power receiving antenna 123.

The resonating circuit 126 is a functional unit that causes a power transfer path to resonate at a specific impedance. Here, the power transfer path is configured of the resonance control unit 113, the power transmitting antenna 114, the medium 102 that serves as a transfer path, and the power receiving antenna 123. Note also that a characteristic impedance 127 is not necessarily mounted as an actual component, and indicates that a characteristic impedance of the resonating circuit 126, as viewed from a load switching unit 128, is Zo.

The load switching unit is a functional unit that switches between a matching resistance 130 whose resistance value is approximately equal to Zo, a load control unit 131, and a mid resistance 129. The mid resistance 129 has a lower resistance value than the high resistance 125, but has a higher resistance value than the matching resistance 130. The mid resistance 129 is a unit for setting the impedance of the power receiving antenna 123 as viewed from the power transmitting antenna 114 to a mid impedance that is lower than Hi-Z (called "Md-Z" hereinafter) by connecting to the load switching unit 128. Setting to Md-Z results in an extremely low current flowing through the power receiving antenna 123 and the mid resistance 129. The load control unit 131 is an impedance conversion circuit that operates in order to match a load impedance, which changes based on the amount of power consumed by the load 117, to the characteristic impedance Zo, and is configured of a DC-DC converter or the like. Note that "load impedance" refers to the impedance of the load 117 as viewed from the load control unit 131. The operation of the load control unit 131 ensures that the impedance of the power receiving antenna 123 as viewed from the power transmitting antenna 114 is Zo even if the amount of power consumed by the load 117 has varied. The operation of the load control unit 131 will be called "load impedance control" hereinafter.

Impedance in State in Vicinity of Power Transmission Range

Figure 2:
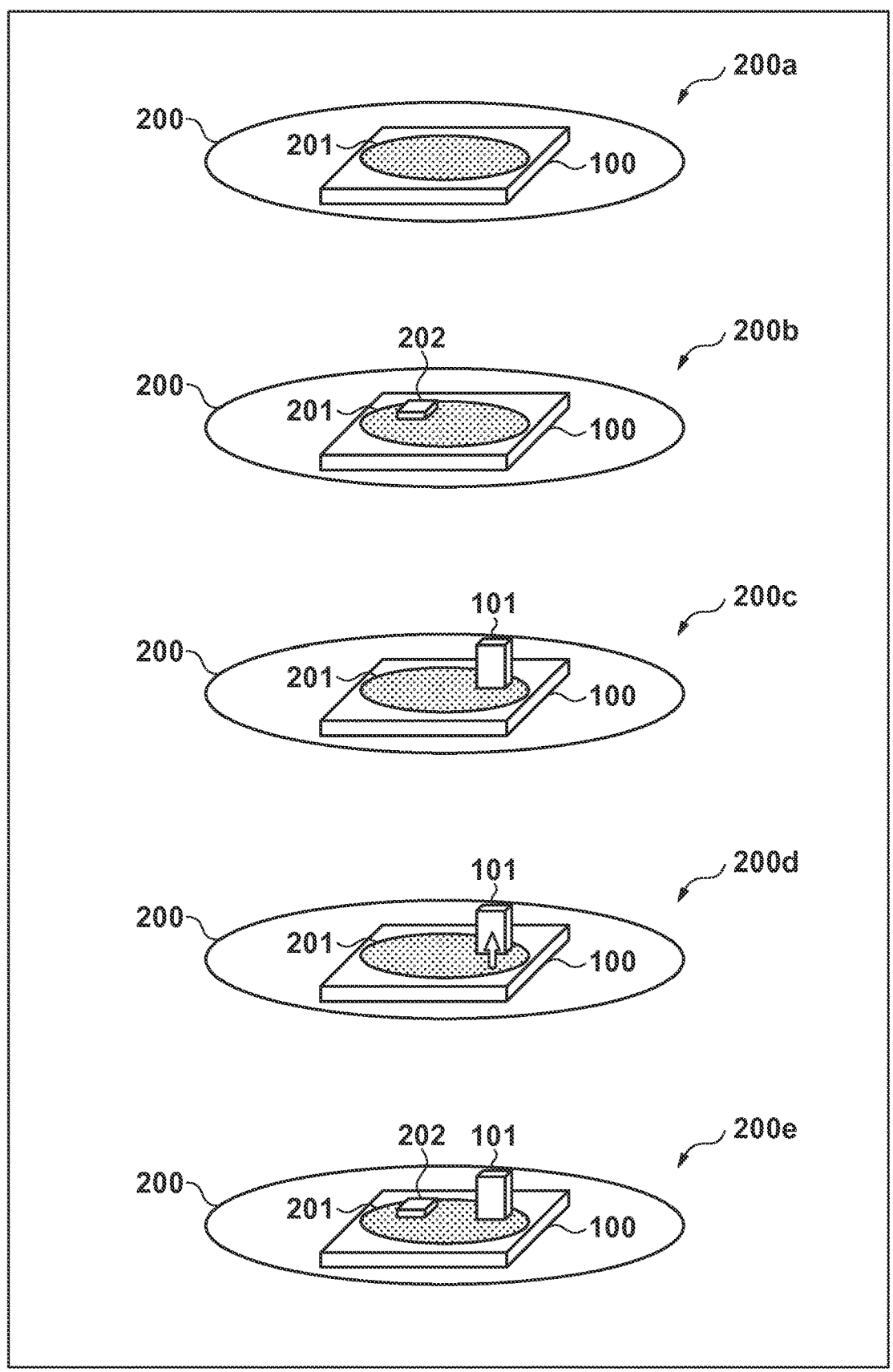
FIG. 2 is a diagram illustrating an example of a state in the vicinity of a power transmission range in the power transfer system.

FIG. 2 is a diagram illustrating an example of a state in the vicinity of a power transmission range in the power transfer system. Note that a communication range 200 indicates a range in which the communication unit 115 of the power transmitting apparatus 100 can communicate. A power transmission range 201 (a predetermined power transmission range) indicates a range in which the power transmitting antenna 114 can transmit power. As shown in FIG. 2, the configuration is such that the communication range 200 is wider than the power transmission range 201, and the communication range 200 contains the entire power transmission range 201.

A state 200a indicates a state in which nothing is placed within the power transmission range 201. In other words, neither the power receiving apparatus 101 nor a foreign substance 202 is present in the power transmission range 201. A state 200b indicates a state in which only the foreign substance 202 is present within the power transmission range 201. A state 200c indicates a state in which only the power receiving apparatus 101 is present within the power transmission range 201. However, in the state 200c, the power transmitting apparatus 100 is not transmitting power to the power receiving apparatus 101. A state 200d is the same as the state 200b in that the power receiving apparatus 101 is present within the power transmission range 201, but differs in that the power transmitting apparatus 100 is transmitting power to the power receiving apparatus 101. Note that an arrow conceptually illustrates the transmission of power. A state 200e indicates a state in which both the power receiving apparatus 101 and the foreign substance 202 are present within the power transmission range 201.

In the case where an object present in the power transmission range 201 is the foreign substance 202 (that is, the state 200b), it is necessary for the power transmitting apparatus 100 to carry out control so as not to transmit power. The specific processing to be carried out by the power transmitting apparatus 100 is as follows.

Determine that the object present in the power transmission range 201 is the foreign substance 202;

determines that a power receiving apparatus is not present in the power transmission range 201; and determine not to transmit power due to the foreign substance 202 being present.

On the other hand, in the case where an object present in the power transmission range 201 is a power receiving apparatus (that is, the state 200c), it is necessary for the power transmitting apparatus 100 to carry out control so as to transmit power. The specific processing to be carried out by the power transmitting apparatus 100 is as follows.

Determine that the object present in the power transmission range 201 is a power receiving apparatus;

determine that the foreign substance 202 is not present in the power transmission range 201; and establishing a BT connection with the power receiving apparatus present in the power transmission range 201.

Furthermore, in the case where both a power receiving apparatus and a foreign substance are present in the power transmission range 201 (that is, the state 200e), it is necessary for the power transmitting apparatus 100 to carry out control so as not to transmit power. The specific processing to be carried out by the power transmitting apparatus 100 is as follows.

Determine that the objects present in the power transmission range 201 are both the foreign substance 202 and the power receiving apparatus 101;

determine not to transmit power due to the foreign substance 202 being present; and notify the power receiving apparatus with which the BT connection is established that power will not be transmitted.

Figure 3:
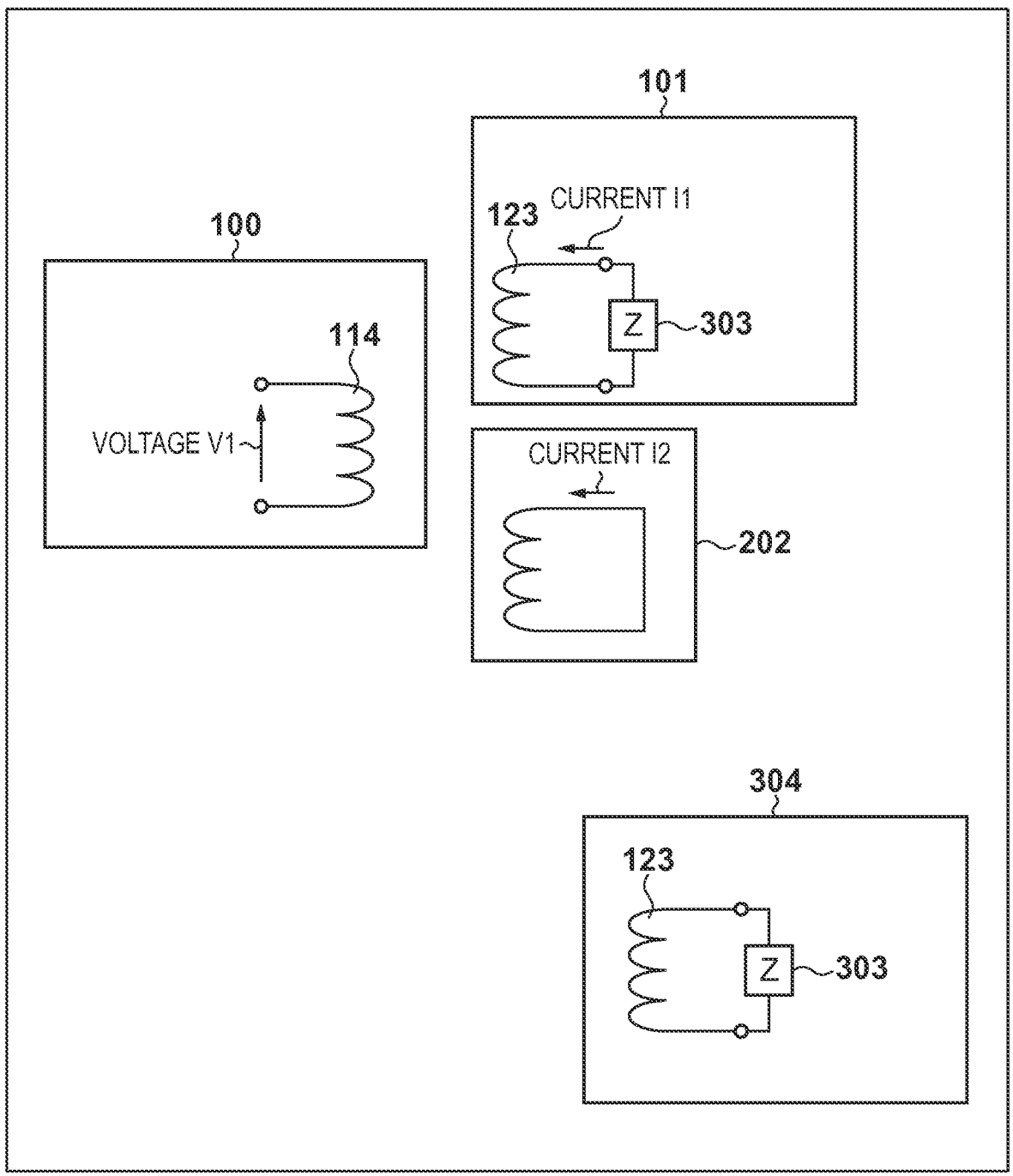
FIG. 3 is a diagram illustrating operations of a detection unit.

FIG. 3 is a diagram illustrating operations of the detection unit. In addition to the power transmitting apparatus 100 and the power receiving apparatus 101, FIG. 3 shows the foreign substance 202 and another power receiving apparatus 304 that is outside the power transmission range 201. A voltage at both ends of the power transmitting antenna 114 is indicated as V1. A current I1 is a current that flows through the power receiving antenna 123, whereas a current I2 is a current that flows through the foreign substance 202. An impedance (Z) 303 is an impedance of the power receiving antenna 123.

The value of the voltage V1 changes depending on the current I1 and the current I2. Accordingly, the voltage V1 in a state where neither the foreign substance 202 nor the power receiving apparatus 101 are present in the power transmission range 201, as in the state 200a, and the voltage V1 in a state where the foreign substance 202 is present in the power transmission range 201, as in the state 200b, have different values. In other words, if the power transmitting apparatus 100 stores the voltage V1 in the state where neither the foreign substance 202 nor the power receiving apparatus 101 are present in the power transmission range 201 (referred to as "V_init" here) in advance, the foreign substance 202 can be detected by detecting the voltage V1 in a state corresponding to the state 200b and comparing that voltage V1 with V_init.

Meanwhile, in the case where the power receiving apparatus 101 is present in the power transmission range 201, as in the state 200c, the voltage V1 has a different value than V_init. In other words, the power transmitting apparatus 100 can detect that the foreign substance 202 or the power receiving apparatus 101 is present in the power transmission range 201 by comparing V_init and the voltage V1.

Incidentally, the magnitude of the current I1 flowing through the power receiving antenna 123 can be controlled by changing the impedance 303. If the impedance 303 is set to Hi-Z (infinite, for example), the current I1 drops to zero. As described earlier, in the case where a power receiving apparatus is present in the power transmission range 201, as in the state 200c, the voltage V1 has a different value than V_init. If the power receiving apparatus sets the impedance 303 to Hi-Z, or in other words, controls the current I1 to zero, the voltage V1 will be equal to V_init.

However, in a state corresponding to the state 200c, although the power transmitting apparatus 100 can detect that the foreign substance 202 or the power receiving apparatus 101 is present in the power transmission range 201 based on changes in the voltage V1, the power transmitting apparatus 100 cannot determine whether the cause of the change is the foreign substance 202 or the power receiving apparatus 101. Here, it is assumed that the power receiving apparatus 101 controls the impedance 303 to Hi-Z. As a result, the current I1 drops to zero and V1 becomes V_init. In the case where V1 is different from V_init, the power transmitting apparatus 100 can determine that the cause of the change is a power receiving apparatus by setting the power receiving apparatus in the power transmission range 201 to Hi-Z and examining changes in V1.

Likewise, in a state corresponding to the state 200e, if the impedance 303 is controlled so that the power receiving apparatus 101 goes to Hi-Z, the voltage V1 will be the same as the voltage V1 in the state 200b (that is, will not be equal to V_init). Accordingly, the power transmitting apparatus 100 can detect that both the foreign substance 202 and the power receiving apparatus 101 are in the power transmission range 201.

Controlling the impedance 303 so that the power receiving apparatus 101 present in the power transmission range 201 goes to Hi-Z is important in both the state 200b and the state 200e. In other words, even if the impedance 303 of the other power receiving apparatus 304 that is not present in the power transmission range 201 has been controlled, the voltage V1 does not change because the power receiving antenna 123 of the power receiving apparatus 304 and the power transmitting antenna 114 are not coupled. In other words, the power transmitting apparatus 100 cannot distinguish between the foreign substance 202 and a power receiving apparatus.

As can be understood from the foregoing descriptions, the following two points are important in a wireless power transfer system.

That the power transmitting apparatus 100 can recognize (specify) the power receiving apparatus 101 present in the power transmission range 201; and that the power transmitting apparatus 100 controls the impedance 303 so that the power receiving apparatus 101 present in the power transmission range 201 goes to Hi-Z.

Meanwhile, if, in the state 200c, the impedance 303 is controlled so that the power receiving apparatus goes to Md-Z, an extremely small current flows through the power receiving antenna 123 and the impedance 303. The power receiving apparatus can detect the power transmitting apparatus 100 by detecting the extremely small current. Note that changes in the voltage V1 can also be expressed as changes in an input impedance of the power transmitting antenna 114 obtained by dividing the voltage V1 by a current flowing through the power transmitting antenna 114 (not shown).

Figure 4:
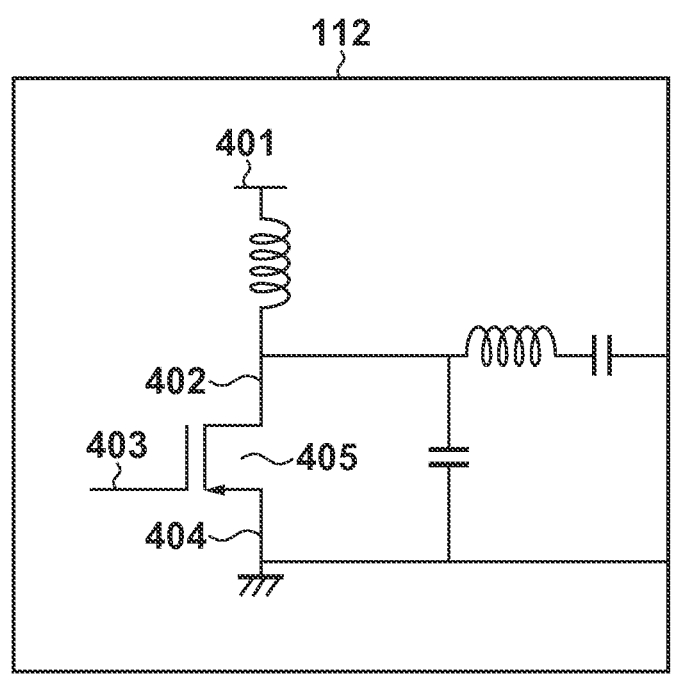
FIG. 4 is a diagram illustrating an example of the configuration of a class E amplifier.

FIG. 4 is a diagram illustrating an example of the configuration of a class E amplifier that configures the power transmission unit 112 of the power transmitting apparatus 100. The class E amplifier is configured of an N-channel MOSFET 405, two inductors, and two capacitors. 403 represents a gate terminal, 402 a drain terminal, and 404 a source terminal. 401 represents a DC voltage source that is input into the N-channel MOSFET 405. Because the power transmission unit 112 is connected to the power transmitting antenna 114 via the resonance control unit 113, changes in the input impedance of the power transmitting antenna 114 appear as changes in the output impedance of the class E amplifier. Furthermore, changes in the output impedance of the class E amplifier appear as changes in the output impedance of the DC voltage source 401.

In other words, the power transmitting apparatus 100 stores, in advance as Z_init, the output impedance of the DC voltage source 401 in a state corresponding to the state 200a, or in other words, in a state where neither the power receiving antenna 123 coupled with the power transmitting antenna 114 nor the foreign substance 202 is present. Accordingly, the foreign substance 202 or a power receiving apparatus can be detected based on changes in the impedance. Here, the output impedance of the DC voltage source 401 in a state corresponding to the state 200a is expressed as Z_init. The power transmitting apparatus 100 stores Z_init in the reference impedance storage unit 133.

Descriptions will now be given regarding the applications of the three impedance values (Hi-Z, Md-Z, and Zo) set as impedances for the power receiving apparatus 101.

Hi-Z is an impedance value used for detecting power receiving apparatuses. As mentioned earlier, although the power transmitting apparatus 100 can detect that at least one of the foreign substance 202 and the power receiving apparatus 101 is present in the power transmission range 201 by detecting changes in the output impedance of the DC voltage source 401, the power transmitting apparatus 100 cannot identify which of those items is actually present. Setting the impedance of the power receiving apparatus 101 to Hi-Z at this time enables the power transmitting apparatus 100 to identify that apparatus.

Md-Z is an impedance value used for detecting power transmitting apparatuses. As mentioned earlier, setting the impedance to Md-Z enables the power receiving apparatus 101 to detect the power transmitting apparatus 100. Meanwhile, because the output impedance of the DC voltage source 401 changes due to the extremely small current flowing through the power receiving antenna 123, setting the impedance of the power receiving apparatus 101 to Md-Z also enables the power transmitting apparatus 100 to detect the power receiving apparatus 101.

Zo is an impedance value used when deriving a transmission efficiency. In the case where the transmission efficiency is low between the power transmitting antenna 114 and the power receiving antenna 123 (for example, is less than a predetermined threshold), it is preferable not to transmit power. Accordingly, it is desirable to calculate the transmission efficiency between the power transmitting antenna 114 and the power receiving antenna 123 before the power transmitting apparatus 100 starts transmitting power to the power receiving apparatus 101. However, at Hi-Z and Md-Z, impedance matching cannot be achieved between the power receiving antenna and the load, resulting in high levels of reflection, which in turn makes it impossible to accurately calculate the transmission efficiency between the power transmitting antenna 114 and the power receiving antenna 123. Accordingly, when deriving the transmission efficiency, the impedance of the power receiving apparatus 101 is set to Zo so as to enable matching with the output impedance Zo of the power receiving antenna 123. Of course, the impedance of the power receiving apparatus 101 is set to Zo when receiving power from the power transmitting apparatus 100 as well, in order to improve the transmission efficiency.

Operation of Power Transmission Unit and Detection Unit of Power Transmitting Apparatus FIG. 5 is a timing chart illustrating operations of the power transmission unit and the detection unit. Timing charts for the power transmission unit 112 and the detection unit 103 are shown here, with the horizontal axis representing time. The power transmission unit 112 transmits a small amount of power 502 via the power transmitting antenna 114 from time T1 to time T2, and transmits a BT address 503 that is an address (power transmitting apparatus identifier) unique to the communication unit 115 from time T2 to time T3.

From time T1 to T3, the detection unit 103 detects the impedance of the DC voltage source 401 through pulsed power transmission (a predetermined detection signal). A square 504 indicates that the detection unit 103 is carrying out Z detection. FIG. 5 indicates that Z detection 504 executed by the detection unit 103 from time T1 to T3 results in an impedance of Z_init. Note that 505, which represents a combination of the small amount of power 502 and the BT address 503, will be referred to as a "pulse" hereinafter.

Figure 6B:
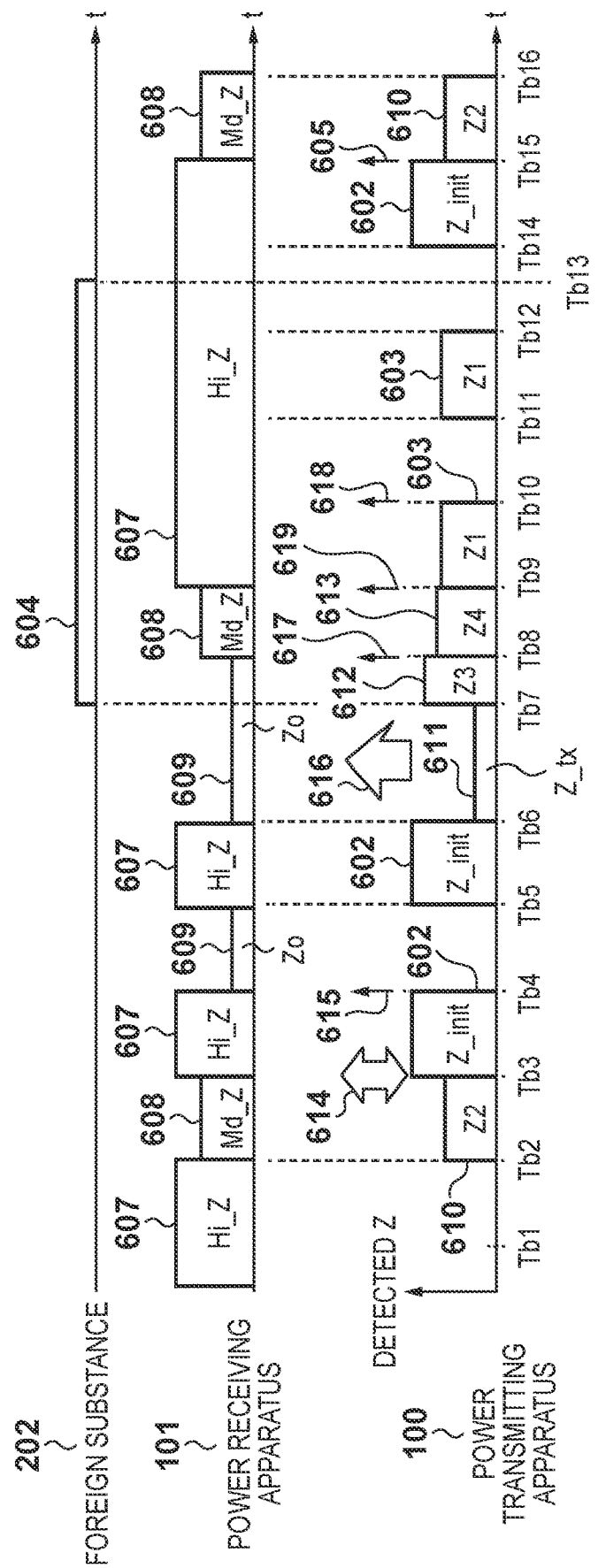

FIGS. 6A to 6C are timing charts illustrating operations of the power transmitting apparatus. Details will be given later. FIG. 6A illustrates a case where only the foreign substance 202 is present within the power transmission range 201. On the other hand, FIG. 6B illustrates a case where both the power receiving apparatus 101 and the foreign substance 202 are present in the power transmission range 201, whereas FIG. 6C illustrates a case where the power receiving apparatus 101 and a power receiving apparatus 150 are present in the power transmission range 201. This will be described in greater detail later.

FIG. 7 is a diagram illustrating an example of flags stored in the system status storage unit. A prohibit flag is set to "1" when the detection unit 103 detects the foreign substance 202 and prohibits the transmission of power, and is set to "0" in other cases. A confirm flag is set to "1" when it is necessary for the detection unit 103 to confirm whether the foreign substance 202 is present in the power transmission range 201, and is set to "0" in other cases. A power transmission flag is set to "1" when the power transmitting apparatus 100 is transmitting power, and it set to "0" when the transmission of power is stopped. A change flag is set to "1" in the case where the detection unit 103 has detected an impedance change and is set to "0" in other cases.

FIG. 8 is a diagram illustrating an example of information stored in the ID storage unit of the power transmitting apparatus. When the power transmitting apparatus 100 has established a BT connection (that is, has carried out authentication and shared an encryption key) with a power receiving apparatus capable of providing the "wireless charger" function, the ID storage unit stores the BT address of that power receiving apparatus. FIG. 8 illustrates a state in which the power transmitting apparatus 100 has established BT connections with a power receiving apparatus whose BT address is "bb bb bb bb bb bb" and a power receiving apparatus whose BT address is "cc cc cc cc cc cc".

FIG. 9 is a diagram illustrating an example of information stored in the ID storage unit of the power receiving apparatus. BT address 900 holds the BT address 503 when the power receiving apparatus 101 has received a pulse through the power receiving antenna 123 and extracted the BT address 503 contained in the pulse. In the case where the power received by the power receiving apparatus 101 has dropped to zero, the power receiving apparatus 101 deletes the BT address 900.

BT address 901 is a BT address of the power transmitting apparatus 100 received by the communication unit 118 of the power receiving apparatus 101 via the communication unit 115 of the power transmitting apparatus 100. When the power receiving apparatus 101 receives the Inquiry message (communication packet), which will be described later, the power receiving apparatus 101 obtains the BT address of the power transmitting apparatus 100 that transmitted the message from header information of the Inquiry message, and holds that BT address as the BT address 901.

A connection flag 902 is set to "1" when a BT connection is established with the power transmitting apparatus 100 corresponding to the BT addresses held in BT address 900 and BT address 901, and is set to "0" in other cases.

Although details will be given later, the power receiving apparatus 101 is configured to connect to the power transmitting apparatus 100 in the case where the power receiving apparatus 101 itself is present within the power transmission range 201 of the power transmitting apparatus 100.

In a record 903, the BT address of the power transmitting apparatus 100 is held in BT address 900, BT address 901 is blank, and the connection flag is "0". In other words, the power receiving apparatus 101 has received a pulse and can recognize that the power receiving apparatus 101 itself is present in the power transmission range 201 of the power transmitting apparatus 100, but has not received the Inquiry message transmitted by the power transmitting apparatus 100. That is, a BT connection is not established. In this state, the power receiving apparatus 101 is present in the power transmission range 201, and thus a BT connection will be established upon receipt of the Inquiry message.

In a record 904, the BT address of the power transmitting apparatus 100 is held in both BT address 900 and BT address 901, and the connection flag is "0". In other words, the power receiving apparatus 101 recognizes that the power receiving apparatus 101 itself is present in the power transmission range 201 of the power transmitting apparatus 100, and has also received the Inquiry message transmitted by the power transmitting apparatus 100. However, the power receiving apparatus 101 has not yet established a BT connection by carrying out authentication and sharing an encryption key with the power transmitting apparatus 100.

In a record 905, the BT address of the power transmitting apparatus 100 is held in both BT address 900 and BT address 901, and the connection flag is "1". In other words, the power receiving apparatus 101 recognizes that the power receiving apparatus 101 itself is present in the power transmission range 201 of the power transmitting apparatus 100, has received the Inquiry message transmitted by the power transmitting apparatus 100, and has established a BT connection with the power transmitting apparatus 100. In this state, the power receiving apparatus 101 establishes the BT connection after recognizing that the power receiving apparatus 101 itself is present in the power transmission range 201. Accordingly, the power transmitting apparatus 100 recognizes that the power receiving apparatus 101 is present in the power transmission range 201 because the power receiving apparatus 101 has established a BT connection.

In a record 906, BT address 900 is blank, the BT address of the power transmitting apparatus 100 is held in BT address 901, and the connection flag 902 is "1". In other words, the power received by the power receiving apparatus 101 has dropped to zero, and thus the power receiving apparatus 101 deletes the BT address 900, as mentioned earlier. In this state, the power receiving apparatus 101 does not know whether it is present in the power transmission range 201. Accordingly, it is necessary for the power receiving apparatus 101 to receive the pulse, obtain the BT address of the power transmitting apparatus 100, and realize the state indicated in the record 904 in order to recognize that the power receiving apparatus 101 itself is in the power transmission range 201. Note that at this time, it is necessary to ensure that the power transmitting apparatus 100 is not transmitting power.

FIG. 10 is a diagram illustrating an example of information stored in an impedance storage unit. Z_now holds a result of the detection unit 103 carrying out Z_detection. Z_before holds a result of the previous Z_detection. The detection unit 103 determines whether the impedance has changed by comparing Z_now and Z_before.

FIG. 19 is a diagram illustrating an example of information stored in the response ID storage unit. Upon receiving the Inquiry response message, the power transmitting apparatus 100 obtains the BT address of the source of the transmission from the header information of the Inquiry response message and stores that BT address. FIG. 19 illustrates a case where the Inquiry response message has been received from three BT-compliant devices having the BT addresses "cc cc cc cc cc cc", "bb bb bb bb bb bb" and "dd dd dd dd dd dd", respectively.

Figure 11A:
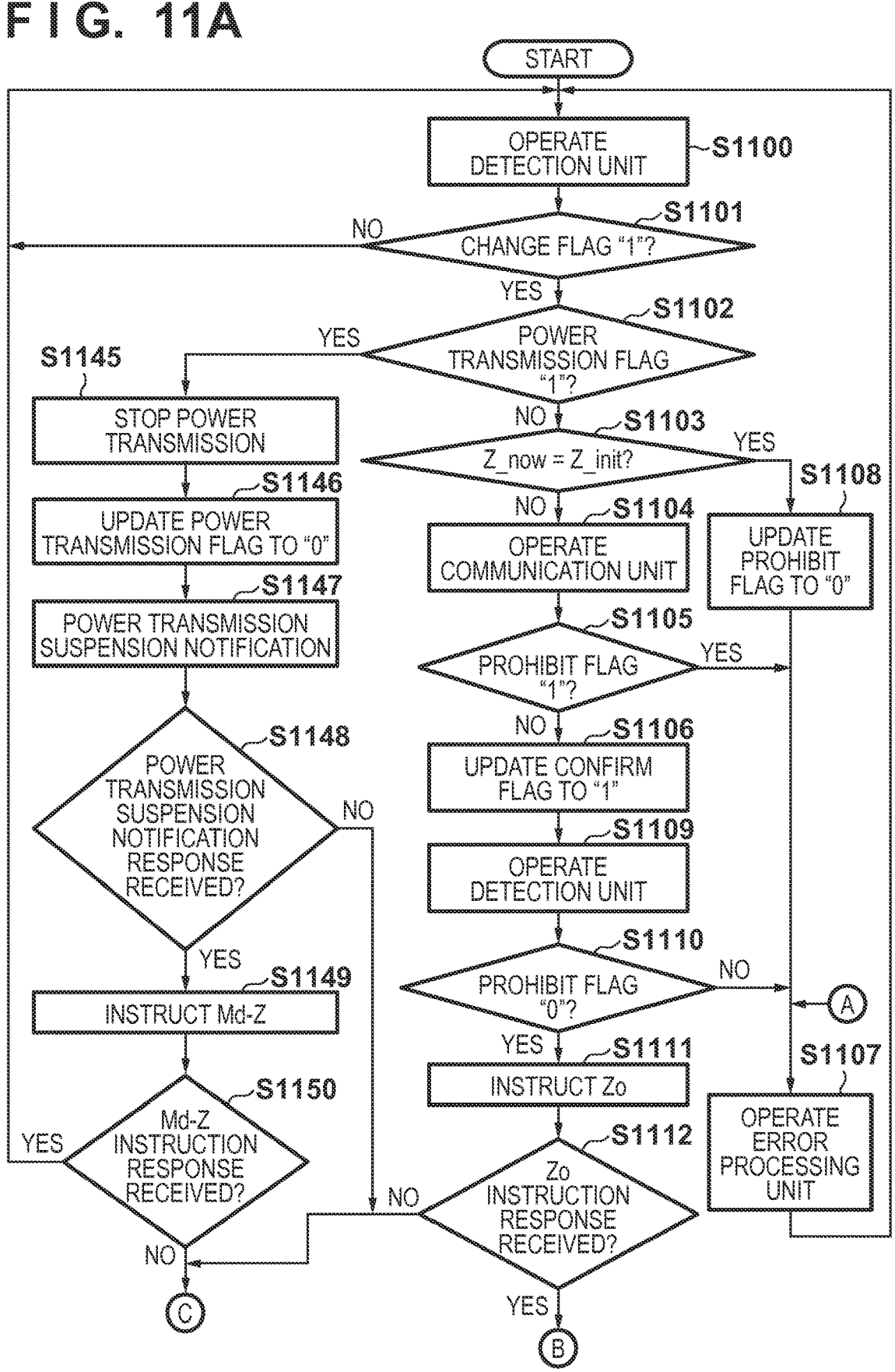
FIGS. 11A to 11C are a flowchart illustrating operations performed by a control unit.
Figure 11B:
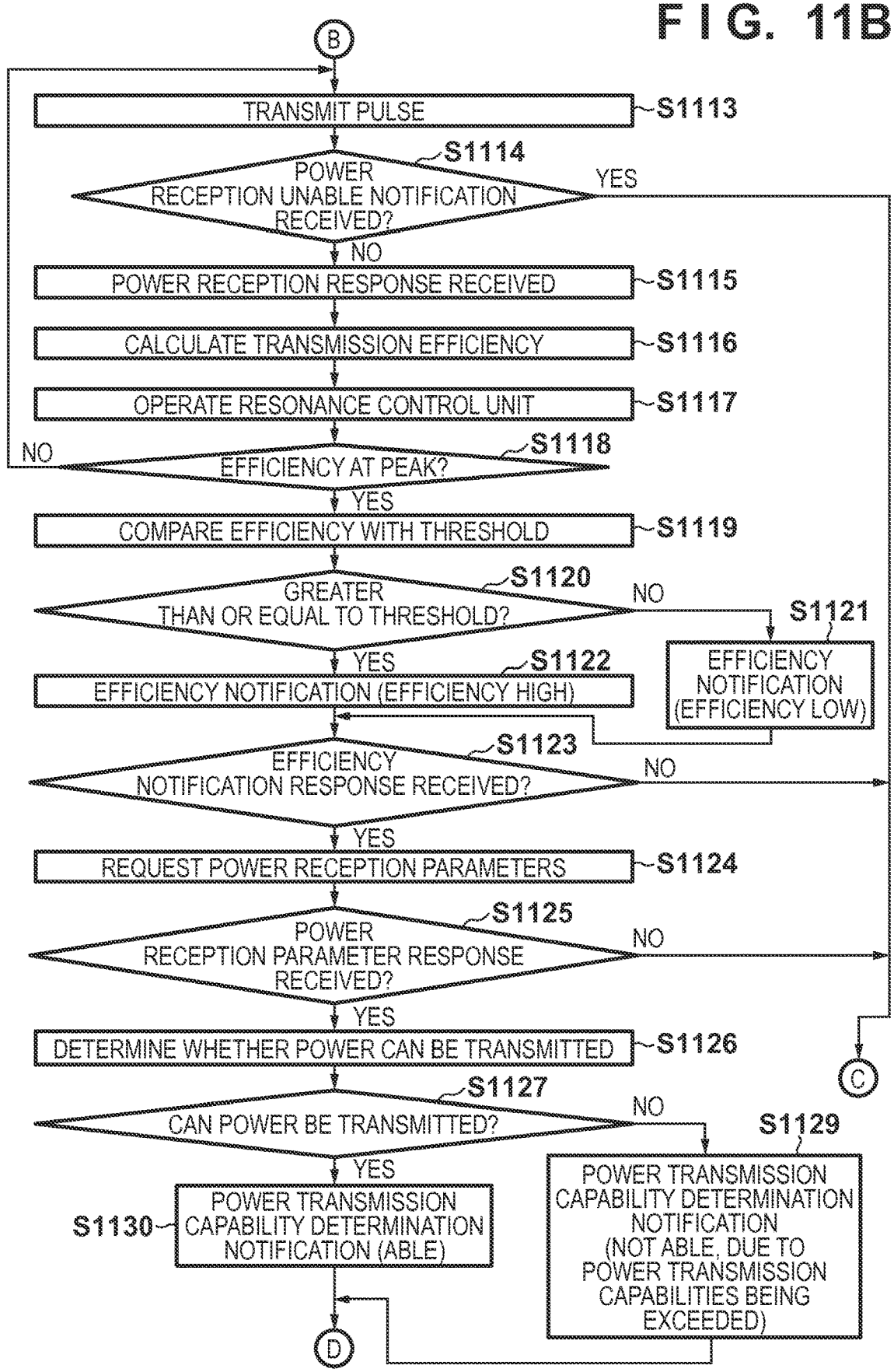
Figure 11C:
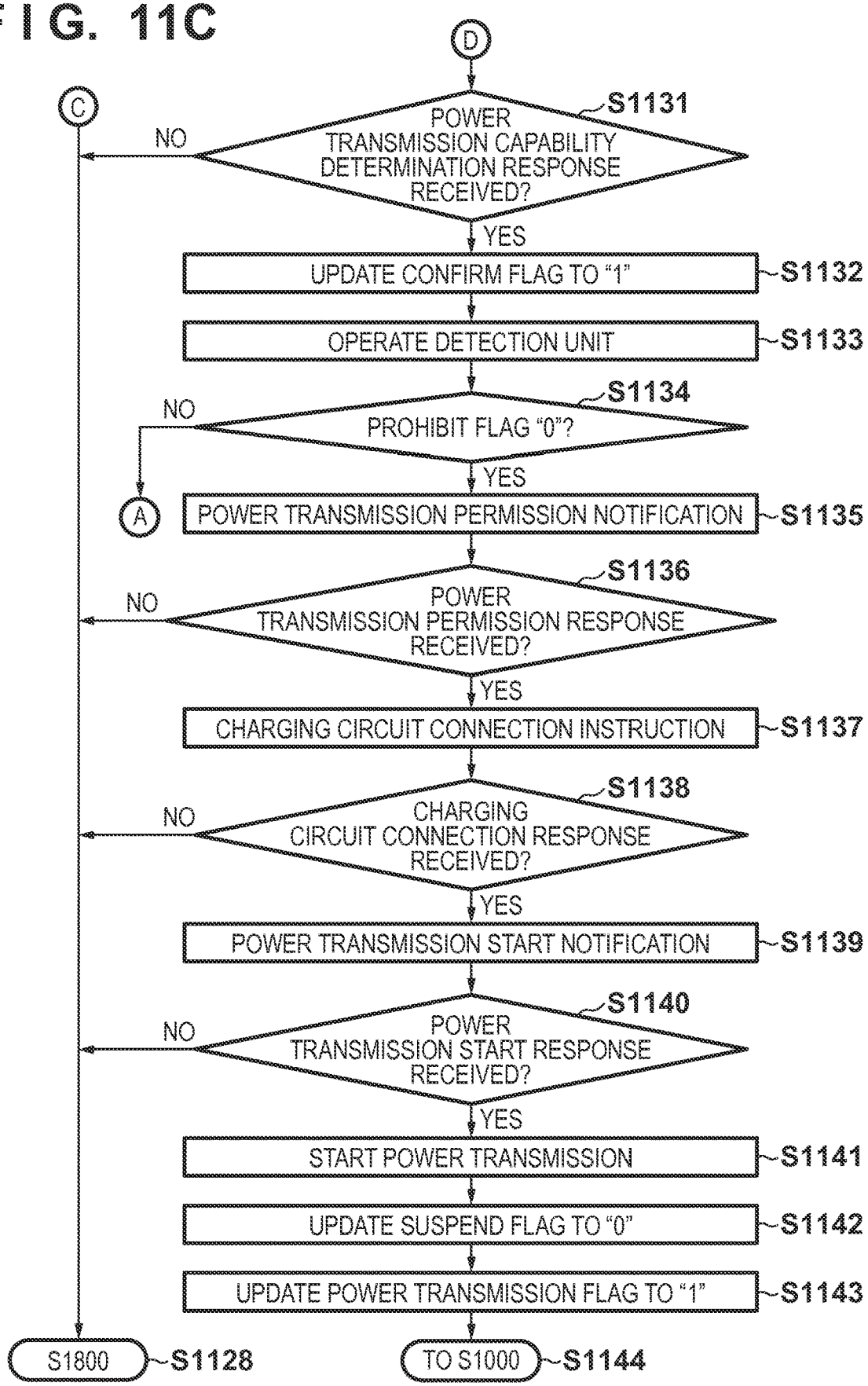
Figure 12B:
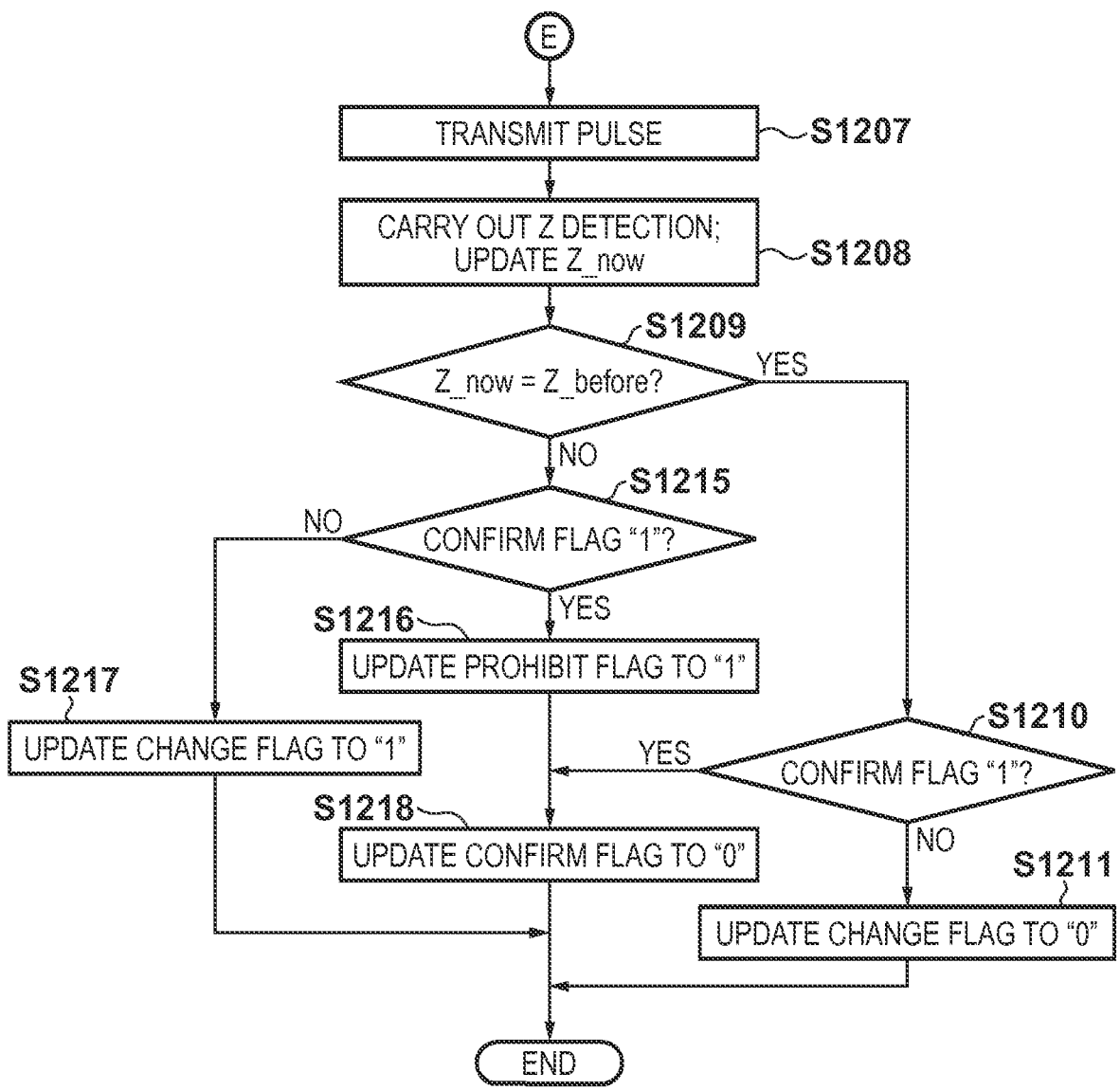
Figure 13A:
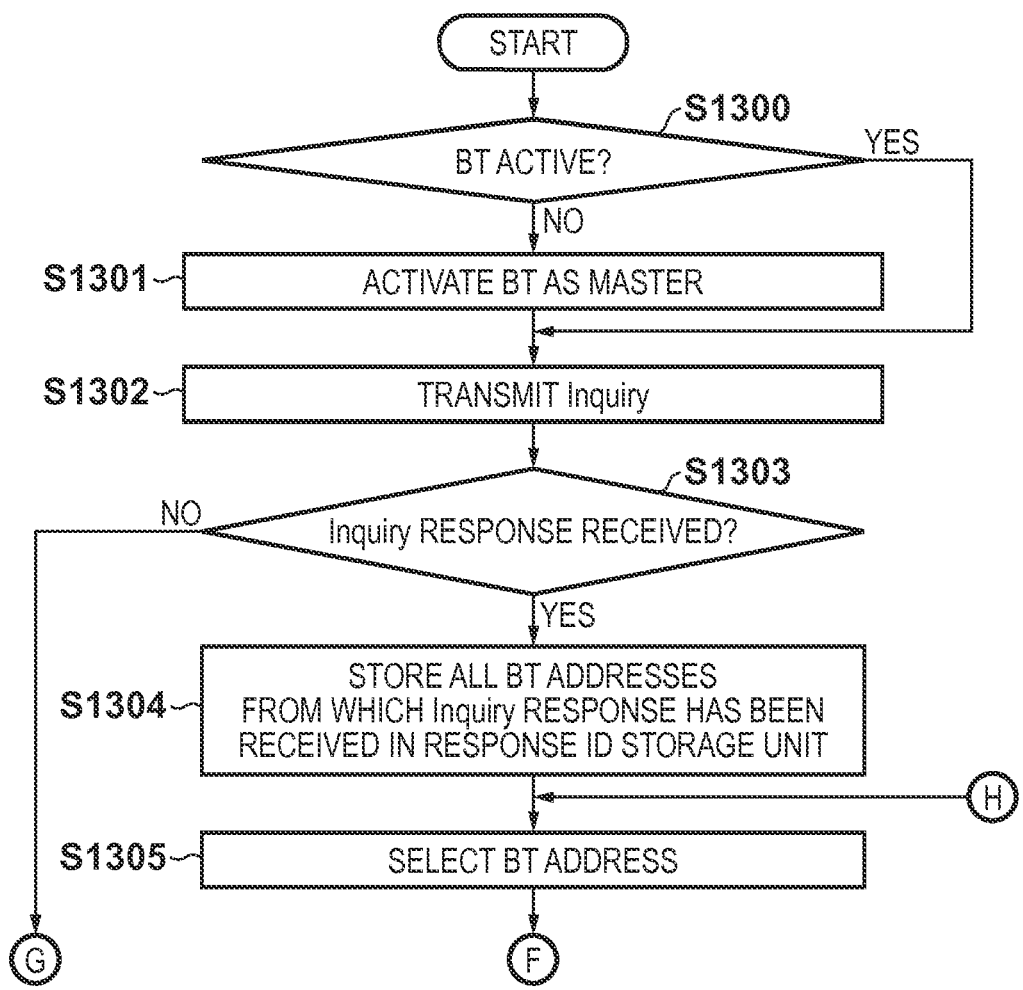
FIGS. 13A and 13B are a flowchart illustrating operations performed by a communication unit of the power transmitting apparatus.
Figure 13B:
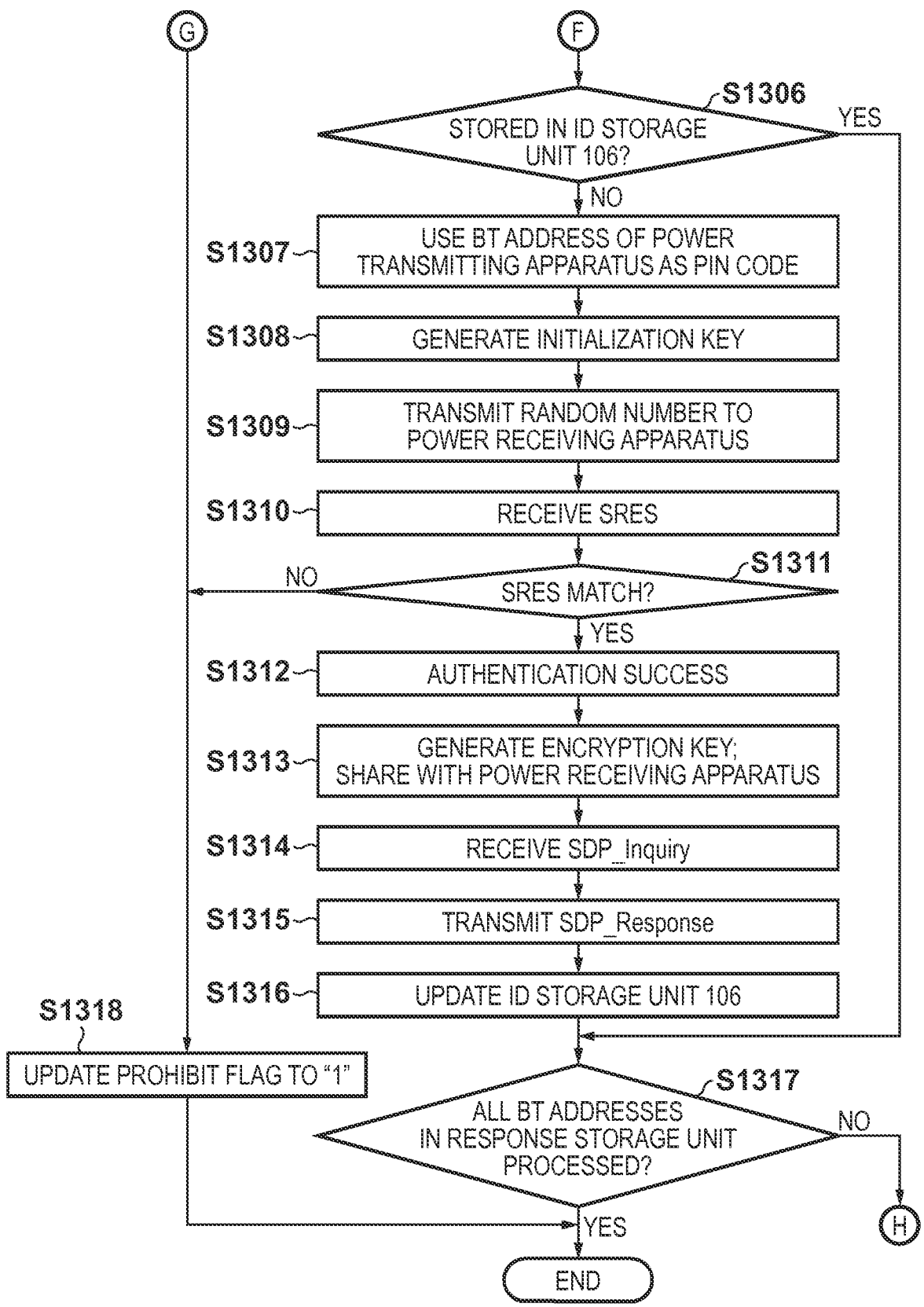
Figure 14:
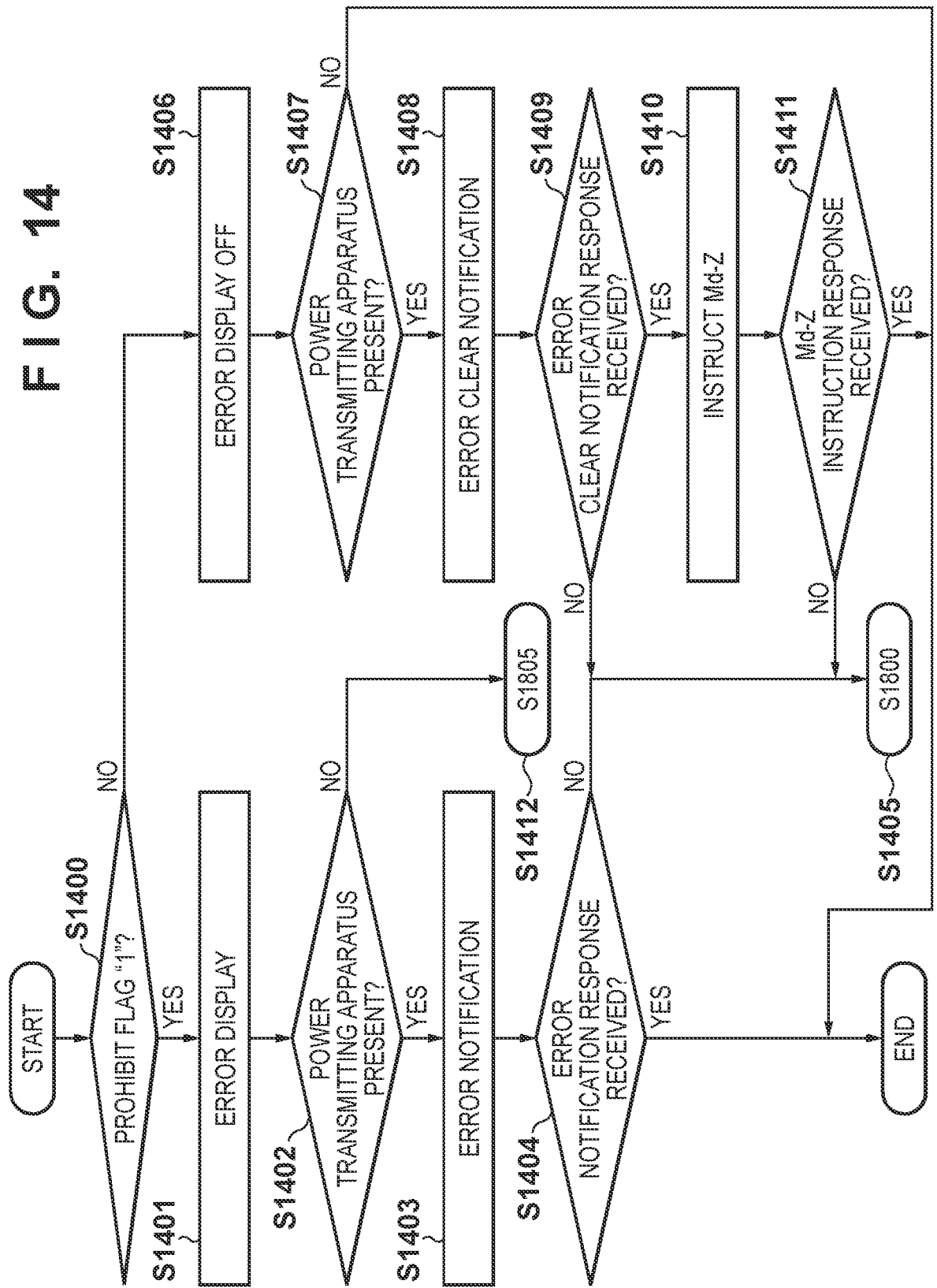
FIG. 14 is a flowchart illustrating operations performed by an error processing unit.
Figure 15A:
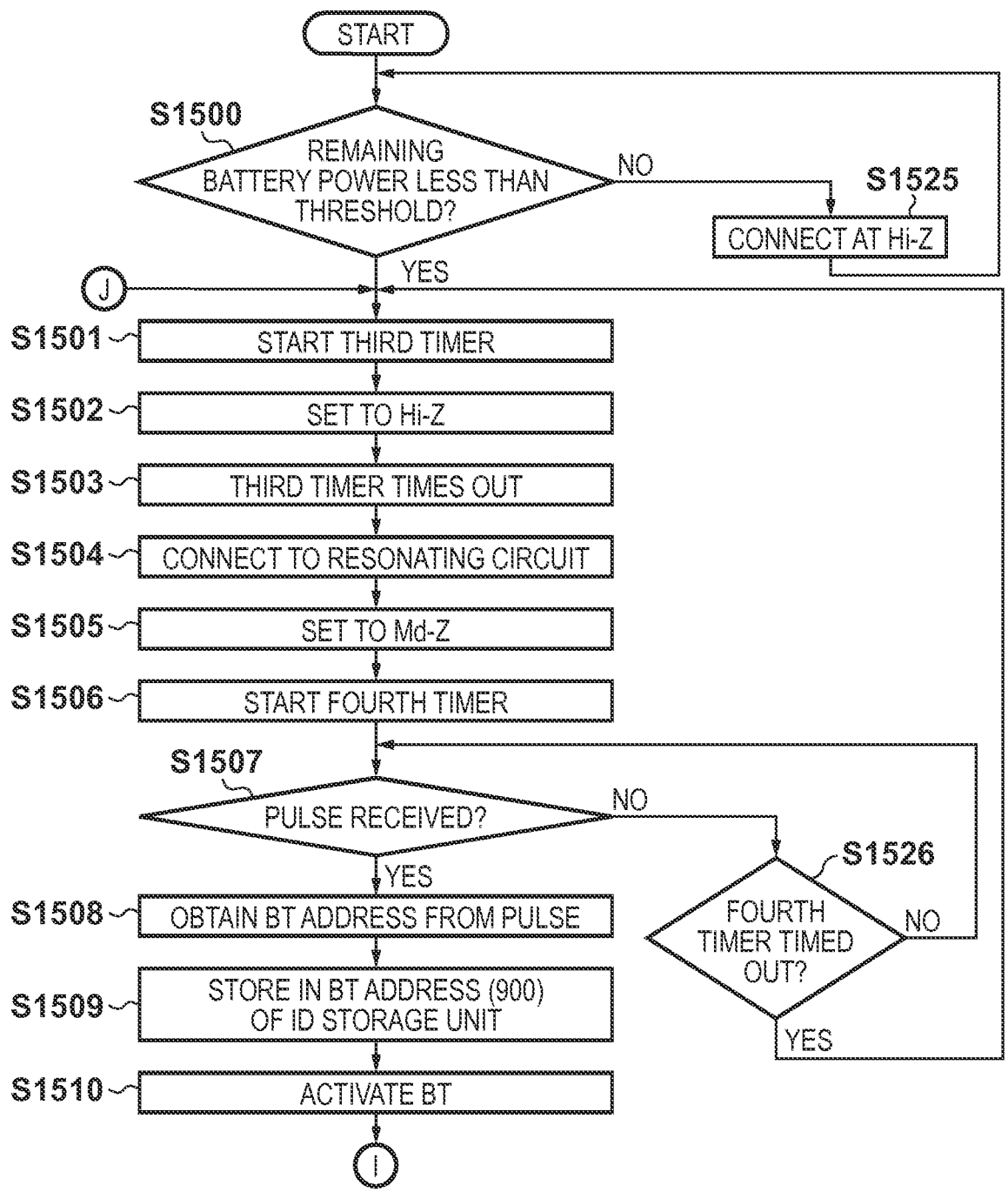
FIGS. 15A and 15B are a flowchart illustrating operations performed by the power receiving apparatus in wireless connection processing.
Figure 15B:
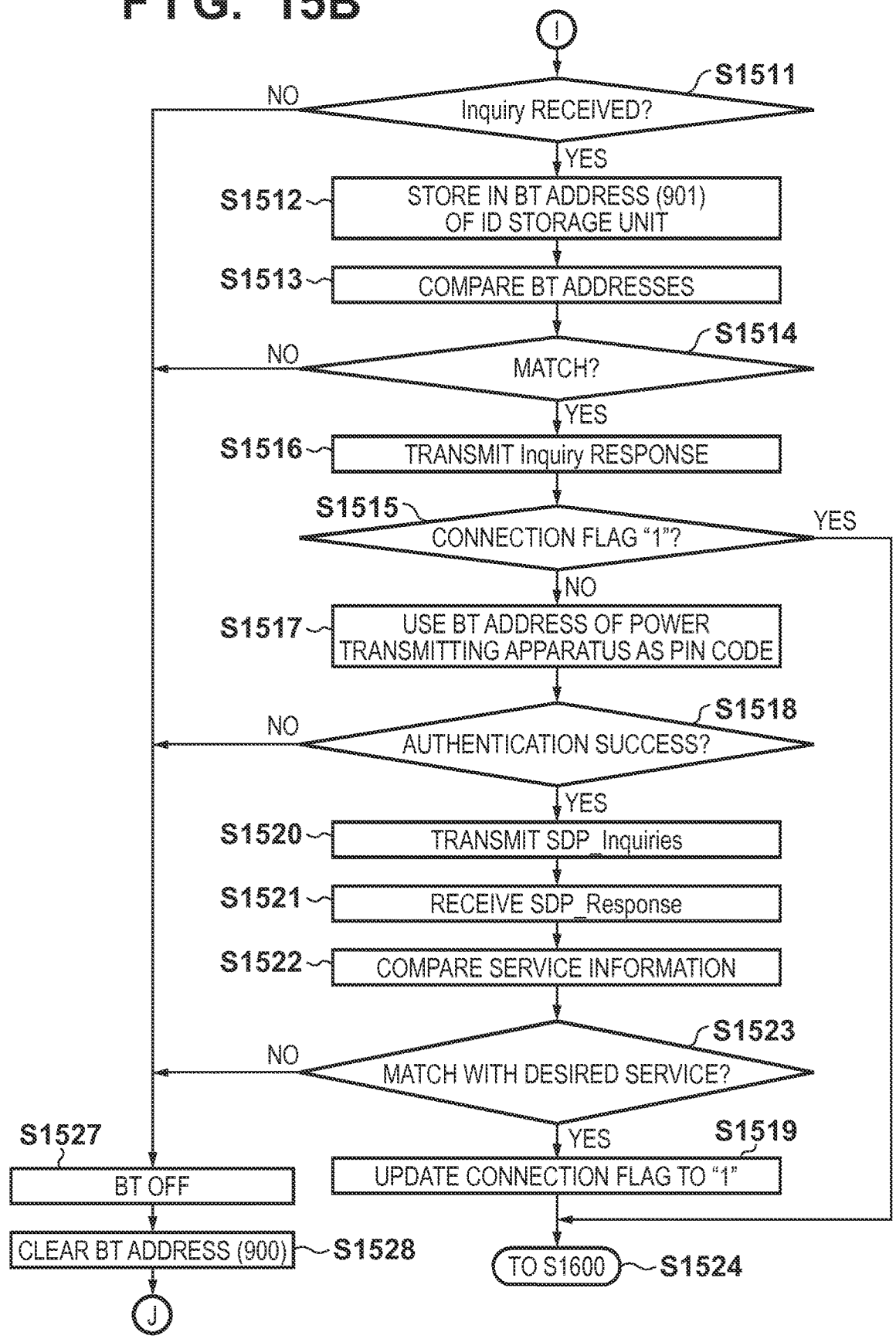
Figure 16A:
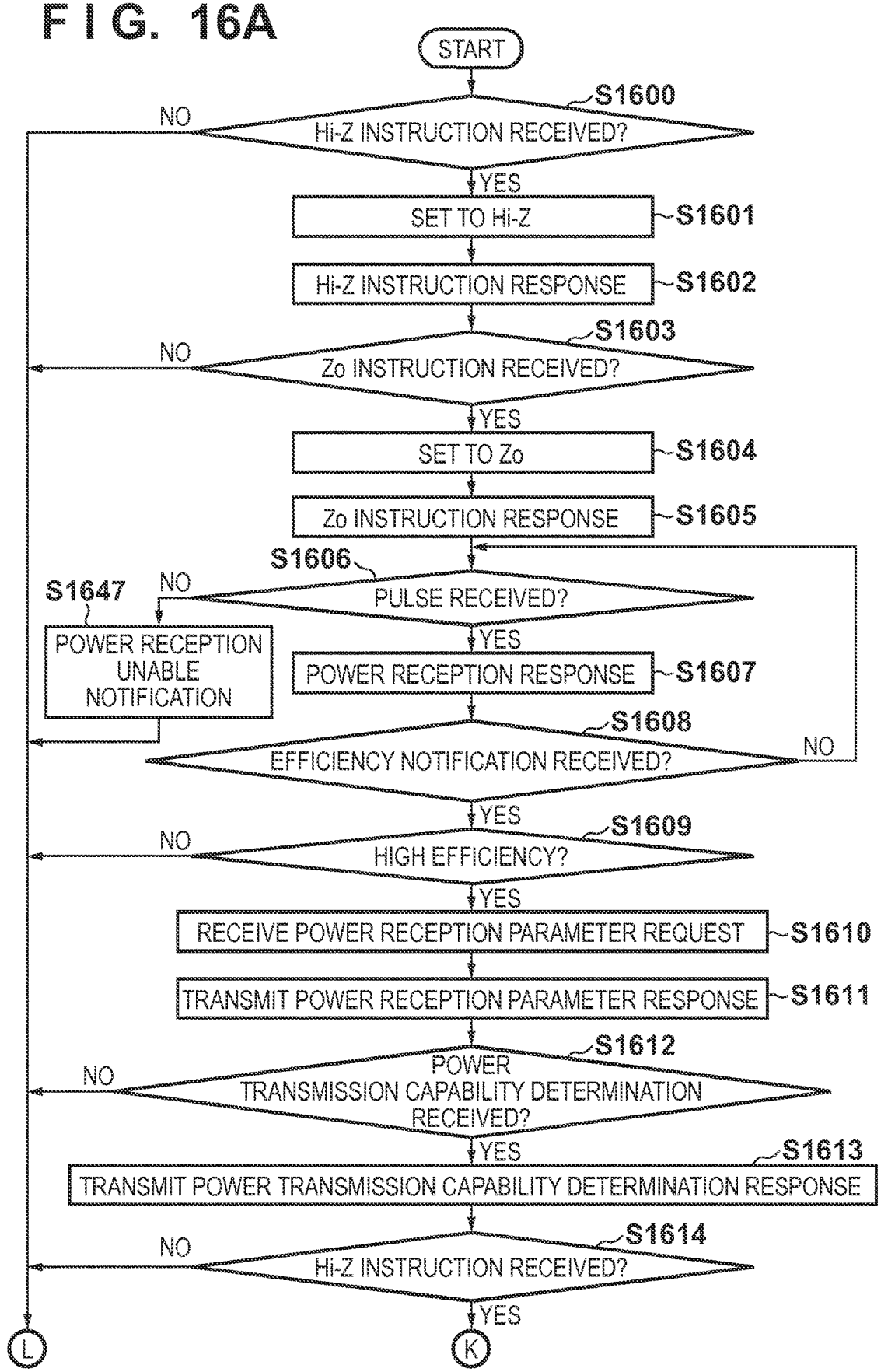
Figure 16C:
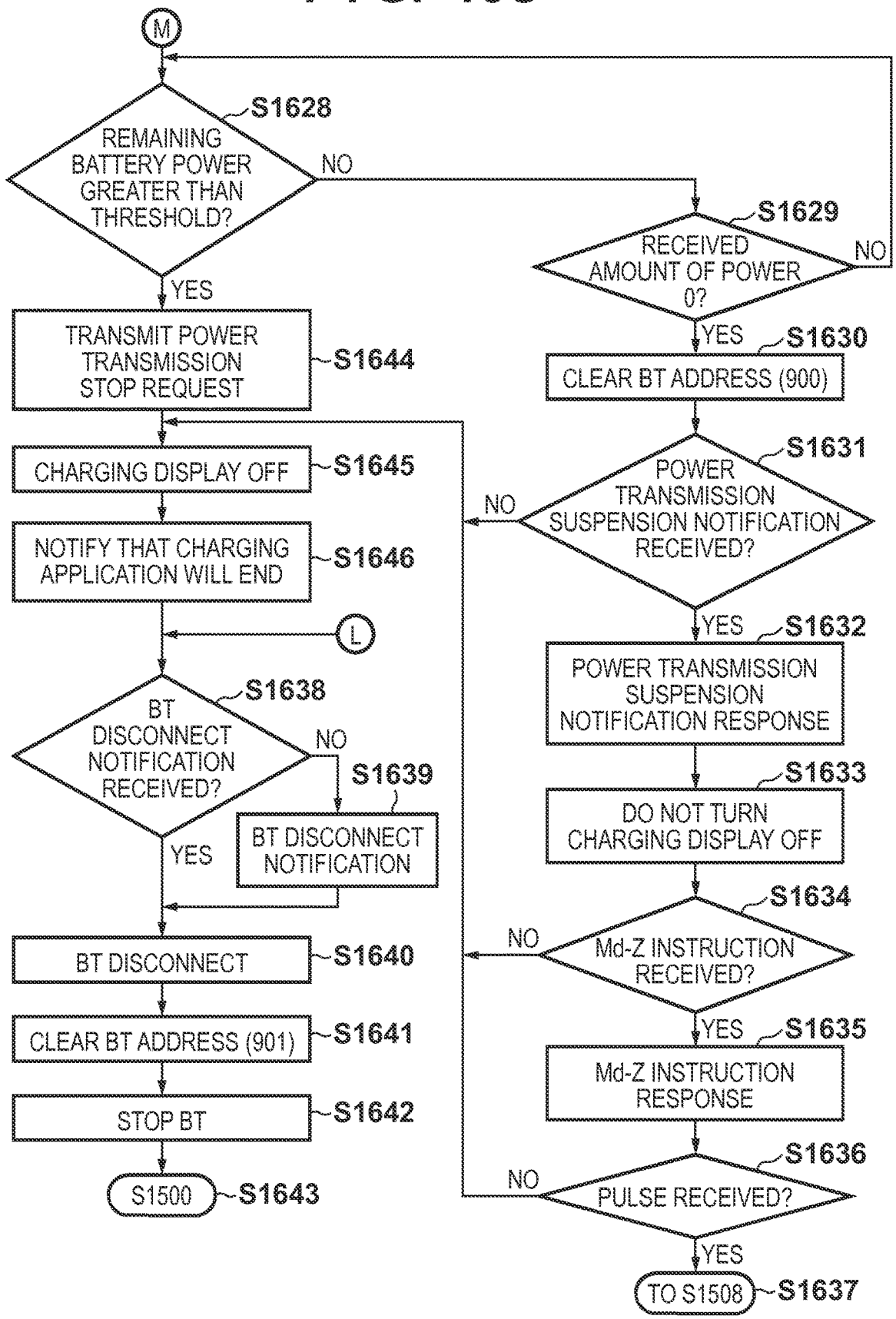
Figure 17:
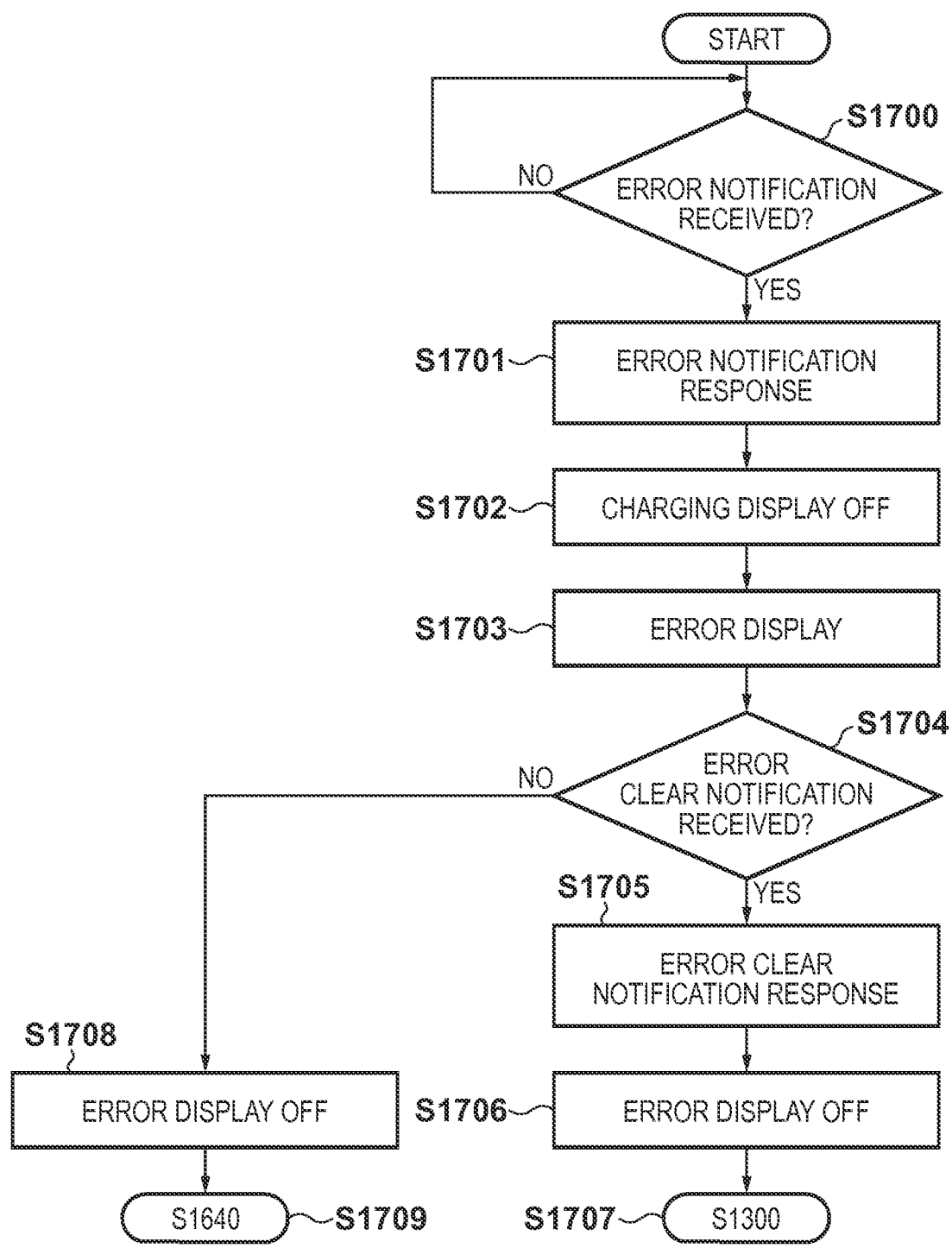
FIG. 17 is a flowchart illustrating operations performed by the power receiving apparatus in error processing.
Figure 18:
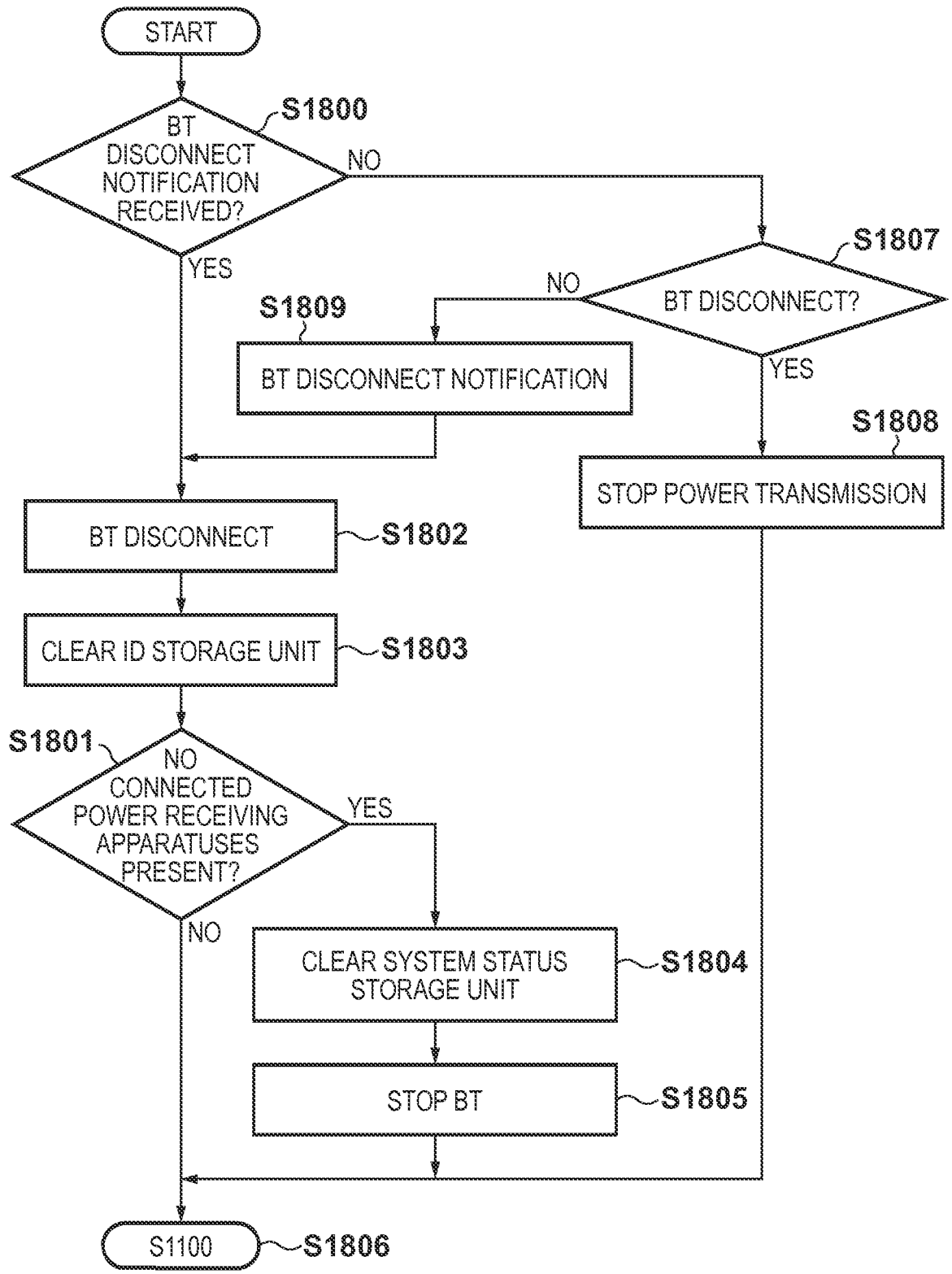
FIG. 18 is a flowchart illustrating operations performed by the power transmitting apparatus in BT stopping processing.

FIGS. 11A to 11C are a flowchart illustrating operations performed by the control unit. FIGS. 12A and 12B are a flowchart illustrating operations performed by the detection unit. FIGS. 13A and 13B are a flowchart illustrating operations performed by the communication unit of the power transmitting apparatus. FIG. 14 is a flowchart illustrating operations performed by the error processing unit. FIGS. 15A and 15B are a flowchart illustrating operations performed by the power receiving apparatus in wireless connection processing. FIGS. 16A to 16C are a flowchart illustrating operations performed by the power receiving apparatus. FIG. 17 is a flowchart illustrating operations performed by the power receiving apparatus in error processing. FIG. 18 is a flowchart illustrating operations performed by the power transmitting apparatus in BT stopping processing.

Operations for Determining Foreign Substance Present in Power Transmission Range First, operations of the wireless power transfer system in states corresponding to the state 200a and the state 200b will be described using the timing chart shown in FIG. 6A.

First, the control unit 104 causes the detection unit 103 to operate (S1100). The detection unit 103 refers to the prohibit flag in the system status storage unit. The content of the system status storage unit at this time is indicated by a record 704. According to the record 704, the prohibit flag is "0" (NO in S1200) and the power transmission flag is "0" as well (NO in S1201). Accordingly, the detection unit 103 stores Z_init in Z_before of the impedance storage unit (S1202). Because the confirm flag is "0" (NO in S1214), the detection unit 103 selects the first timer (S1204) and resets the timer at time Ta1 (S1205). The first timer is a timer having a function to define a time interval for a pulse transmission.

When the timer times out at time Ta2 (YES in S1206), the detection unit 103 transmits a pulse from the power transmission unit 112 from times Ta2 to Ta3. Then, after carrying out Z detection between time Ta2 and time Ta3, the detection unit 103 updates Z_now (S1208). According to FIG. 6A, the foreign substance 202 is not present in the power transmission range 201 between time Ta2 and time Ta3. Accordingly, the result of the Z detection from time Ta2 to Ta3 is Z_init (YES in S1209). The content of the impedance storage unit at time Ta3 is indicated by a record 1002.

Next, the detection unit 103 compares the content of the impedance storage unit in order to confirm a change in the impedance. According to the record 1002, Z_now and Z_before are both equal at Z_init (YES in S1209). Meanwhile, according to the record 704, the confirm flag is "0" (YES in S1210), and thus the detection unit 103 updates the change flag to "0" (S1211) and ends the operations.

When the operations of the detection unit 103 end, the control unit 104 refers to the change flag. According to the record 704, the change flag is "0" (NO in S1101), and thus the control unit 104 causes the detection unit 103 to operate again. The detection unit 103 selects the first timer again and resets the timer at time Ta3. Then, when the timer times out at time Ta5, the detection unit 103 transmits a pulse, and carries out Z detection from time Ta5 to Ta6.

Here, it is assumed that the foreign substance 202 has entered the power transmission range 201 at time Ta4. Accordingly, the result of the Z detection from time Ta5 to Ta6 is Z1, which is a different value than Z_init (a square 603). As such, the detection unit 103 updates Z_now to Z1. The content of the impedance storage unit at time Ta6 is indicated by a record 1003. According to the record 1003, Z_now is not equal to Z_before (NO in S1209). The confirm flag is "0" in the record 704 (NO in S1215), and thus the detection unit 103 updates the change flag to "1" (S1217). In this manner, the detection unit 103 updates the change flag to "1" and records a change in the impedance in the case where Z_now and Z_before are different. The content of the system status storage unit at time Ta6 is indicated by a record 705.

When the operations of the detection unit 103 end, the control unit 104 refers to the change flag. According to the record 705, the change flag is "1" (YES in S1011) and the power transmission flag is "0" (NO in S1102). Meanwhile, according to the record 1003, Z_now is Z1 rather than Z_init (NO in S1103). Accordingly, the control unit 104 causes the communication unit 115 to operate (S1104). Because the change flag is "1" and there has been a change in the impedance, the control unit 104 can discern that the foreign substance 202 or the power receiving apparatus 101 has entered the power transmission range 201. The control unit 104 then determines whether the cause of the impedance change is the foreign substance 202 or the power receiving apparatus 101 through processing that will be described later.

At this point in time, BT has not been activated (YES in S1300), and thus the communication unit 115 activates as the BT master (S1301). The communication unit 115 functioning as the master then sends an Inquiry message 605, which is an inquiry for establishing synchronization with slaves present in the vicinity (S1302). However, a BT-compliant device is not present in the communication range 200 at time Ta6, and thus the communication unit 115 does not receive a response to the Inquiry message (NO in S1303). At this point in time, the control unit 104 recognizes that the aforementioned cause is the foreign substance 202 rather than the power receiving apparatus 101.

The communication unit 115 then updates the prohibit flag to "1" in order to avoid the risk of heat being produced due to a high-frequency current flowing through the foreign substance 202 (S1302), and ends the processing. The content of the system status storage unit at this point in time is indicated by a record 706. When the operations of the communication unit 115 end, the control unit 104 refers to the prohibit flag. According to the record 706, the prohibit flag is "1" (YES in S1105), and thus the control unit 104 causes the error processing unit to operate (S1107).

According to the record 706, the prohibit flag is "1" (YES in S1400), and thus the error processing unit displays an error display, indicating that power cannot be transmitted to the power receiving apparatus, in the display unit. The error processing unit 132 then refers to the ID storage unit 106. Because the power transmitting apparatus 100 is not connected to the power receiving apparatus 101 through BT at this point in time, the BT address is not stored in the ID storage unit 106 (NO in S1402); accordingly, the error processing unit stops the BT (S1805) and ends the processing. When the operations of the error processing unit end, the control unit 104 causes the detection unit 103 to operate again.

According to a record 1006, the prohibit flag is "1" (YES in S1200), and thus the detection unit 103 refers to the impedance storage unit and stores Z_now in the record 1003 (Z1, in this case) for Z_before in a record 1004. The detection unit 103 then transmits a pulse from time Ta7 to Ta8 and carries out Z detection. According to FIG. 6A, only the foreign substance 202 is present in the power transmission range 201 from time Ta7 to Ta8, in the same manner as from time Ta5 to time Ta6. Accordingly, a result of the Z detection from time Ta7 to Ta8 is Z1, in the same manner as from time Ta5 to time Ta6. As such, the detection unit 103 updates Z_now in the record 1004 to Z1. Because Z_now and Z_before are equal in the record 1004 (YES), the detection unit 103 updates the change flag to "0" and ends the processing. The content of the system status storage unit at this time is the record 706 and the change flag is "0", and thus the control unit 104 causes the detection unit 103 to operate again.

The detection unit 103 then transmits a pulse from time Ta10 to Ta11 and carries out Z detection. Here, it is assumed that the foreign substance 202 has been removed from the power transmission range 201 at time Ta9. From time Ta10 to Ta11, neither the foreign substance 202 nor the power receiving apparatus 101 are present in the power transmission range 201. Accordingly, a result of the Z detection from time Ta10 to Ta11 is Z_init, in the same manner as from time Ta2 to time Ta3. The content of the impedance storage unit at time Ta11 is as indicated by a record 1005. According to the record 1005, Z_now is not equal to Z_before. Accordingly, the detection unit 103 updates the change flag to "1" and ends the processing. The content of the system status storage unit at this time is as indicated by a record 707. According to the record 1005, the current impedance Z_now is Z_init. In other words, at time Ta11, there is no risk of the foreign substance 202 producing heat even if the power transmitting apparatus 100 transmits power.

Because Z_now is Z_init (YES in S1103) and there is no risk of the foreign substance 202 producing heat, the prohibit flag is updated to "0" and the error processing unit is caused to operate. The content of the system status storage unit at this time is as indicated by the record 704. The prohibit flag is "0" (NO in S1400), and thus the error processing unit clears the error display that had been displayed in the display unit (S1406).

As described thus far, the detection unit 103 is configured to store, in advance, the output impedance of the DC voltage source of the class E amplifier for the case where a pulse is transmitted in a state where neither the foreign substance 202 nor a power receiving apparatus are present in the power transmission range 201, as Z_init in the reference impedance storage unit 133. The detection unit 103 then periodically transmits a pulse via the power transmitting antenna 114 and compares the output impedance at that time to Z_init. Then, by detecting a change in the impedance, the power transmitting apparatus 100 can recognize that the foreign substance 202 or a power receiving apparatus is present in the power transmission range 201, and can further recognize the foreign substance when a response to the Inquiry message is not received.

Meanwhile, although the detection unit 103 is configured to detect the output impedance of the DC voltage source, another physical quantity that changes due to electromagnetic coupling between the power transmitting antenna 114 and the foreign substance 202 may be employed as long as that physical quantity enables the power transmitting apparatus 100 to perform the detection. For example, the voltage V1 of the power transmitting antenna 114 may be used. Alternatively, the same effect can be achieved by providing a standing wave ratio (SWR) detection circuit between the power transmitting antenna 114 and the resonance control unit 113 and detecting the SWR. Furthermore, the power transmission unit 112 may have a configuration aside from a class E amplifier as long as it is a switching-mode power supply that converts a DC voltage into an AC voltage using a switching element.

In the above explanation, if the prohibit flag is "1", the error processing unit displays an error display in the display unit. However, the error processing unit may use any other indication for showing that the power transmitting apparatus 100 cannot transmit a power. For example, the error processing unit may generate an alert sound from a speaker (not shown), or may generate vibration by a vibrator (not shown).

In addition, the configuration here is such that upon detecting a change in the impedance, the power transmitting apparatus 100 transmits the Inquiry message, and then recognizes the foreign substance based on whether or not the Inquiry response message is then received. By doing so, it can be recognized that the foreign substance 202 is present and a power receiving apparatus is not present in the power transmission range 201, based on the lack of the Inquiry response message; this makes it possible to avoid risks by prohibiting the transmission of power.

Operations for Determining Power Receiving Apparatus/Foreign Substance Present in Power Transmission Range Next, descriptions will be given regarding the state 200c, the state 200d, and the state 200e, with reference to the timing charts in FIGS. 6B and 6C. Note that in FIG. 6B, a period up to time Tb6 corresponds to the state 200c, a period from time Tb6 to Tb7 corresponds to the state 200d, and a period from time Tb7 to Tb13 corresponds to the state 200e.

The functions of the third timer and the fourth timer of the power receiving apparatus will be described here. The third timer defines a time for which the power receiving apparatus is at Hi-Z, whereas the fourth timer defines a time for which the power receiving apparatus is at Md-Z. In other words, if the power receiving apparatus is not receiving a pulse (NO in S1307, mentioned later), the power receiving apparatus repeatedly changes between Hi-Z and Md-Z.

If the remaining battery power of the power receiving apparatus is less than or equal to a predetermined threshold (95%, for example) (YES in S1500), the third timer is started at time Tb1 (S1501), and the power receiving apparatus 101 is set to Hi-Z (S1502). When the third timer times out at time Tb2 (S1503), the switching unit is connected to the resonating circuit (S1504). The power receiving apparatus then connects the load switching unit to the mid resistance 129, sets the power receiving apparatus to Md-Z (S1505), and the power receiving apparatus then starts the fourth timer (S1506).

The control unit 104 then transmits a pulse from time Tb2 to Tb3 and carries out Z detection. From time Tb2 to Tb3, the power receiving apparatus receives a pulse containing the BT address of the power transmitting apparatus 100 via the power receiving antenna 123 (YES in S1507). The BT address of the power transmitting apparatus 100 is then obtained from the pulse (S1508) and is stored in BT address 900 in the ID storage unit 119 (S1509). The power receiving apparatus then starts BT as a slave (S1510). The content of the ID storage unit 119 at this time is indicated by the record 903. According to the record 903, BT address 900 is the BT address of the power transmitting apparatus 100, that is, "aa aa aa aa aa aa". At this point in time, the power receiving apparatus 101 can recognize that the power receiving apparatus 101 is itself in the power transmission range 201 of the power transmitting apparatus 100. In addition, at this point in time, the BT address of the power transmitting apparatus 100 has not been obtained via the communication unit 115, and thus BT address 901 is blank. Furthermore, the communication unit 115 of the power transmitting apparatus 100 and the communication unit 115 of the power receiving apparatus 101 are not connected via BT, and thus the connection flag is "0".

Operations of the detection unit 103 from time Tb2 to Tb3 will be described next. A power receiving apparatus is present in the power transmission range 201 from time Tb2 to Tb3, and the impedance of the power receiving apparatus is not Hi-Z. Accordingly, the detection unit 103 detects an impedance that is different from Z_init from time Tb2 to Tb3 (indicated as Z2, in this case). The content of the impedance storage unit at time Tb3 is indicated by the record 1006. According to the record 1006, Z_now is different from Z_before, and thus the control unit 104 causes the communication unit 115 to operate in S1104 and transmits the Inquiry message (S1302).

Upon receiving the Inquiry message (YES in S1511), the power receiving apparatus 101 obtains the BT address of the power transmitting apparatus 100 that is the source of the transmission from the header information of the Inquiry message, and stores that BT address in BT address 901 in the ID storage unit 119. The content of the ID storage unit 119 at this time is indicated by the record 904. According to the record 904, BT address 900 and BT address 901 are both the BT address of the power transmitting apparatus 100. The power receiving apparatus compares the address to the BT address in the ID storage unit 119 (S1513), and sees that the addresses match (YES in S1514). At this point in time, the power receiving apparatus 101 can recognize that the power receiving apparatus 101 is itself in the power transmission range 201 of the power transmitting apparatus 100 and in the communication range 200.

Because the connection flag is "0" in the record 904 (NO in S1515), the power receiving apparatus 101 synchronizes with the power transmitting apparatus 100 through the BT connection and moves to the authentication process. The power receiving apparatus 101 accordingly transmits the Inquiry response message in response to the Inquiry message transmitted by the power transmitting apparatus 100 (S1516).

Upon receiving the Inquiry response message (YES in S1303), the communication unit 115 of the power transmitting apparatus 100 obtains the BT addresses of all of the devices that are sources of the transmission, from the header information of the Inquiry response message. All of the BT addresses of the sources of the Inquiry response message are then stored in the response ID storage unit 109 (S1304). Here, the BT address of the power receiving apparatus 101, that is, "bb bb bb bb bb bb", is stored.

The BT address of the power receiving apparatus 101 stored in the response ID storage unit 109 is then selected (S1305), and it is confirmed that this address is already stored as a BT address in the ID storage unit 106. Prior to time Ta3, the communication unit 115 is not connected to any BT device, and no BT address is stored in the ID storage unit 106 (NO in S1306). Accordingly, the communication unit 115 determines whether the device corresponding to the BT address stored in the response ID storage unit 109 (the power receiving apparatus, in this case) is capable of using the "wireless charger" service through the processing that follows thereafter. Here, it is assumed that the BT address of the power transmitting apparatus 100 present in the pulse is shared, as the PIN code, between the power transmitting apparatus 100 capable of providing the "wireless charger" service and the power receiving apparatus capable of accepting that service.

First, the communication unit 115 uses the BT address of the power transmitting apparatus 100 itself as the PIN code (S1307) and generates an initialization key (S1308). The communication unit 115 then transmits a random number to the power receiving apparatus in order to generate a signal response (SRES) that follows thereafter (S1309).

The power receiving apparatus 101 uses the BT address of the power transmitting apparatus 100 that was confirmed as matching in S1514 as the PIN code (S1517) and generates an initialization key. Then, the power receiving apparatus 101 generates a signal response (SRES) based on the generated initialization key as well as the random number transmitted by the power transmitting apparatus 100 in S1309 and the BT address of the power transmitting apparatus 100, and transmits the SRES to the power transmitting apparatus 100.

Upon receiving the SRES (S1311), the communication unit 115 compares that SRES to the SRES it generated itself. Here, the power transmitting apparatus 100 and the power receiving apparatus 101 use the same item as the PIN code (the BT address of the power transmitting apparatus 100), and thus the SRESs match (YES in S1311); as a result, the BT connection authentication is successful (YES in S1312 and S1518). Because the authentication is successful, the communication unit 115 sees that the power receiving apparatus 101 is capable of accepting the "wireless charger" service. If the authentication is not successful (NO in S1518), the power receiving apparatus 101 turns off the BT and clears the BT address (S1528).

Next, the communication unit 115 generates an encryption key in accordance with a procedure defined by the BT standard and shares the encryption key with the power receiving apparatus 101 (S1313). Meanwhile, the power receiving apparatus transmits SDP_Inquires, and searches for services that the power transmitting apparatus 100 is currently capable of providing through the Service Discovery Protocol (SDP) (S1520). Upon receiving the SDP_Inquires (S1310), the communication unit 115 of the power transmitting apparatus 100 transmits, as an SDP_response, information indicating "wireless charger" as service information (S1315).

As described earlier, "wireless charger" matches the service desired by the power receiving apparatus 101 (YES in S1522 and S1523), and thus the power receiving apparatus 101 updates the connection flag corresponding to the BT address of the power transmitting apparatus 100 to "1" (S1519).

Upon receiving the SDP_Inquires, the communication unit 115 updates the ID storage unit 106 by storing the BT address of the power receiving apparatus authenticated in S1312 in the ID storage unit 106 (S1316). Then, the communication unit 115 confirms whether or not all of the BT addresses stored in the response ID storage unit 109 have been processed (S1317). Here, a case where a BT device that cannot accept the service is present in the power transmission range 201 and returns an Inquiry response message, and the BT address of the BT device is stored in the response ID storage unit 109, will be considered. Because the BT device is not aware of the definitions based on the PIN code, the SRESs do not match (NO in S1311), and thus the communication unit 115 updates the prohibit flag to "1".

The BT authentication and encryption key generation process carried out by the power transmitting apparatus 100 and the power receiving apparatus 101 is indicated by an arrow 614 in FIG. 6B. A BT connection is established between the power transmitting apparatus 100 and the power receiving apparatus 101 as a result of the processing indicated by the arrow 614. When the BT authentication and the connection process end, the control unit 104 updates the confirm flag to "1" (S1106) and causes the detection unit 103 to operate (S1109). It is then confirmed whether the foreign substance 202 is present in the power transmission range 201. This is because from time Tb2 to Tb3, the control unit 104 has successfully confirmed that a power receiving apparatus is present in the power transmission range 201, but has not yet confirmed that the foreign substance 202 is not present. It is necessary for the power transmitting apparatus 100 to prohibit the transmission of power in the case where the foreign substance 202 is present.

The content of the system status storage unit at this point in time is indicated by a record 708. According to the record 708, the confirm flag is "1" (YES in S1106). Accordingly, the detection unit 103 issues a Hi-Z instruction, instructing the impedance of the power receiving apparatus as viewed from the power transmitting apparatus 100 to go to Hi-Z, to all of the power receiving apparatuses stored in the ID storage unit 106 (here, the power receiving apparatus 101) (S1219).

Upon receiving the Hi-Z instruction (YES in S1600), the power receiving apparatus 101 sets the impedance to Hi-Z (607, S1601) and transmits a Hi-Z instruction response, indicating that the impedance has been set to Hi-Z, to the power transmitting apparatus 100 (S1602).

Upon receiving the response (YES in S1602), the detection unit 103 transmits a pulse from time Tb3 to Tb4 and carries out Z detection. Because the foreign substance 202 is not present in the power transmission range 201 from time Tb3 to Tb4, the result of the Z detection is Z_init. The content of the impedance storage unit at this time is as indicated by the record 1002. According to the record 1002, Z_now and Z_before are equal, and thus the confirm flag is "1" (YES in S1210). This indicates that the confirmation is complete, and thus the detection unit 103 updates the confirm flag to "0" (S1218) and ends the processing. The content of the system status storage unit at this time is as indicated by the record 704. According to the record 704, the prohibit flag is "0" (YES in S1110). At this point in time, the control unit 104 sees that the foreign substance 202 is not present in the power transmission range 201 from time Tb3 to Tb4.

Next, in order to derive the transmission efficiency between the power transmitting antenna 114 and the power receiving antenna 123, the control unit issues a Zo instruction, instructing the impedance to be set to Zo, to the power receiving apparatus 101 stored in the ID storage unit 106 (S1111, 615). Upon receiving the Zo instruction (YES in S1603), the power receiving apparatus sets the impedance of the power receiving apparatus 101 to Zo at time Tb4 (609, S1604) and transmits a Zo instruction response, indicating that the impedance has been set to Zo, to the power transmitting apparatus 100 (S1606). Upon receiving the Zo instruction response (YES in S1606), the control unit 104 transmits a pulse (S1113).

Upon receiving the pulse (YES in S1606), the power receiving apparatus measures the voltage at both ends of the matching resistance 130 and transmits a power receiving response that feeds back the voltage to the power transmitting apparatus 100 (S1607). Because the control unit 104 has not received a power reception unable notification indicating that the power receiving apparatus did not receive the pulse transmitted in S1113 (NO in S1114) and has instead received a power reception response (S1115), the control unit 104 derives the transmission efficiency (S1116). Here, prior to the process for calculating the efficiency, it has been confirmed in S1109 that a foreign substance is not present; accordingly, a situation in which the transmission efficiency cannot be accurately measured due to the power transmitting antenna 114 electromagnetically coupling with a foreign substance does not occur.

The control unit 104 causes the resonance control unit 113 to operate based on the transmission efficiency, carrying out impedance matching between the power transmitting antenna and the power receiving antenna 123 so that more efficient transmission is possible. The control unit 104 executes the processing from S1113 to S1118 in the period from time Tb4 to Tb5. When a peak efficiency is reached (YES in S1118), the control unit 104 compares the calculated efficiency with a threshold (80%, for example) stored in advance (S1119). If the efficiency is greater than or equal to the threshold (YES in S1120), the control unit 104 issues an efficiency notification, indicating that the transmission efficiency is higher than the threshold (that the efficiency is high), to the power receiving apparatus 101 (S1122). Upon receiving an efficiency notification response indicating that the power receiving apparatus has received the efficiency notification (YES in S1123), a request is made to the power receiving apparatus for power receiving parameters indicating a requested power amount requested by the power receiving apparatus 101, a peak voltage that can be handled by the power receiving circuitry in the load 117, and so on (S1124).

The power receiving apparatus receives the efficiency notification (YES in S1608), and the efficiency notification indicates a high efficiency (YES in S1609). Upon receiving the power receiving parameter request (S1610), the power receiving apparatus transmits the power receiving parameters, such as the requested power amount requested by the power receiving apparatus itself and the peak voltage that can be handled by the power receiving circuitry in the load 117, to the power transmitting apparatus 100 as a power receiving parameter response (S1611).

Upon receiving the power receiving parameter response (YES in S1125), the control unit 104 carries out a power transmission capability determination for determining whether or not power can be transmitted, having taken into consideration its own power transmission capabilities and the like (S1126). If the result of the power transmission capability determination indicates that power can be transmitted to the power receiving apparatus 101 (YES in S1127), a power transmission capability determination notification (power transmittable) is made (S1130). The power receiving apparatus 101 receives the power transmission capability determination notification (YES in S1612) and transmits a power transmission capability determination response to the power transmitting apparatus 100 (S1613). Upon receiving the power transmission capability determination response (YES in S1131), the control unit 104 updates the confirm flag to "1" (S1132) and causes the detection unit 103 to operate (S1133). It is then confirmed whether the foreign substance 202 is present in the power transmission range 201, prior to power transmission, which will be described later. This is in order to confirm that the foreign substance 202 has not entered the power transmission range 201 from time Tb4 to Tb5. When the power receiving apparatus receives the Hi-Z instruction at time Tb4 (YES in S1614), the power receiving apparatus goes to Hi-Z (S1615) and issues the Hi-Z instruction response (S1616).

The content of the system status storage unit at Tb6, when the operations of the detection unit 103 have ended, is as indicated by the record 704. Because the prohibit flag is "0" (YES in S1134), the control unit 104 issues a power transmission permission notification to the power receiving apparatus (S1135). Upon receiving the power transmission permission notification (YES in S1617), the power receiving apparatus transmits a power transmission permission response (S1618).

Upon receiving the power transmission permission response (YES in S1136), the control unit 104 issues a charging circuit connection instruction to the power receiving apparatus, instructing the power receiving apparatus to move to a state in which power can be received (S1137). Upon receiving the charging circuit connection instruction (YES in S1619), the power receiving apparatus connects the load switching unit to the load control unit 131, starts the load control unit 131 (S1622), and transmits a charging circuit connection response to the power transmitting apparatus 100 (S1623).

Upon receiving the charging circuit connection response (YES in S1138), the control unit 104 issues a power transmission start notification to the power receiving apparatus (S1139). Upon receiving the power transmission start notification (YES in S1620), the power receiving apparatus 101 transmits a power transmission start response to the power transmitting apparatus 100 (S1624). Upon receiving the power transmission start response (YES in S1140), the control unit 104 starts the power transmission at time Tb6 (616, S1217) and updates the power transmission flag to "1" (S1143). The content of the system status storage unit at this time is indicated by a record 704.

The power receiving apparatus 101 starts receiving power (S1625), carries out load impedance control (S1626), and performs a charging display indicating that charging is underway in the display unit (S1627). Note that the impedance of the power receiving apparatus during power reception is held at Zo, as seen from the power transmitting apparatus 100, due to the load impedance control. Meanwhile, once the power transmission is started at time Tb6, the power receiving apparatus continues to receive power while the remaining battery power is less than a threshold (NO in S1628).

When the power transmission is started, the control unit 104 causes the detection unit 103 to operate (S1144). The content of the system status storage unit at this time is indicated by the record 709. According to the record 709, the power transmission flag is "1" (YES in S1201), and thus the detection unit 103 records $Z\_now$ for $Z\_before$ (S1203) and selects the second timer (S1213). Here, the second timer is set to time out in an extremely short amount of time (for example, several milliseconds) that is shorter than the first timer. As a result, the Z detection cycle is shorter during power transmission than when power is not being transmitted.

Here, the power transmission unit 112 employs a class E amplifier, and thus if the impedance of the power receiving apparatus is constant at Zo, the impedance of the DC voltage source, detected by the detection unit 103, will also be constant. Here, the impedance of the DC voltage source when the power transmitting apparatus 100 is transmitting power is taken as $Z\_tx$.

The detection unit 103 resets the second timer at time Tb6, and the second timer times out after the timeout value thereof has passed (not shown here). The detection unit 103 then carries out Z detection. The content of the impedance storage unit at this time is as indicated by a record 1007. According to the record 1007, the Z detection indicates that both $Z\_now$ and $Z\_before$ have not changed from $Z\_tx$.

Here, it is assumed that the foreign substance 202 has entered the power transmission range 201 at time Tb7. If the second timer is set to the extremely short amount of time, the detection unit 103 can carry out the Z detection and set the change flag at time Tb7. The content of the impedance storage unit at time Tb7 is indicated by a record 1008. $Z\_before$ is $Z\_tx$. $Z\_now$ is Z3 (612), and due to the influence of the foreign substance 202, is a different value from $Z\_tx$. At this point in time, the control unit 104 sees that the foreign substance 202 or a new power receiving apparatus 150 not indicated in the state 200d has entered the power transmission range 201, or that the power receiving apparatus 101 has moved outside the power transmission range 201, and the impedance has changed as a result. The control unit 104 then determines whether the cause of the impedance change in the record 1008 is the foreign substance 202, the new power receiving apparatus 150, or the movement of the power receiving apparatus, through processing that will be described later.

Because the power transmission flag in the record 709 is "1" (YES in S1102), the control unit 104 stops the transmission of power at time Tb8 in consideration of the risks (S1145) and updates the power transmission flag to "0" (S1146). Then, the control unit 104 issues a power transmission suspension notification, indicating that the power transmission will be temporarily stopped until the determination is complete, to the power receiving apparatus (S1147).

The power transmission to the power receiving apparatus stops at time Tb8, and the amount of power received drops to 0 (YES in S1629). At this point in time, due to the amount of power received dropping to 0, the power receiving apparatus sees that either the power transmitting apparatus 100 has suspended power transmission in order to make a determination or the power receiving apparatus 101 itself has moved outside the power transmission range 201. When the amount of power received drops to 0, the power receiving apparatus is no longer aware of whether the power receiving apparatus itself is in the power transmission range 201, and thus BT address 900 in the ID storage unit 119 is cleared (S1630). The content of the ID storage unit 119 at time Tb8 is indicated by the record 906.

Upon receiving the power transmission suspension notification (YES in S1631), the power receiving apparatus transmits a power transmission suspension notification response to the power transmitting apparatus 100 (S1632). At this point in time, the power receiving apparatus sees that the cause of the amount of power received dropping to 0 is that the transmission of power was suspended. Upon receiving the power transmission suspension notification, the power receiving apparatus does not turn off the charging display despite the amount of power received being 0 (S1633).

Upon receiving the power transmission suspension notification response (YES in S1148), the control unit 104 issues a Md-Z instruction, instructing the impedance of the power receiving apparatus 101 as viewed from the power transmitting apparatus 100 to go to Md-Z, to the power receiving apparatus stored in the ID storage unit 106 (617, S1149). Upon receiving the Md-Z instruction (YES in S1634), the power receiving apparatus sets the impedance of the power receiving apparatus 101 to Md-Z and transmits a Md-Z instruction response indicating that the impedance has been set to Md-Z to the power transmitting apparatus 100 (S1635). Upon receiving the Md-Z instruction response (YES in S1150), the control unit 104 causes the detection unit 103 to operate.

The detection unit 103 then transmits a pulse from time Tb8 to time Tb9 and carries out Z detection. The content of the impedance storage unit at time Tb9 is indicated by a record 1009. $Z\_before$ is $Z\_init$. $Z\_now$ is Z4 (613), and due to the influence of the foreign substance 202 and the power receiving apparatus set to Md-Z, is a different value from $Z\_init$. Because the impedance has changed, the detection unit 103 updates the change flag to "1".

The control unit 104 causes the communication unit 115 to operate in S1104, in accordance with the flow from S1100 to S1103. Then, in S1302, the communication unit 115 sends the Inquiry message. When the power receiving apparatus receives the pulse transmitted by the power transmitting apparatus 100 from time Tb8 to Tb9 (YES in S1636), the process moves to S1508. The BT address obtained from the received pulse matches the BT address of the source of the Inquiry message. Accordingly, the power receiving apparatus 101 confirms the connection flag, and because the connection flag is "1", stands by for the Hi-Z instruction that follows thereafter. At this point in time, the power receiving apparatus is aware that the power receiving apparatus itself is in the power transmission range 201.

The communication unit 115 has already stored the BT address of the power receiving apparatus that transmitted the Inquiry response message in the ID storage unit 106 (YES in S1306). In addition, because the only device that transmitted the Inquiry response message is the power receiving apparatus, the processing from S1305 to S1307 is complete for all of the BT addresses in the response ID storage unit 109. The Inquiry response message has returned only from the power receiving apparatus 101, and thus the power transmitting apparatus 100 recognizes at this point in time that only the power receiving apparatus 101 is present in the power transmission range 201. The power transmitting apparatus also recognizes that the new power receiving apparatus 150 is not in the power transmission range 201.

When the processing performed by the communication unit 115 ends, the control unit 104 updates the confirm flag to "1" and confirms whether or not the foreign substance 202 is present in the power transmission range 201 from time Tb9 to Tb10; the operations of the detection unit 103 are the same as the processes carried out from time Tb3 to Tb4, mentioned earlier. The detection unit 103 issues the Hi-Z instruction to the power receiving apparatus 101 at time Tb9 (619, S1219), and thus the Z detection carried out by the detection unit 103 from Tb9 to Tb10 is influenced only by the foreign substance 202. In other words, the result of the Z detection is the same as the value Z1, detected from time Ta5 to Ta6 and mentioned earlier. The confirm flag is "1" (YES in S1215), and thus the detection unit 103 updates the prohibit flag to "1" (S1216).

Because the prohibit flag is "1" (YES in S1105), the control unit 104 causes the error processing unit to operate. The error processing unit makes an error display and then refers to the ID storage unit 106. The BT address of the power receiving apparatus is stored (YES in S1402), and thus the error processing unit issues an error notification to the power receiving apparatus (618, S1403).

Upon receiving the error notification (YES in S1700), the power receiving apparatus transmits an error notification response (S1701). Then, after turning the charging display in the display unit off (1702), an error display, indicating that power cannot be received because the foreign substance 202 is present in the power transmission range 201, is displayed in the display unit (S1703).

In the above explanation, if the error notification is received from the power transmitting apparatus 100, the power receiving apparatus 101 displays an error display in the display unit. However, the power receiving apparatus 101 may use any other indication for showing that the error notification is received from the power transmitting apparatus 100. For example, the power receiving apparatus 101 may generate an alert sound from a speaker (not shown), or may generate vibration by a vibrator (not shown).

When the control unit 104 resets the first timer at time Tb10 and the timer then times out at time Tb11, Z detection is carried out from time Tb11 to time Tb12; the impedance of the power receiving apparatus 101 at this time is Hi-Z, and thus the Z detection result is Z1.

Here, it is assumed that the foreign substance 202 has been removed from the power transmission range 201 at time Tb13. The result of the Z detection from time Tb14 to Tb15 is thus Z_init. The content of the impedance storage unit at this time is as indicated in the record 1005. Because Z_now is Z_init (YES in S1103), the control unit 104 updates the prohibit flag to "0" and causes the error processing unit to operate.

The BT address of the power receiving apparatus 101 is stored in the ID storage unit 106 (YES in S1407), and thus the error processing unit issues an error clear notification to the power receiving apparatus (S1408). Upon receiving the error clear notification (YES in S1704), the power receiving apparatus 101 transmits an error clear notification response to the power transmitting apparatus 100 (S1705), and the error display is turned off (S1706). Upon receiving the error clear notification response (YES in S1409), the error processing unit issues the Md-Z instruction to the power receiving apparatus at time Tb15 (605, S1410), and when the Md-Z instruction response is received from the power receiving apparatus 101 (YES in S1411), the processing ends.

The control unit 104 then causes the detection unit 103 to operate again from time Tb15 to Tb16. According to FIG. 6B, the state occurring from time Tb15 to Tb16 is the same as the state occurring from time Tb2 to time Tb3, and thus the power transmitting apparatus 100 can resume the power transmission through the processing already described.

When New Power Receiving Apparatus Enters Power Transmission Range

The foregoing has described a case where the foreign substance 202 has entered the power transmission range 201 at Tb7 in FIG. 6B. The following will describe a case where the new power receiving apparatus 150, that is different from the power receiving apparatus 101, has entered the power transmission range 201 at Tb7, with reference to FIG. 6C. It is assumed here that the BT address of the new power receiving apparatus 150 is "cc cc cc cc cc".

Furthermore, it is assumed that the new power receiving apparatus 150 has entered the power transmission range 201 at time Tc3, at the Md-Z impedance, during power transmission. The detection unit 103 detects that the impedance has changed to Z3 at time Tc3 and stops the power transmission. At this time, due to the processing of S1633, the power receiving apparatus does not turn the charging display off. The detection unit 103 issues the Md-Z instruction to the power receiving apparatus 101 at time Tc4, transmits a pulse from time Tc4 to time Tc5, and carries out Z detection. The control unit 104 then causes the communication unit 115 to operate and transmits the Inquiry message at time Tc5.

The power receiving apparatus 101 and the new power receiving apparatus 150 have an impedance of Md-Z from time Tc4 to Tc5, and thus receive a pulse. In other words, the power receiving apparatus 101 and the new power receiving apparatus 150 can recognize that they are in the power transmission range 201. Accordingly, the power receiving apparatus 101 and the new power receiving apparatus 150 transmit Inquiry response messages in response to Inquiry messages.

As stated above, the new power receiving apparatus 150 connects to the power transmitting apparatus 100 by the processing from step S1515 through S1519. On the other hand, the power receiving apparatus 101 is already connected to the power transmitting apparatus 100 (YES in S1515). Accordingly, the processing advances to S1600.

The communication unit 115 receives the Inquiry response messages from the power receiving apparatus and the new power receiving apparatus 150, and thus the processing from S1305 to S1317 is carried out on the two power receiving apparatuses. The BT address of the power receiving apparatus is stored in the ID storage unit 106 (YES in S1306). However, all of the BT addresses in the response ID storage unit 109 have not yet been processed (NO in S1317), and thus the communication unit 115 carries out BT authentication and connection processing with the new power receiving apparatus 150. The content of the ID storage unit

106 at time Tc5, at the point in time when the connection processing has ended, is as shown in FIG. 8.

Next, in S1219, the detection unit 103 issues the Hi-Z instruction to all of the power receiving apparatuses stored in the ID storage unit 106, or in other words, to the power receiving apparatus 101 and the new power receiving apparatus 150. The detection unit 103 then carries out Z detection from time Tc5 to Tc6, and as can be seen from FIG. 6C, both of the power receiving apparatuses are at Hi-Z from time Tc5 to Tc6, and thus the result of the detection indicates Z_init. The control unit 104 issues the Zo instruction to all of the power receiving apparatuses stored in the ID storage unit 106 in S1111. At this point in time, the control unit 104 is aware that the new power receiving apparatus 150 is the cause of the impedance change detected at time Tc3.

The processing for transmitting power to the power receiving apparatus and the new power receiving apparatus 150 is carried out from time Tc6 on, in the same manner as the processing from time Tb5 on in FIG. 6B. Meanwhile, because the power receiving apparatus does not turn the charging display off in S1633, the charging display is not turned off each time the new power receiving apparatus 150 has entered the power transmission range 201, which avoids making a user of the power receiving apparatus uneasy that the apparatus has not been successfully charged.

As described thus far, the power transmitting apparatus 100 distinguishes between a power receiving apparatus and a foreign substance, transmits power in the case of a power receiving apparatus, and does not transmit power in the case of a foreign substance. If the prohibit flag is "1" in S1134 (NO in S1134), the control unit 104 causes the error processing unit to operate (S1107) and prohibits the transmission of power. By doing so, the transmission of power can be prohibited when the foreign substance 202 enters the power transmission range 201 from the time Tb4 to Tb5.

Furthermore, in the case where the SRESs do not match in S1311 (NO in S1311), the communication unit 115 updates the prohibit flag to "1". This corresponds to a case where a BT device that cannot accept the "wireless charger" service has entered the power transmission range 201 and the authentication process has been carried out. In this case, the communication unit 115 treats the BT device in the same manner as the foreign substance 202, and does not transmit power.

Furthermore, in the case where the power receiving apparatus does not return the expected response, the power transmitting apparatus 100 stops the communication unit 115 in accordance with the flow illustrated in FIG. 18. First, in the case where a BT disconnect notification has not been received from the power receiving apparatus and a BT connection is still established (YES in S1807), the BT disconnect notification is issued to the power receiving apparatus (S1809) and the BT is disconnected (S1802). The BT address of that power receiving apparatus is then cleared from the ID storage unit 106 (S1803). If there are no connected power receiving apparatuses (YES in S1801), the power transmitting apparatus 100 stops the BT (S1805). In the case where there is a connected power receiving apparatus, the process returns to the operations performed by the detection unit 103 (S1806).

The aforementioned case where the expected response is not returned includes the following cases. For example, the power receiving apparatus moving outside the communication range 200 for some reason, a malfunction in the power receiving apparatus, a malfunction in the communication unit 115 of the power transmitting apparatus 100, and so on can be considered.

The Zo instruction response is not received from the power receiving apparatus (NO in S1112);

the power receiving parameter response are not received (NO in S1125);

the power transmission capability determination response is not received (NO in S1131);

the power transmission permission response is not received (NO in S1136);

the Md-Z instruction response is not received (NO in S1150);

the charging circuit connection response is not received (NO in S1138);

the power transmission start response is not received (NO in S1140);

the Hi-Z instruction response is not received (NO in S1220);

the error notification response is not received (NO in S1404);

the error clear notification response is not received (NO in S1409); and the efficiency notification response is not received (NO in S1123).

The power transmission is also stopped (S1808) in the case where the BT has disconnected due to a worsening of the signal environment (YES in S1807). This is because it is dangerous to continue the power transmission in the case where the control signals cannot be exchanged.

In the case where the power transmitting apparatus 100 does not execute the next expected process, the power receiving apparatus disconnects the BT (S1640), clears BT address 901 in the ID storage unit 119 (S1641), and stops the BT (S1642).

The aforementioned case where the power transmitting apparatus 100 does not execute the expected process includes the following cases. For example, one such case is the case where the power receiving apparatus present in the power transmission range 201 has been carried or moved outside of both the power transmission range 201 and the communication range 200. Such a case also corresponds to a case where the power receiving apparatus or the power transmitting apparatus 100 has malfunctioned.

the power transmission capability determination is not received (NO in S1612);

the Hi-Z instruction is not received (NO in S1614, NO in S1600);

the Zo instruction is not received (NO in S1603);

the power transmission permission notification is not received (NO in S1617);

the charging circuit connection instruction is not received (NO in S1619);

the power transmission start notification is not received (NO in S1620);

the power transmission suspension notification is not received (NO in S1631) despite the amount of power received having dropped to 0 (YES in S1629);

the Md-Z instruction is not received (NO in S1634) despite the amount of power received having dropped to 0;

the pulse is not received (NO in S1636) despite the amount of power received having dropped to 0;

the pulse is not received in S1606 (NO in S1606); and the error clear notification is not received (NO in S1704).

Meanwhile, the power receiving apparatus may be provided with a configuration for notifying the power transmitting apparatus 100 of the current amount of power received, such as a configuration that communicates a power value, a voltage value, a current value, or the like. In such a case, if the power transmitting apparatus 100 has detected a change in the impedance and the notification of the amount of power received indicates "0" or an extremely small value, the power transmitting apparatus 100 determines that the power receiving apparatus has moved outside the power transmission range 201 but is within the communication range 200. Because power cannot be transmitted with high efficiency, the power transmitting apparatus 100 can also carry out a process for stopping the transmission of power. This configuration also has an effect of reducing stress on the power transmission unit 112 in the case where the power transmitting apparatus 100 has transmitted a large amount of power despite the impedance having changed.

Meanwhile, in the case where the pulse is not received in S1606 (NO in S1606), the power receiving apparatus issues the power reception unable notification, indicating that power has not been received, to the power transmitting apparatus 100 (S1647), and disconnects the BT (S1640).

Meanwhile, if the efficiency is less than the threshold (NO in S1120), the control unit 104 issues an efficiency notification, indicating that the transmission efficiency is lower than the threshold (that the efficiency is low), to the power receiving apparatus 101 (S1121). If the efficiency notification (the efficiency is low) is received (NO in S1609), the power receiving apparatus disconnects the BT (S1640).

Effects

As described thus far, upon detecting a change in the impedance, the power transmitting apparatus 100 instructs the power receiving apparatus 101 to go to a Hi-Z state in which the electromagnetic coupling between the power receiving antenna 123 and the power transmitting antenna 114 is weak. By then carrying out Z detection in an uncoupled state, the presence of the foreign substance 202 is confirmed. Doing so makes it possible to recognize that both the foreign substance 202 and the power receiving apparatus are present in the power transmission range 201 and prohibit the transmission of power. Even when power is currently being transmitted, the foreign substance 202 can be detected and further transmission of power can be prohibited.

In addition, by employing a configuration in which the second timer is set to an extremely short amount of time, the entry of the foreign substance 202 into the power transmission range 201 can be detected immediately, and the transmission of power can be stopped quickly. Meanwhile, by setting the first timer to a longer amount of time than the second timer, the amount of power consumed by the power transmitting apparatus 100 can be reduced in a state where power is not being transmitted and BT is not active.

In addition, whether or not a foreign substance is present in the power transmission range 201 is confirmed by setting the power receiving apparatus to Hi-Z in the case where the power transmitting apparatus 100 has received the Inquiry response message (YES in S1303). Doing so makes it possible to issue the error notification to the power receiving apparatus in the case where the foreign substance is present and notify the power receiving apparatus that the transmission of power is prohibited.

In addition, the power transmitting apparatus 100 carries out the confirmation before the efficiency calculation performed in S1116. Doing so makes it possible to accurately execute the efficiency calculation. Meanwhile, the power transmitting apparatus 100 carries out the efficiency calculation from time Tb4 to time Tb5, and in the case where the foreign substance 202 has entered the power transmission range 201 during this time, the power transmitting apparatus 100 cannot recognize that the foreign substance 202 has entered the power transmission range 201. However, because the power transmitting apparatus 100 carries out the confirmation in S1132 prior to the start of power transmission in S1140, the entry of the foreign substance can be recognized before starting the power transmission, thus making it possible to avoid risks.

In addition, even in the case where the power receiving apparatus has received the suspension notification in S1631 and temporarily stopped receiving power, the charging display is not turned off until the error notification is received. Doing so makes it possible to keep the charging display on in the case where power may be able to be received after the power reception has stopped temporarily. Furthermore, the charging display is not turned off each time a plurality of power receiving apparatuses enter the power transmission range 201.

In addition, the power receiving apparatus carries out the BT authentication process after recognizing that the power receiving apparatus itself is present in the power transmission range 201 (YES in S1514). Doing so makes it possible for the power transmitting apparatus 100 to recognize that a power receiving apparatus with which the BT authentication process has succeeded is present in the power transmission range 201.

In addition, in a case that another power transmitting apparatus exists in the power transmission range 201, it is possible to avoid the situation that the power receiving apparatus 101 connects to the power transmitting apparatus 100 and receives a power from the other power transmitting apparatus.

Furthermore, the power receiving apparatus does not return the Inquiry response message in the case where the reception of power is temporarily stopped and the power receiving apparatus itself cannot recognize whether or not it is present in the power transmission range 201. By doing so, the power transmitting apparatus 100 can accurately recognize whether or not the power receiving apparatus is present in the power transmission range 201 even in a state where impedance changes are detected and the transmission of power is stopped frequently, which makes it possible for the power transmitting apparatus 100 to realize the communication control with the desired power receiving apparatus.

In addition, the power transmitting apparatus 100 communicates its own BT address via the power transmitting antenna 114, which is used in the power transmission range 201 that is narrower than the communication range 200. Furthermore, the power receiving apparatus carries out the authentication process only with the power transmitting apparatus 100 having the BT address obtained through the power receiving antenna 123, and thus a problem in which a BT connection is established with another nearby power transmitting apparatus can be avoided.

In addition, if the remaining battery power is greater than a threshold (NO in S1500), the power receiving apparatus 101 goes to Hi-Z. By doing so, a power receiving apparatus that does not require charging does not affect the Z detection executed by the power transmitting apparatus 100. In addition, if the remaining battery power is greater than the threshold, the power receiving apparatus 101 does not establish a BT connection with the power transmitting apparatus 100, which makes it possible for the power receiving apparatus 101 and the power transmitting apparatus 100 to conserve power. In addition, if the remaining battery power is greater than the threshold (YES in S1628), the power receiving apparatus 101 transmits the power transmission stop request to the power transmitting apparatus 100 (S1644). Then, after the charging display has been turned off (S1645), a notification that a charging application will be ended is issued to the power transmitting apparatus

100 (S1646), and the BT connection is terminated (S1640). Doing so makes it possible to suppress BT from consuming power when the power receiving apparatus is fully charged and it is no longer necessary to exchange control signals, which in turn makes it possible to conserve power.

In addition, in the case where the amount of power received has dropped to 0 (YES in S1629) and the power transmission suspension notification is not received (NO in S1631), the case where the Md-Z instruction has not been received (NO in S1624), and the case where the pulse has not been received (NO in S1636), the power receiving apparatus notifies the power transmitting apparatus 100 that the charging application will be ended in S1646. Doing so makes it possible to end the charging application and prevent the system from operating erroneously in the case where the power receiving apparatus has been moved outside the power transmission range and the charging application cannot be continued.

In addition, the power receiving apparatus stops the communication unit 115 if the next expected instruction or notification has not been received from the power transmitting apparatus 100. Doing so makes it possible to prevent the system from operating erroneously. Furthermore, the power transmitting apparatus 100 stops the communication unit 115 and stops the power transmission sequence if the expected response is not received from the power receiving apparatus. Doing so makes it possible to prevent the system from operating erroneously.

In addition, in the case where the error is cleared and the transmission of power is to be resumed (S1408) or the case where the transmission of power is to be resumed after being temporarily stopped (YES in S1148), the power transmitting apparatus 100 issues the Md-Z instruction to the power receiving apparatus. Doing so makes it possible for the power receiving apparatus to recognize whether or not the power receiving apparatus itself is present in the power transmission range prior to the power transmission being resumed, which in turn makes it possible to prevent the system from operating erroneously.

In addition, the power transmitting apparatus 100 issues the Hi-Z instruction to all of the power receiving apparatuses stored in the ID storage unit 106 in S1219. Doing so makes it possible for the power transmitting apparatus 100 to detect a foreign substance even in the case where there are a plurality of power receiving apparatuses. In addition, the power transmitting apparatus 100 starts the communication unit 115 after a change in the impedance has been detected. Doing so eliminates power from being wastefully supplied to the communication unit 115, which in turn makes it possible to achieve a reduction in consumed power.

Note that the aforementioned high resistance 125 may be configured of a capacitor exhibiting a high impedance in the frequency corresponding to the high-frequency voltage generated in the power receiving antenna 123. In addition, omitting the high resistance 125, which corresponds to the load 117, can also be considered, in which case the power receiving antenna 123 is in an open state and no current flows through the power receiving antenna 123. In other words, the impedance of the power receiving antenna 123 can be set extremely high.

Furthermore, the configuration may be such that the high resistance 125, the mid resistance 129, and the matching resistance 130 are omitted and the load control unit 131 realizes the functions thereof. In this case, the load control unit 131 converts the load impedance, which changes in accordance with the power consumed by the load 117 (that is, the impedance when the load 117 is viewed from the load control unit 131), to Hi-Z, Md-Z, and Zo. Further still, Z_init need not be a given fixed value, and may be a value that includes error for such a fixed value. The same effects can be achieved even when the value is 100 ohms±3%, for example.

In addition, the power receiving apparatus may, in the authentication of 614 and the encryption key generation process, add an information element of "wireless power receiver", for example, indicating that the power receiving apparatus itself can accept the "wireless charger" service, to the Inquiry response message and return that message to the power transmitting apparatus 100. Specifically, information indicating "wireless power receiver" may be stored as a Universally Unique Identifier (UUID), which is one of the Extended Inquiry Response information elements defined in the BT standard.

By carrying out the authentication process only with the source of a response that contains this information element in the received Inquiry response message, the power transmitting apparatus 100 can avoid carrying out an unnecessary authentication process with another BT device that cannot accept the "wireless charger" service. The information element stored in the UUID may be an element aside from "wireless power receiver" as long as that element indicates that the apparatus is compliant with a wireless power transfer function.

The foregoing describes the power transmitting apparatus 100 as operating as a master, and the power receiving apparatus determining whether or not to issue the Inquiry response message based on the address of the source of the Inquiry message. However, another message exchanged before the encryption key is generated in S1313, another message that implies a response from the slave, or the like may be used instead. For example, an ID message exchanged during paging may be used. Even in this case, the power transmitting apparatus 100 can establish a BT connection with the power receiving apparatus 101 present in the power transmission range 201.

Furthermore, although the foregoing describes the communication unit 115 and the communication unit 118 as being compliant with the BT standard, another communication standard, such as wireless LAN, NFC, or the like, may be used instead. So-called "in-band" communication, in which control signals are exchanged via the power transmitting antenna 114 and the power receiving antenna 123 using the same frequency band as the power, may be used as well.

As described thus far, according to the wireless power transfer system of the first embodiment, a foreign substance present in the power transmission range can be identified in a favorable manner. Through this, it is possible to control the transmission of power in a more appropriate manner.

First Variation

The first embodiment describes a configuration in which the power transmitting apparatus 100 makes a notification by sending its own BT address 503. The first variation, however, describes a configuration in which the power receiving apparatus furthermore notifies the power transmitting apparatus 100 of the power receiving apparatus's own BT address (power receiving apparatus identifier) using load modulation. Specifically, the power receiving apparatus load-modulates the pulse transmitted by the power transmitting apparatus 100 by connecting and disconnecting an antenna toggle switch to a resonating unit, for example. Through this, the impedance of the power receiving apparatus 101 as viewed from the power transmitting apparatus 100 can be changed, and thus the power receiving apparatus can transmit (communicate) its own BT address to the power transmitting apparatus. Note that in this case, the power receiving apparatus 101 transmits its own BT address during a Md-Z state.

FIG. 24 is a diagram illustrating the overall configuration of a power transfer system according to the first variation. According to FIG. 24, the power transmitting apparatus 100 is configured so as to include an ID storage unit 2400. Note that because the overall configuration is almost identical to that in the first embodiment (FIG. 1), the following will describe only parts that are different from those in FIG. 1. The BT address of the power receiving apparatus detected via the power transmission unit is stored in the ID storage unit 2400.

Figure 20B:
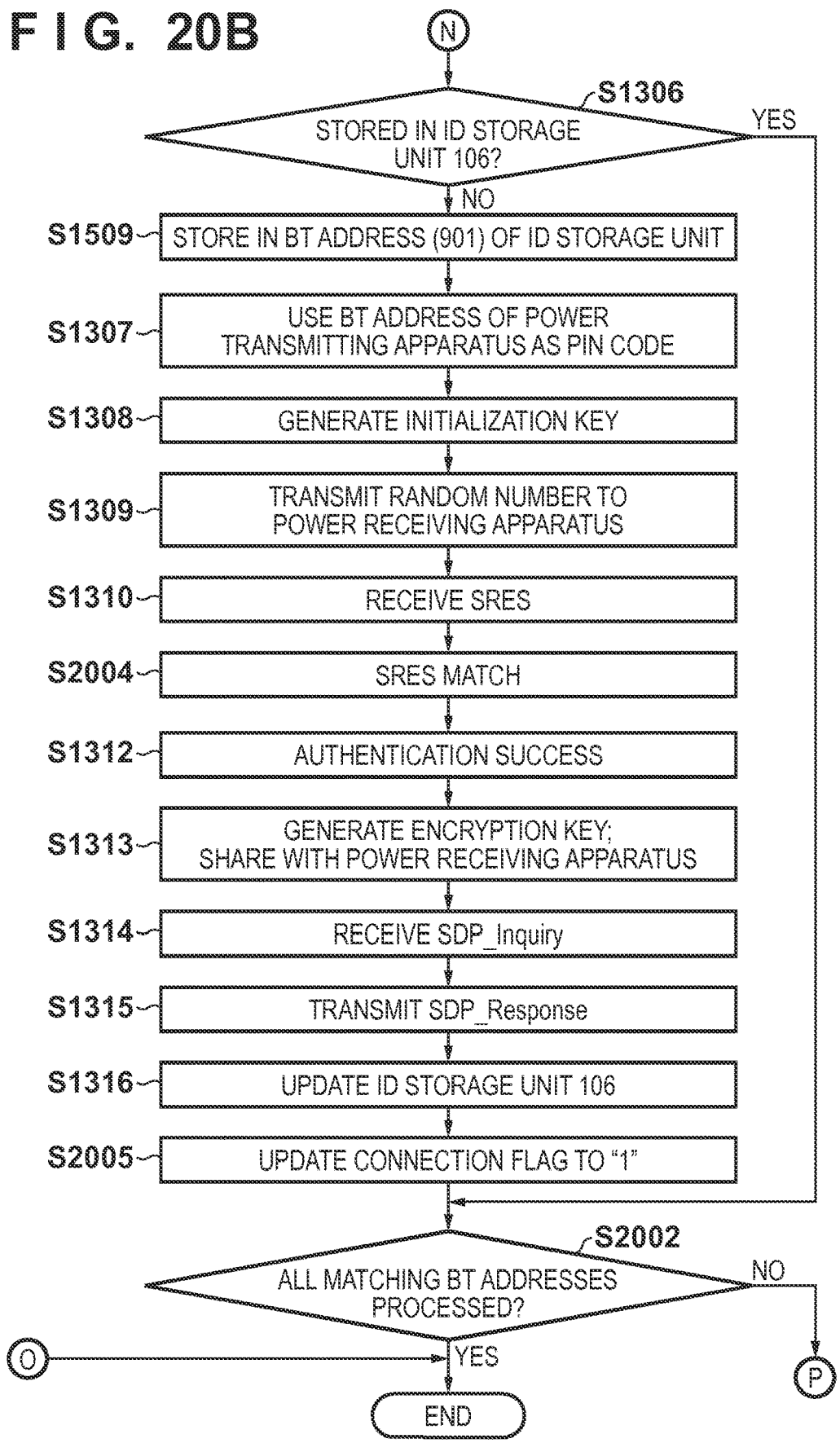

FIGS. 20A and 20B are a flowchart illustrating operations performed by the communication unit of the power transmitting apparatus according to the first variation. Note that because the flow of operations is almost identical to that in the first embodiment (FIGS. 13A and 13B), the following will describe only parts that are different from those in FIGS. 13A and 13B.

First, the power transmitting apparatus 100 obtains the BT address of the power receiving apparatus by detecting a change in the impedance through Z detection (S2000). The power transmitting apparatus 100 compares BT address 900, which is the BT address of the power receiving apparatus obtained via the power transmitting antenna 114, with the BT address stored in the response ID storage unit 109 (S2003), and selects the BT addresses that match (S2001). The BT address stored in the response ID storage unit 109 is the BT address obtained from the header information of the Inquiry response message received via the communication unit 115.

The power transmitting apparatus 100 then carries out authentication and encryption key generation processes on all the matching BT addresses. If there is no match in S1514, the process moves to a BT ending process (S1800). Even with such a configuration, the power transmitting apparatus 100 can recognize that the power receiving apparatus is present in the power transmission range 201. Then, the power transmitting apparatus 100 can, with certainty, establish a BT connection only with the power receiving apparatus present in the power transmission range 201. Furthermore, in this case, the authentication process from S1307 on is carried out only with the power receiving apparatus present in the power transmission range 201, and thus the SRESs match with certainty (S2004).

FIG. 21 is a timing chart for the power transmission unit and the detection unit of the power transmitting apparatus according to the first variation. 2100 is the BT address of the power receiving apparatus. Specifically, the power receiving apparatus 101 transmits the BT address of the power receiving apparatus after the power transmitting apparatus 100 has finished transmitting its own BT address 503 at time T3. The pulse transmitted by the power transmission unit 112 is a pulse 2101, in which the BT address 2100 of the power receiving apparatus has been added to the pulse 505 of the first embodiment (FIG. 5). The detection unit 103 can detect the impedance through a load modulation circuit in a power receiving unit from time T3 to T4. By employing such a configuration, the power receiving apparatus 101 can recognize that it is present in the power transmission range 201 of the power transmitting apparatus 100. Furthermore, the power transmitting apparatus 100 can also recognize that the power receiving apparatus 101 is present in the power transmission range 201. Accordingly, the power receiving apparatus 101 can issue the Inquiry response message only to the power transmitting apparatus 100 corresponding to the power transmission range 201. Because the power transmitting apparatus 100 carries out the authentication process only with power receiving apparatuses present in the power transmission range 201 in the same manner as shown in FIGS. 20A and 20B, there is an effect that unnecessary processing, such as where the authentication process is carried out with a BT device that cannot accept the "wireless charger" service, does not occur.

Note that the same effects can be achieved even with a configuration in which a BT address, a public key, and a random number, which are information elements in out-of-band (GOB) that serves as a type of Secure Simple Pairing according to the BT standard, are transmitted.

Although the foregoing describes a configuration in which the power transmitting apparatus 100 transmits the power 502 and the BT address 503, only the BT address 503 may be transmitted instead. Furthermore, although the power transmitting apparatus 100 is described as intermittently transmitting the pulse, the same effects can be achieved even when employing a configuration in which the pulse is transmitted continuously.

Furthermore, the foregoing describes the power transmitting apparatus 100 as communicating its own BT address to the power receiving apparatus via the power transmitting antenna 114. This notification may communicate a BT address on which a specific computation has been carried out. Sharing a specific computation between the power transmitting apparatus 100 and the power receiving apparatus not only achieves the same effects as those described above, but also improves the security. A method that takes an exclusive OR (XOR) of the BT address and a bit string having the same 6 bytes (48 bits) as the BT address can be given as an example of the stated specific computation. Furthermore, in addition to the BT address, the PIN code may be transmitted along with the pulse. Employing a configuration in which the PIN code can be changed as appropriate increases the strength of the encryption key and thus improves security.

Furthermore, the foregoing describes the power transmitting apparatus 100 as communicating its own BT address to the power receiving apparatus via the power transmitting antenna 114. However, the configuration may be such that other information enabling the power transmitting apparatus 100 to be identified is communicated instead of the BT address. For example, a randomly-generated number may be transmitted. In this case, the random number is transmitted from time Tb2 to Tb3, and the power transmitting apparatus 100 adds the random number to the Inquiry message in the authentication and encryption key generation processes indicated by the arrow 615. The same effects as above can be achieved even if the power receiving apparatus compares, in S1513, the random number received from time Tb2 to Tb3 with the random number added to the Inquiry message.

The foregoing describes the power transmitting antenna 114 and the power receiving antenna 123 as spiral antennas as examples of antennas that primarily emit magnetic fields; however, the antenna may be helical instead, or may be configured as a combination of spiral and helical shapes. The power transmitting antenna 114 and the power receiving antenna 123 may also be meandering antennas that primarily emit electrical fields. Finally, although the foregoing describes the power transmitting antenna 114 and the power receiving antenna 123 as being configured to apply 6.78 MHz-frequency electromagnetic waves, another frequency, such as in the kHz band or 13.56 MHz, may be employed instead.

Second Variation

The same effects can be achieved even if the communication unit 115 is compliant with a communication standard aside from the BT standard, such as Wi-Fi, for example. Operations performed in such a case will be described hereinafter. In particular, the second variation describes a configuration in which the communication units of the power transmitting apparatus 100 and the power receiving apparatus 101 employ Wi-Fi wireless communication instead of the BT standard.

The following descriptions will refer to a MAC address instead of a BT address and a ProbeRequest message instead of the Inquiry message. Furthermore, with respect to the ID storage unit 119, the descriptions will refer to MAC address 900 instead of BT address 900 and MAC address 901 instead of BT address 901. Furthermore, it is assumed that Wi-Fi Direct Service, defined by the Wi-Fi Alliance, is used in the authentication and connection processes. Wi-Fi Direct Service is a protocol that realizes authentication and connection processes between a terminal functioning as an access point (AP) and a terminal functioning as a station (STA).

Figure 22:
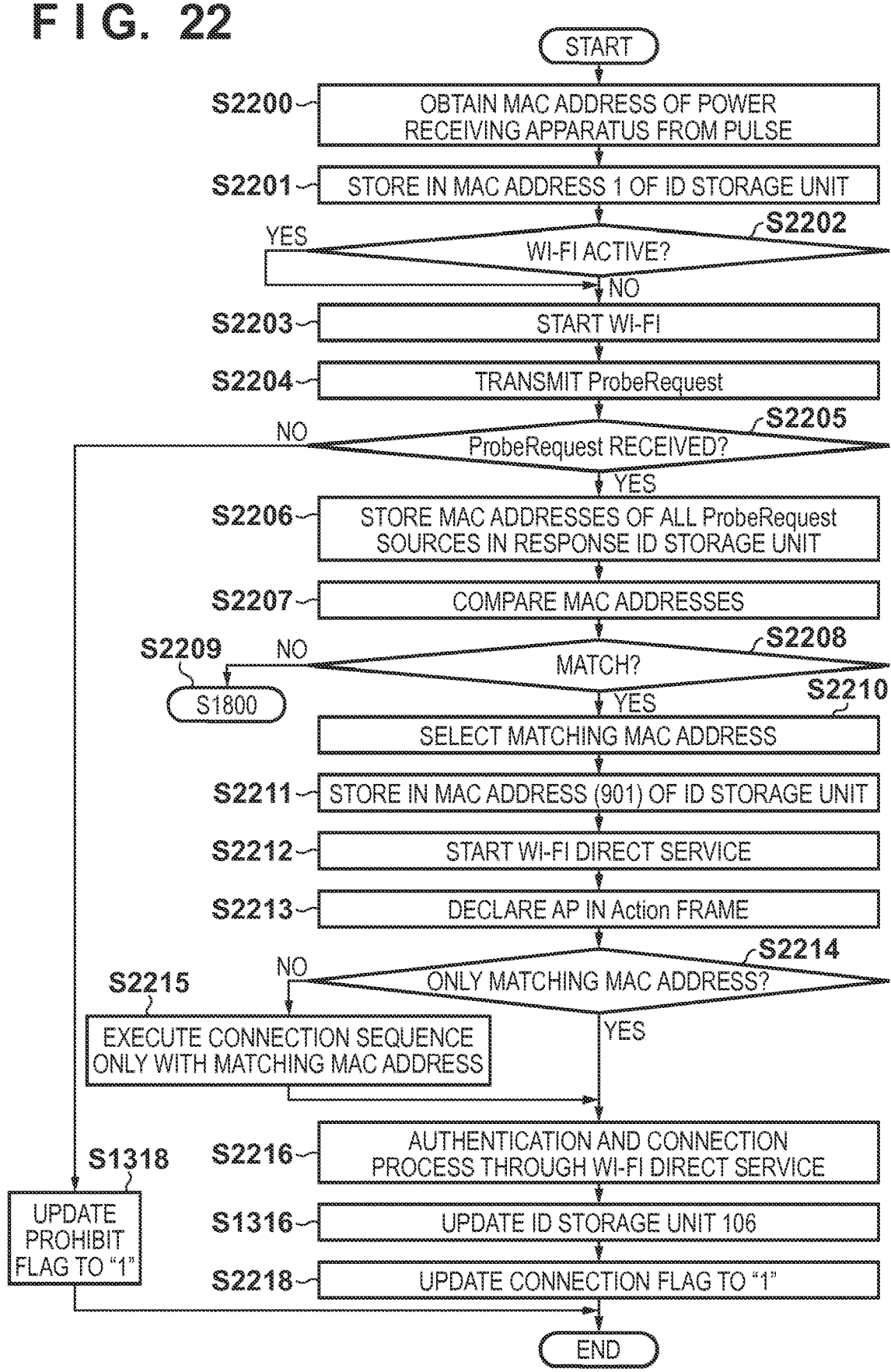
FIG. 22 is a flowchart illustrating operations performed by the communication unit of the power transmitting apparatus according to a second variation.
Figure 23A:
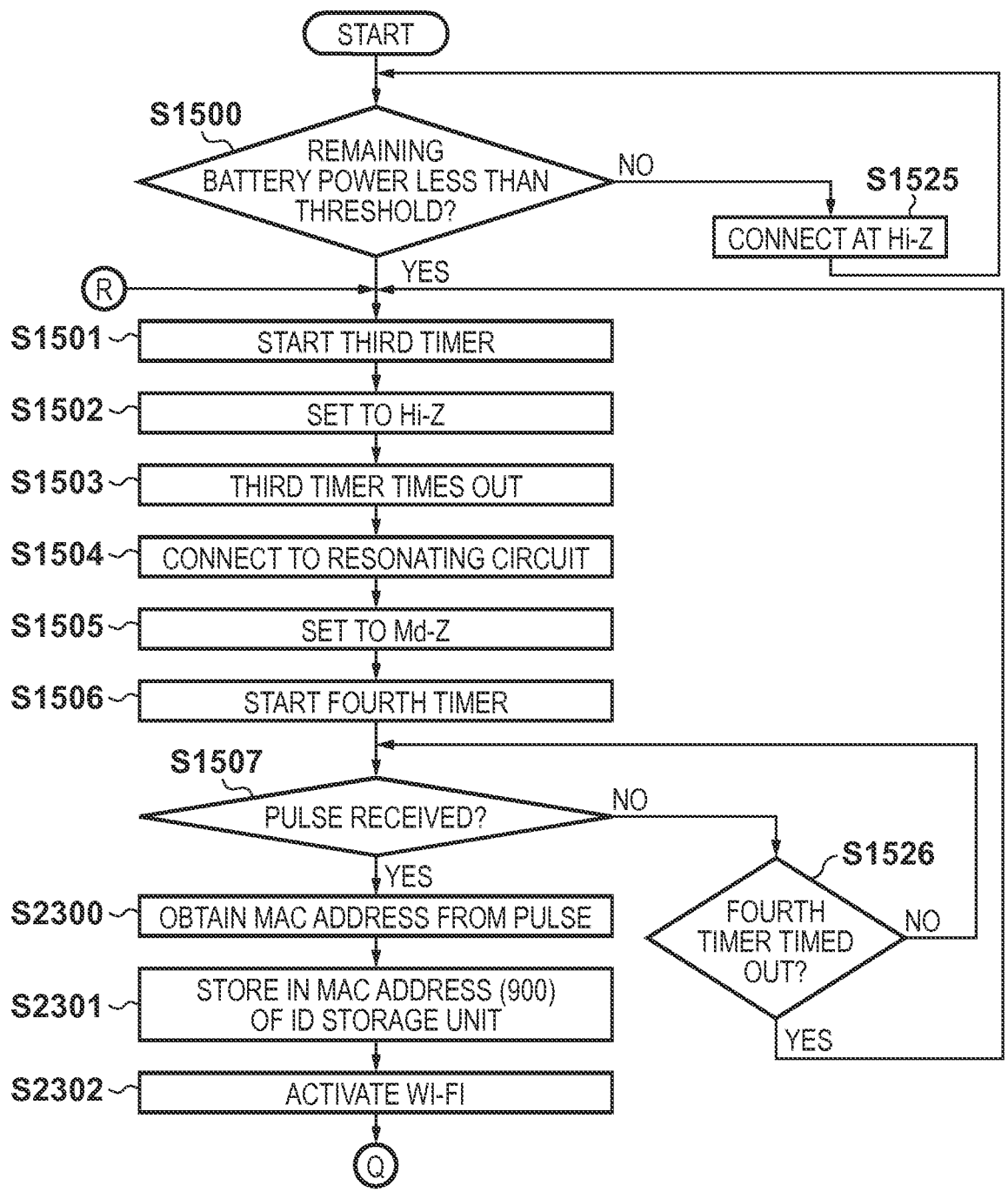
FIGS. 23A and 23B are a flowchart illustrating operations performed by the power receiving apparatus according to a second variation.
Figure 23B:
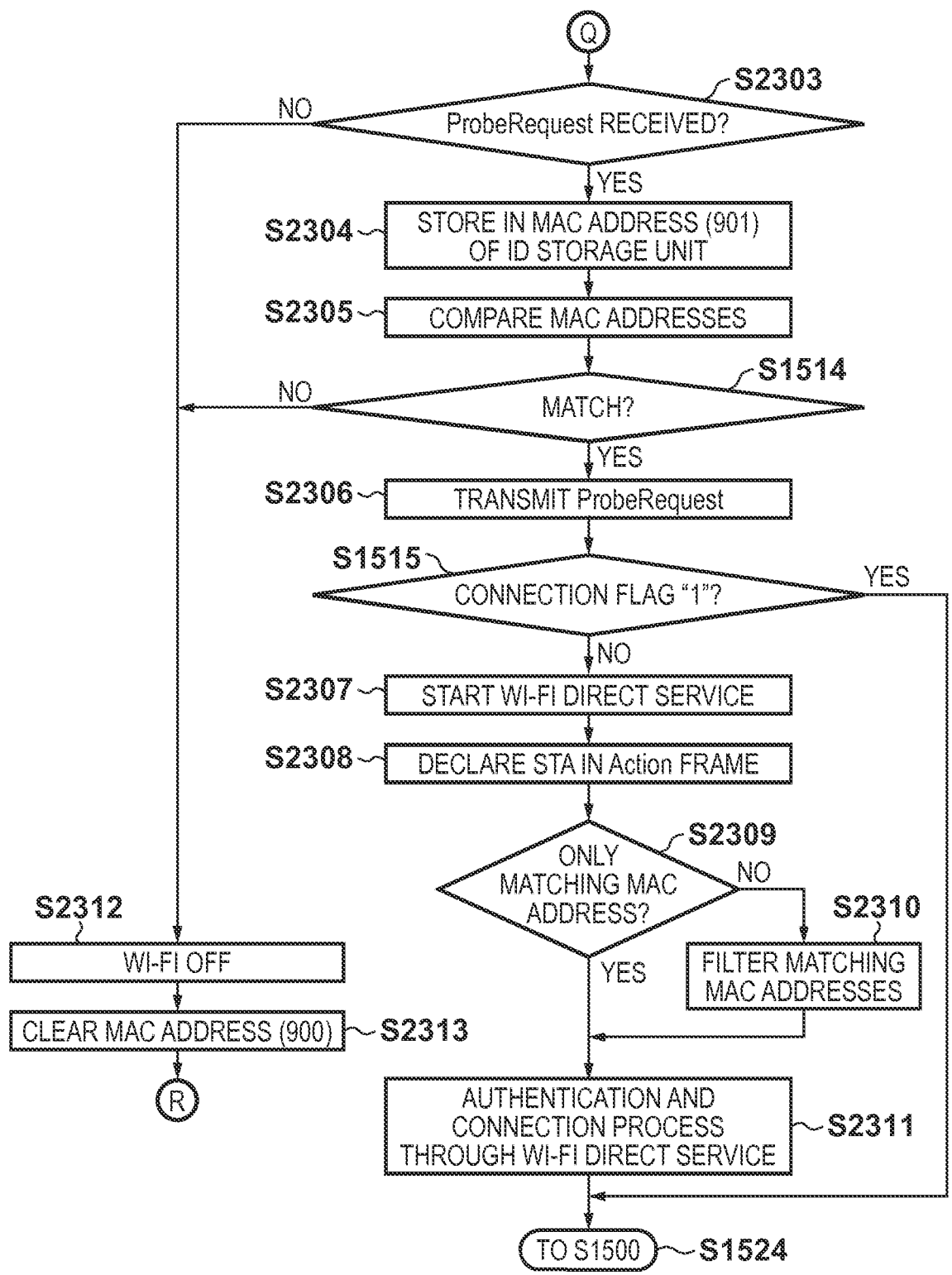

FIG. 22 is a flowchart illustrating operations performed by the communication unit of the power transmitting apparatus according to the second variation. FIGS. 23A and 23B are a flowchart illustrating operations performed by the power receiving apparatus according to the second variation. The system configuration diagram is the same as that in the first variation (FIG. 24). Likewise, it is assumed that the power transmitting apparatus 100 and the power receiving apparatus 101 transmit respective identifiers (MAC addresses, in this case) in the same manner as in the first variation (FIG. 21).

First, the communication unit 115 obtains the MAC address of the power receiving apparatus from the pulse (S2200) and stores the MAC address in MAC address 900 in the ID storage unit 2400 (S2201). Then, the communication unit 115 starts Wi-Fi (S2203) and transmits the ProbeRequest message (S2204).

Upon receiving the pulse in S1507, the power receiving apparatus obtains the MAC address of the power transmitting apparatus 100 (S2300), stores the MAC address in MAC address 900 in the ID storage unit 119 (S2301), and starts Wi-Fi (S2302). Then, upon receiving the ProbeRequest message (YES in S2303), the power receiving apparatus stores the address in MAC address 901 of the ID storage unit 119 (S2304). The power receiving apparatus then compares the MAC addresses in the ID storage unit 119 (S2305). If the MAC addresses in the ID storage unit 119 match, a ProbeResponse message is transmitted to the power transmitting apparatus 100 in S2306.

Upon receiving the ProbeResponse message (YES in S2205), the communication unit 115 stores all of the MAC addresses obtained from the received ProbeResponse message in the response ID storage unit 109 (S2206). Then, the MAC addresses stored in the response ID storage unit 109 and MAC address 900 stored in the ID storage unit 2400 are compared (S2207). If there is a matching MAC address (YES in S2208), the communication unit 115 selects the matching MAC address (S2210) and stores that address in MAC address 901 of the ID storage unit 2400 (S2212).

Note that the power transmitting apparatus 100 should function as the AP in a system in which the power transmitting apparatus 100 transmits and receives control signals over Wi-Fi. For example, consider a case where a plurality of power receiving apparatuses are present in the power transmission range and the power transmitting apparatus 100 is transmitting power to the plurality of power receiving apparatuses. In the case where one of the power receiving apparatuses is functioning as the AP but that power receiving apparatus then moves outside the communication range 200 for some reason, the Wi-Fi connection between the power receiving apparatus and the power transmitting apparatus 100 will be broken. In such a case, the power transmitting apparatus 100 that is functioning as the STA will be unable to exchange control signals with the remaining power receiving apparatuses that are also functioning as STAs.

However, a Wi-Fi terminal compliant with Wi-Fi Direct Service may function in either of a STA mode or an AP mode after the connection process ends. Accordingly, it is necessary to carry out control so that the power transmitting apparatus 100 functions in the AP mode. Accordingly, the communication unit 115 starts the authentication and connection processes according to Wi-Fi Direct Service (S2212). Here, the power transmitting apparatus 100 declares that it will function as the AP in the following Action frame (S2213).

The power receiving apparatus can recognize that the power receiving apparatus itself is present in the power transmission range 201 of the power transmitting apparatus 100 in S2300. Meanwhile, by receiving the ProbeResponse message, the power receiving apparatus becomes aware that Wi-Fi communication is possible. Accordingly, the power receiving apparatus starts the authentication and connection processes according to Wi-Fi Direct Service (S2307). The power receiving apparatus then declares that it will function as the STA in the following Action frame (S2308).

After the start of the Wi-Fi Direct Service, the communication unit 115 shares a Service Set Identifier (SSID), encryption key, and so on required to establish the Wi-Fi connection with the power receiving apparatus (this will be called a "connection sequence" hereinafter). Here, it is also possible that another Wi-Fi terminal present in the communication range 200 happens to start the Wi-Fi Direct Service. However, the power transmitting apparatus 100 uses Wi-Fi to exchange control signals when transmitting power to the power receiving apparatus 101, and thus an apparatus aside from the power receiving apparatus entering the same network poses a problem in terms of security.

Accordingly, in S2212, the communication unit 115 enables only the power receiving apparatuses present in the power transmission range 201 to execute the connection sequence in the case where the MAC address for which the connection sequence is being carried out is not only the matching MAC address (NO in S2214). Specifically, the MAC addresses that matched in S2208 are filtered, and the authentication and connection processes are carried out only with the power receiving apparatus corresponding to the matching MAC address (S2216).

Likewise, in S2309, the power receiving apparatus filters the MAC addresses that matched in S1514 (S2310) so as to enable only the power receiving apparatus 101 present in the power transmission range 201 to execute the connection sequence in the case where the MAC address for which the connection sequence is being carried out is not only the matching MAC address (NO in S2309). Then, the authentication and connection processes are carried out only with the power transmitting apparatus 100 corresponding to the matching MAC address (S2311). In other words, because, in S2214, the filtering is carried out based on the MAC address obtained in S2200, the power transmitting apparatus 100 can carry out the authentication and connection processes only with a specific power receiving apparatus. In addition, because, in S2310, the transmission apparatus filtering is carried out based on the MAC address obtained in S2300, the authentication and connection processes can be carried out only with a specific single power transmitting apparatus 100.

Although the Wi-Fi Direct Service standard has been described as an example of a protocol for carrying out the authentication and connection processes, the protocol may instead be the Wi-Fi Direct standard. Furthermore, the configuration is such that the power transmitting apparatus 100 and the power receiving apparatus 101 both communicate their respective identifiers (MAC addresses), as shown in FIG. 21, in the case where the communication units are Wi-Fi-compliant. However, the same effects can be achieved even in the case where only one of the power transmitting apparatus 100 and the power receiving apparatus 101 communicates an identifier.

Third Variation

A case in which the communication units of the power transmitting apparatus 100 and the power receiving apparatus 101 are compliant with the Bluetooth LowEnergy standard ("BLE standard" hereinafter) will be described as a third variation.

Figure 25:
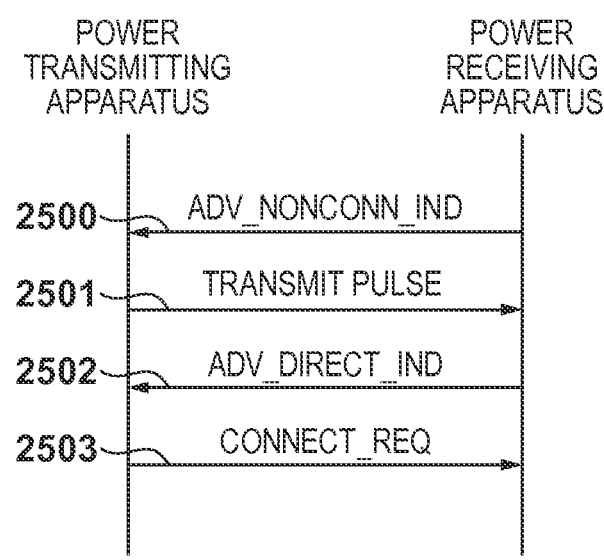
FIG. 25 is a sequence chart for wireless connection processing performed in a power transfer system according to a third variation.
Figure 26A:
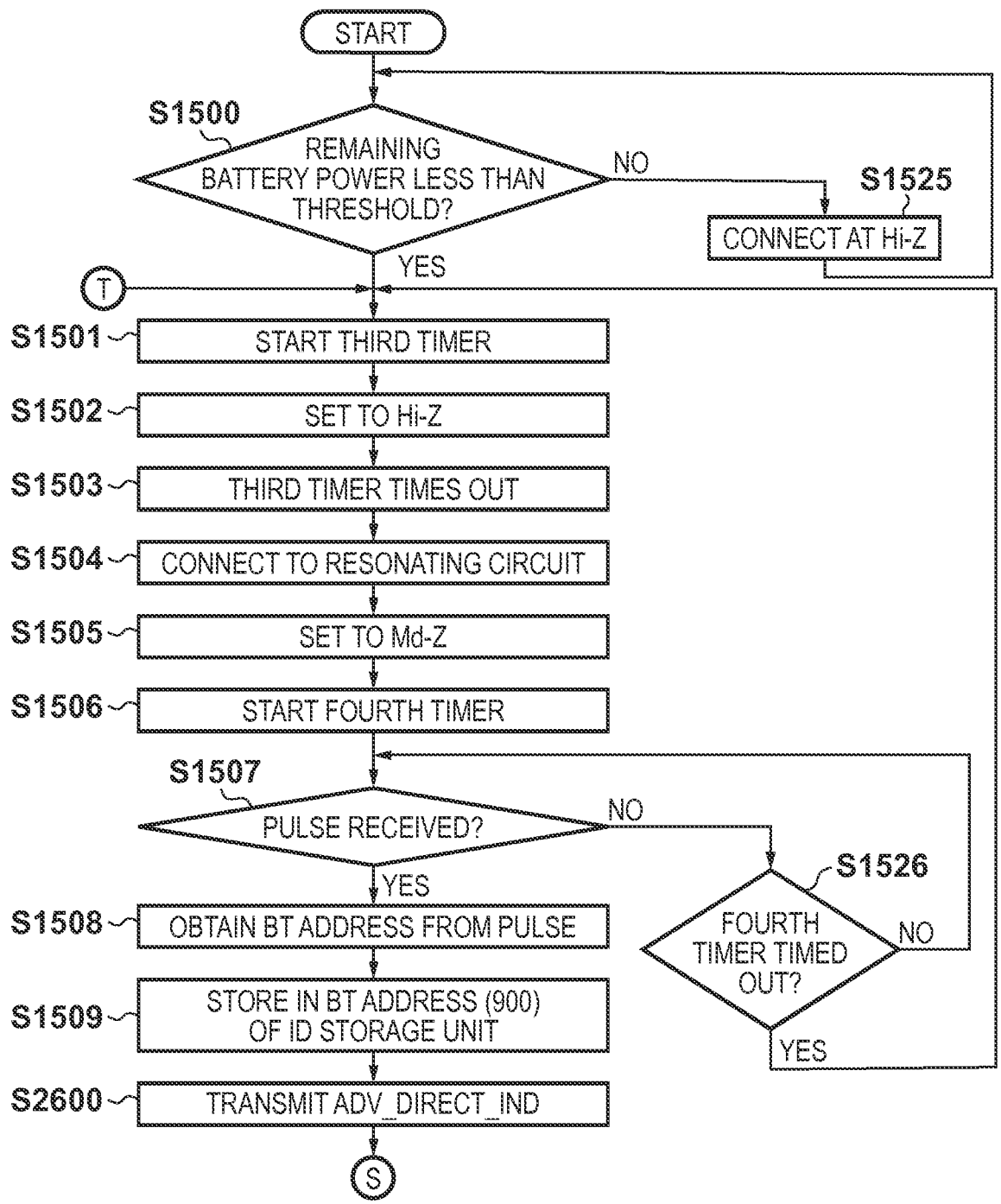
FIGS. 26A and 26B are a flowchart illustrating operations performed by the power receiving apparatus in the power transfer system according to the third variation.
Figure 26B:
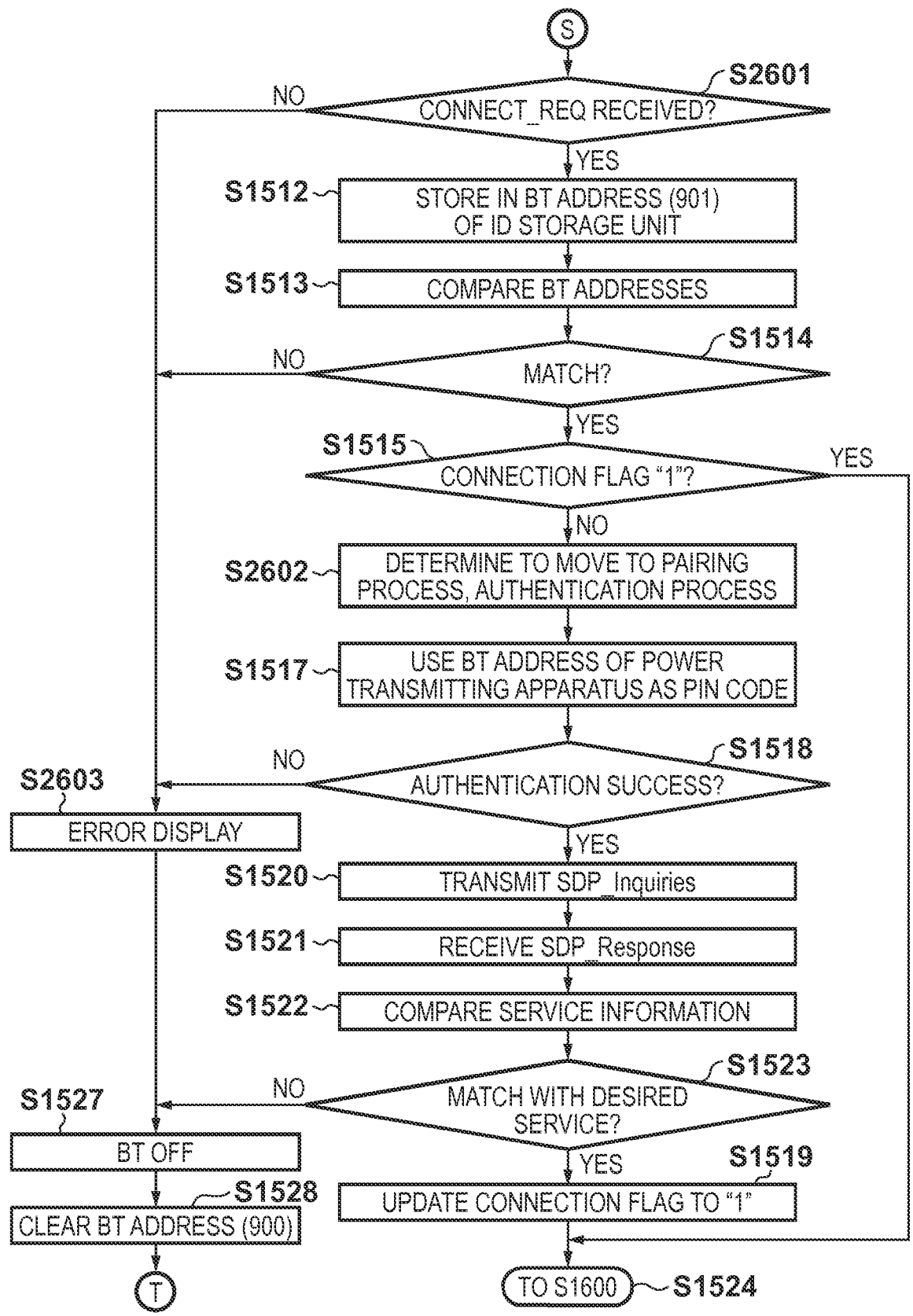

FIG. 25 is a sequence chart for wireless connection processing performed in a power transfer system according to the third variation. FIGS. 26A and 26B are a flowchart illustrating operations performed by the power receiving apparatus in the power transfer system according to the third variation.

When not receiving a pulse, the communication unit of the power receiving apparatus transmits an ADV_NON-CONN_IND message, which is an ADVERTISING message defined by the BLE standard (sequence 2500). The ADV_NONCONN_IND message communicates information of services supported by the power receiving apparatus, and is a message indicating that connection via BLE is not permitted. Meanwhile, the power receiving apparatus notifies the power transmitting apparatus 100, in whose communication range the power receiving apparatus itself is present, that the power receiving apparatus supports the "wireless power receiver" service.

Upon receiving the ADV_NONCONN_IND message, the power transmitting apparatus 100 can recognize that a power receiving apparatus to which the "wireless power charger" service can be provided is present within the communication range. However, because the ADV_NONCONN_IND message indicates that a connection is not permitted, no connection processing is carried out with the power receiving apparatus. By operating in this manner, the power transmitting apparatus 100 can avoid a situation in which a wireless connection is established with a power receiving apparatus located outside the power transmission range and the transmission of power is started.

On the other hand, upon receiving a pulse (sequence 2501, YES in S1507), the power receiving apparatus starts the communication unit as a BLE standard advertiser. The power receiving apparatus then transmits an ADV_DIRECT_IND message that holds the BT address of the power transmitting apparatus 100 contained in the pulse (sequence 2502, S2600). The ADV_DIRECT_IND message is a message that communicates information of the services supported by the power receiving apparatus and that specifies a partner with which BLE connections are permitted using an address.

In other words, in the case where the power receiving apparatus has confirmed that the power receiving apparatus itself is present in the power transmission range 201 and can receive power, the power receiving apparatus does not transmit ADV_NONCONN_IND. By operating in this manner, the connection with the power transmitting apparatus 100 is permitted, and thus control signals for receiving the power transmitted by the power transmitting apparatus 100 can be exchanged. Furthermore, storing the BT address of the power transmitting apparatus 100 contained in the pulse in the ADV_DIRECT_IND message in 2501 makes it possible for the power receiving apparatus to connect only to the power transmitting apparatus 100 whose power transmission range the power receiving apparatus is present in.

The power receiving apparatus then receives a CONNECT_REQ message indicating a request for connection (sequence 2503, YES in S2601). In the case where the power receiving apparatus has determined in S1515 that it is not connected to the power transmitting apparatus 100 from which the pulse has been received (NO in S1515), the power receiving apparatus determines to move to a pairing process and an authentication process that includes a process for generating an encryption key for encrypting the communication with the power transmitting apparatus 100 (S2602).

In the case where the power receiving apparatus has not received the CONNECT_REQ message from the power transmitting apparatus 100 (NO in S2601), or in the case where the authentication has failed (NO in S1518), an error message is displayed in the display unit. Doing so makes it possible to notify a user of the power receiving apparatus that the apparatus cannot charge.

Note that the message transmitted by the power receiving apparatus in sequence 2500 may be any message indicating that a connection is not permitted, and another message may be used instead. For example, the same effects can be achieved even when employing an ADV_SCAN_IND message that can provide information on the services supported by the power receiving apparatus and that indicates a connection is not permitted.

OTHER EMBODIMENTS

Embodiments of the present invention can also be realized by a computer of a system or apparatus that reads out and executes computer executable instructions recorded on a storage medium (e. g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-157119, filed Jul. 29, 2013, which is hereby incorporated by reference herein in its entirety.

The invention claimed is:

1. A power receiving apparatus comprising:
a first antenna for wirelessly receiving power from a power transmitting apparatus and for performing communication;
a second antenna for performing communication;
one or more memories storing instructions; and
one or more processors executing the instructions to:
perform communication regarding identification information, with the power transmitting apparatus, via the first antenna;
transmit a first signal via the second antenna;
receive a second signal indicating a request for communication via the second antenna after transmitting the first signal;
determine whether a transmission source of the second signal is the power transmitting apparatus with which the identification information is communicated via the first antenna based on identification information included in the second signal;
control to perform communication regarding power receiving control via the second antenna, based on determining the transmission source of the second signal is the power transmitting apparatus with which the identification information is communicated via the first antenna, with the transmission source of the second signal, and control not to perform communication regarding power receiving control via the second antenna, based on determining the transmission source of the second signal is not the power transmitting apparatus with which the identification information is communicated via the first antenna, with the transmission source of the second signal.

2. The power receiving apparatus according to claim 1, wherein the communication via the second antenna is compliant with a standard regarding Bluetooth Low Energy.

3. The power receiving apparatus according to claim 2, wherein the first signal is one of ADVERTISING messages defined by the standard regarding Bluetooth Low Energy.

4. The power receiving apparatus according to claim 2, wherein the first signal is ADV_DIRECT_IND message defined by the standard regarding Bluetooth Low Energy.

5. The power receiving apparatus according to claim 4, wherein the ADV_DIRECT_IND message includes identification information of the power transmitting apparatus with which the identification information is communicated via the first antenna as a partner with which Bluetooth Low Energy connections are permitted.

6. The power receiving apparatus according to claim 2, wherein the second signal is CONNECT_REQ message defined by the standard regarding Bluetooth Low Energy.

7. The power receiving apparatus according to claim 1, wherein the identification information is identification information of the power transmitting apparatus.

8. The power receiving apparatus according to claim 1, wherein the first signal includes the identification information.

9. The power receiving apparatus according to claim 1, wherein the first signal includes the identification information of the power transmitting apparatus received via the first antenna.

10. The power receiving apparatus according to claim 1, wherein a frequency of electromagnetic waves used by communication via the first antenna and a frequency of electromagnetic waves used by communication via the second antenna are different.

11. The power receiving apparatus according to claim 1, wherein the communication regarding power receiving control includes communication for an authentication process.

12. A power transmitting apparatus comprising:
a first antenna for wirelessly transmitting power to a power receiving apparatus and for performing communication;
a second antenna for performing communication;
one or more memories storing instructions; and
one or more processors executing the instructions to:
perform communication regarding identification information, with the power receiving apparatus via the first antenna;
receive a first signal from the power receiving apparatus with which the identification information is communicated via the first antenna;
transmit, via the second antenna, a second signal indicating a request for communication using the second antenna, to the power receiving apparatus after receiving the first signal; and
perform communication regarding power transmitting control via the second antenna, based on the power receiving apparatus determining that a transmission source of the second signal is the power transmitting apparatus with which the identification information is communicated via the first antenna based on identification information included in the second signal, with the power receiving apparatus.

13. The power transmitting apparatus according to claim 12, wherein the communication via the second antenna is compliant with a standard regarding Bluetooth Low Energy.

14. The power transmitting apparatus according to claim 13, wherein the first signal is one of ADVERTISING messages defined by the standard regarding Bluetooth Low Energy.

15. The power transmitting apparatus according to claim 13, wherein the second signal is CONNECT_REQ message defined by the standard regarding Bluetooth Low Energy.

16. The power transmitting apparatus according to claim 12, wherein the identification information is identification information of the power transmitting apparatus.

17. The power transmitting apparatus according to claim 12, wherein the first signal includes the identification information.

18. The power transmitting apparatus according to claim 12, wherein the communication regarding power transmitting control comprises communication for an authentication process.

19. A control method for a power receiving apparatus including a first antenna for wirelessly receiving power from a power transmitting apparatus and for performing communication, and a second antenna for performing communication, the control method comprising:
performing communication regarding identification information, with the power transmitting apparatus via the first antenna;
transmitting a first signal via the second antenna;
receiving a second signal indicating a request for communication via the second antenna after transmitting the first signal;
determining whether a transmission source of the second signal is the power transmitting apparatus with which the identification information is communicated via the first antenna based on identification information included in the second signal;

controlling to perform communication regarding power receiving control via the second antenna, based on determining the transmission source of the second signal is the power transmitting apparatus with which the identification information is communicated via the first antenna, with the transmission source of the second signal, and controlling not to perform communication regarding power receiving control via the second antenna, based on determining the transmission source of the second signal is not the power transmitting apparatus with which the identification information is communicated via the first antenna, with the transmission source of the second signal.

20. A non-transitory computer-readable storage medium storing a program for causing a computer to execute a control method for a power receiving apparatus including a first antenna for wirelessly receiving power from a power transmitting apparatus and for performing communication, and a second antenna for performing communication, the control program comprising code to execute:

performing communication regarding identification information, with the power transmitting apparatus via the first antenna;

transmitting a first signal via the second antenna;

receiving a second signal indicating a request for communication via the second antenna after transmitting the first signal;

determining whether a transmission source of the second signal is the power transmitting apparatus with which the identification information is communicated via the first antenna based on identification information included in the second signal;

controlling to perform communication regarding power receiving control via the second antenna, based on determining the transmission source of the second signal is the power transmitting apparatus with which the identification information is communicated via the first antenna, with the transmission source of the second signal, and controlling not to perform communication regarding power receiving control via the second antenna, based on determining the transmission source of the second signal is not the power transmitting apparatus with which the identification information is communicated via the first antenna, with the transmission source of the second signal.

21. A control method for a power transmitting apparatus including a first antenna for wirelessly transmitting power to a power receiving apparatus and for performing communication, and a second antenna for performing communication, the control method comprising:

performing communication regarding identification information, with the power receiving apparatus via the first antenna, receiving a first signal, using the second antenna, from the power receiving apparatus with which the identification information is communicated via the first antenna;

transmitting, via the second antenna, a second signal indicating a request for communication via the second antenna, to the power receiving apparatus after the first signal is received; and performing communication regarding power transmitting control via the second antenna, based on the power receiving apparatus determining that a transmission source of the second signal is the power transmitting apparatus with which the identification information is communicated via the first antenna based on identification information included in the second signal, with the power receiving apparatus.

22. A non-transitory computer-readable storage medium storing a program for causing a computer to execute a control method for a power transmitting apparatus including a first antenna for wirelessly transmitting power to a power receiving apparatus and for performing communication, and a second antenna for performing communication, the control program comprising code to execute:

performing communication regarding identification information, with the power receiving apparatus via the first antenna;

receiving a first signal, via the second antenna, from the power receiving apparatus with which the identification information is communicated via the first antenna;

transmitting, via the second antenna, a second signal indicating a request for communication via the second antenna, to the power receiving apparatus with which the identification information is communicated using the first antenna, after the first signal is received; and performing communication regarding power transmitting control via the second antenna, based on the power receiving apparatus determining that a transmission source of the second signal is the power transmitting apparatus with which the identification information is communicated via the first antenna, based on identification information included in the second signal, with the power receiving apparatus.

* * * * *